US012013727B2

(12) United States Patent
Kim et al.

(10) Patent No.: US 12,013,727 B2
(45) Date of Patent: Jun. 18, 2024

(54) ELECTRONIC DEVICE INCLUDING FLEXIBLE DISPLAY

(71) Applicant: Samsung Electronics Co., Ltd., Suwon-si (KR)

(72) Inventors: Minsoo Kim, Suwon-si (KR); Myunghoon Kwak, Suwon-si (KR); Yeonggyu Yoon, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 290 days.

(21) Appl. No.: 17/527,443

(22) Filed: Nov. 16, 2021

(65) Prior Publication Data
US 2022/0334615 A1 Oct. 20, 2022

Related U.S. Application Data

(63) Continuation of application No. PCT/KR2021/014507, filed on Oct. 18, 2021.

(30) Foreign Application Priority Data

Apr. 16, 2021 (KR) .................. 10-2021-0049810
Jun. 1, 2021 (KR) .................. 10-2021-0070953

(51) Int. Cl.
*G06F 1/16* (2006.01)
(52) U.S. Cl.
CPC .......... *G06F 1/1652* (2013.01); *G06F 1/1616* (2013.01); *G06F 1/1624* (2013.01); *G06F 1/1681* (2013.01)

(58) Field of Classification Search
CPC .... G06F 1/1652; G06F 1/1616; G06F 1/1624; G06F 1/1681; H04M 1/0237; H04M 1/02; H04M 1/0216; H04M 1/0268
See application file for complete search history.

(56) References Cited

U.S. PATENT DOCUMENTS 11,029,733 B2 *   6/2021  Lee ..................... G06F 1/1652
2010/0177020 A1   7/2010  Bemelmans et al.
(Continued)

FOREIGN PATENT DOCUMENTS

CN          110047385 A      7/2019
KR          10-1784880 B1    10/2017
(Continued)

OTHER PUBLICATIONS

International Search Report dated Jan. 28, 2022, issued in International Application No. PCT/KR2021/014507.

*Primary Examiner* — Abhishek M Rathod
(74) *Attorney, Agent, or Firm* — Jefferson IP Law, LLP

(57) ABSTRACT

An electronic device is provided. The electronic device includes a first housing, a second housing coupled to an edge of the first housing and configured to rotate about a folding axis extending in a first direction, a third housing coupled to the first housing and disposed to be slidable toward or away from the folding axis, and a flexible display including a first area disposed on the third housing and a second area extending from the first area and disposed through the first housing to the second housing. As the third housing slides, the second area may slide on the first housing or the second housing, and a portion of the second area may be selectively received in the second housing.

17 Claims, 34 Drawing Sheets

(56) References Cited

U.S. PATENT DOCUMENTS

| | | | |
|---|---|---|---|
| 2012/0068919 A1 | 3/2012 | Lauder et al. | |
| 2012/0307472 A1 | 12/2012 | Bohn et al. | |
| 2016/0381014 A1* | 12/2016 | Kim | G06F 3/041 726/7 |
| 2017/0229100 A1* | 8/2017 | Chun | G09G 5/38 |
| 2017/0360170 A1 | 12/2017 | Lin et al. | |
| 2018/0077810 A1 | 3/2018 | Moon et al. | |
| 2019/0305237 A1* | 10/2019 | Shin | H04M 1/0268 |
| 2019/0320048 A1* | 10/2019 | Yang | G06F 1/1652 |
| 2020/0033913 A1* | 1/2020 | Yang | H04M 1/0268 |
| 2020/0253069 A1* | 8/2020 | Cha | G06F 1/1681 |
| 2020/0363841 A1* | 11/2020 | Kim | G06F 1/1626 |
| 2021/0076517 A1 | 3/2021 | Wang et al. | |
| 2021/0116969 A1* | 4/2021 | Yu | G06F 1/1681 |

FOREIGN PATENT DOCUMENTS

| | | |
|---|---|---|
| KR | 10-2018-0029590 A | 3/2018 |
| KR | 10-2019-0062855 A | 6/2019 |
| KR | 10-2020-0067023 A | 6/2020 |
| KR | 10-2020-0095301 A | 8/2020 |

* cited by examiner

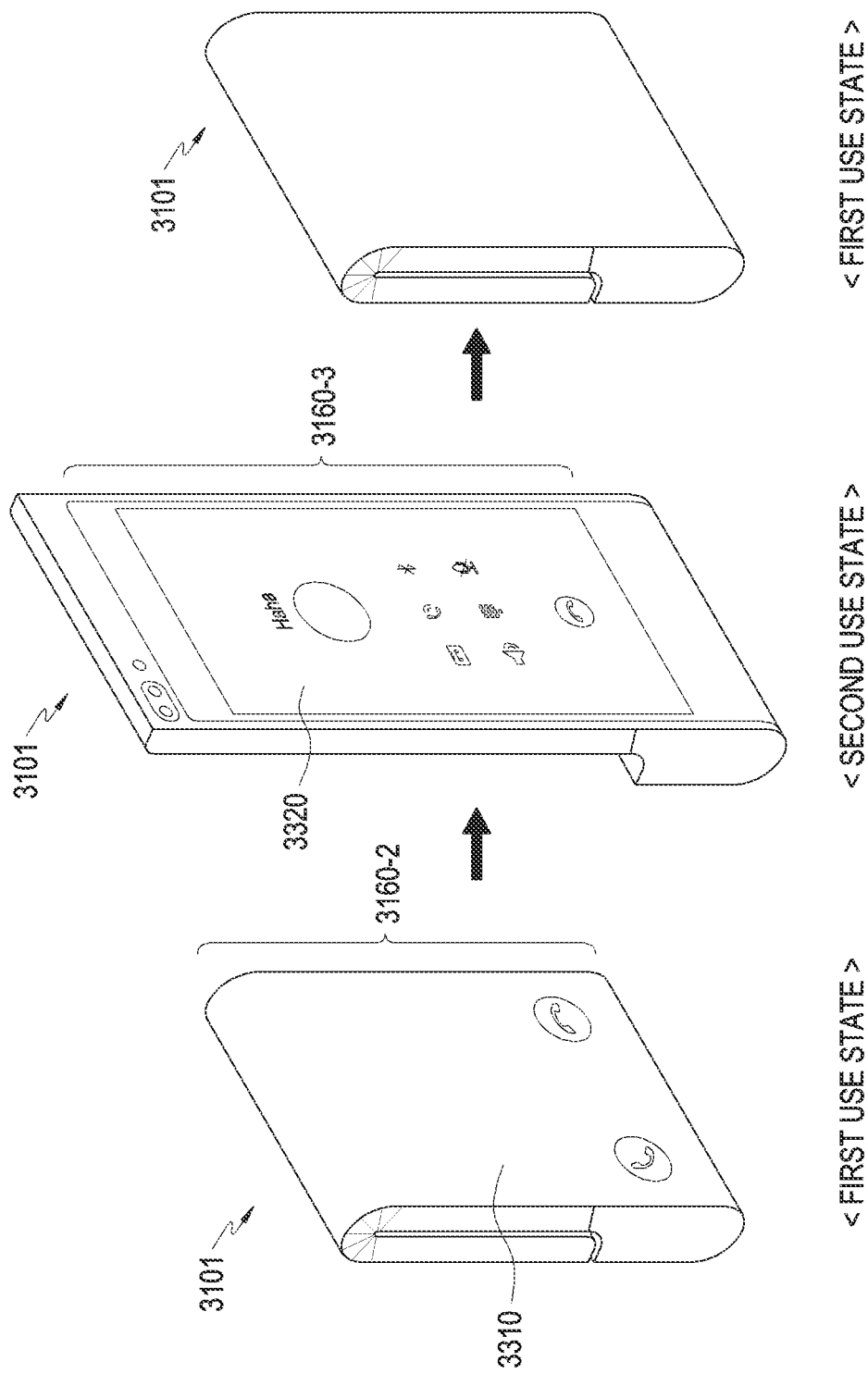

< SECOND USE STATE >

ELECTRONIC DEVICE INCLUDING FLEXIBLE DISPLAY

CROSS-REFERENCE TO RELATED APPLICATION(S)

This application is a continuation application, claiming the benefit priority under § 365(c), of an International application No. PCT/KR2021/014507, filed on Oct. 18, 2021, which is based on and claims the benefit of a Korean patent application number 10-2021-0049810, filed on Apr. 16, 2021, in the Korean Intellectual Property Office, and of a Korean patent application number 10-2021-0070953, filed on Jun. 1, 2021, in the Korean Intellectual Property Office, the disclosure of each of which is incorporated by reference herein in its entirety.

TECHNICAL FIELD

The disclosure relates to an electronic device. More particularly, the disclosure relates to an electronic device with a flexible display.

BACKGROUND ART

Developing electronic information communication technology integrates various functionalities into a single electronic device or portable communication device. For example, smartphones pack the functionalities of a sound player, imaging device, and scheduler, as well as the communication functionality and, on top of that, may implement more various functions by having applications installed thereon.

The user of a portable communication device or electronic device may search, screen, and obtain more information by accessing a network, but rather than simply using the own functionalities or information (e.g., applications) of the electronic device. Direct access to the network (e.g., wired communication) may enable quick and stable communication establishment but its usability may be limited to a fixed location or space. In accessing a network, wireless communication is free from locational or spatial limitations and its transmission speed or stability approaches that of direct access. In the near future, wireless communication is expected to establish communication more rapidly and stably than direct access.

As smartphones or other personal/portable communication devices spread, users' demand for portability and use convenience is on the rise. For example, a touchscreen display may not only serve as an output device of visual information but also provide a virtual keyboard that replaces a mechanical input device (e.g., a button input device). As such, portable communication devices or electronic devices may be made compact while delivering further enhanced applicability (e.g., a larger screen). Flexible displays, e.g., foldable or rollable displays (hereinafter, 'flexible displays'), will come in commerce and electronic devices may deliver better portability and use convenience.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

As flexible displays come onto the market, more competition arises for developing electronic devices that may transform into various shapes while providing better portability and use convenience. For example, there have been proposed electronic devices with a flexible display whose two different parts are folded to overlap each other or unfolded side by side or electronic devices with a flexible display that may selectively slide in the housing while moving on the electronic device. However, the proposed electronic devices may merely expand or contract the screen and, although diversifying user interfaces in such a manner as to split and use the expanded screen, still have limitations in use.

Aspects of the disclosure are to address at least the above-mentioned problems and/or disadvantages and to provide the advantages described below. Accordingly, an aspect of the disclosure is to provide an electronic device including a flexible display which may be used in more diversified manners.

Another aspect of the disclosure is to provide an electronic device including a flexible display that may transform its exterior in various forms and provide various user experiences and/or user interfaces accordingly.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing, a second housing coupled to an edge of the first housing and configured to rotate about a folding axis extending in a first direction, a third housing coupled to the first housing and disposed to be slidable toward or away from the folding axis, and a flexible display including a first area disposed on the third housing and a second area extending from the first area and disposed through the first housing to the second housing. As the third housing slides, the second area may slide on the first housing or the second housing, and a portion of the second area may be selectively received in the second housing.

Advantageous Effects

According to various embodiments of the disclosure, the folding operation of the first housing and the second housing and the sliding operation of the third housing may be performed independently of each other. For example, according to a selective combination of the folding operation and the sliding operation, various screen output areas or screen output directions of the flexible display and/or various user interfaces using the same may be set. For example, the electronic device may be deformed into various shapes and, according to deformed states, different user experiences and/or user interfaces may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 33 is a view illustrating using a use state upon receiving a call on an electronic device according to an embodiment of the disclosure;

The same reference numerals are used to represent the same elements throughout the drawings.

MODE FOR INVENTION

Figure 1:
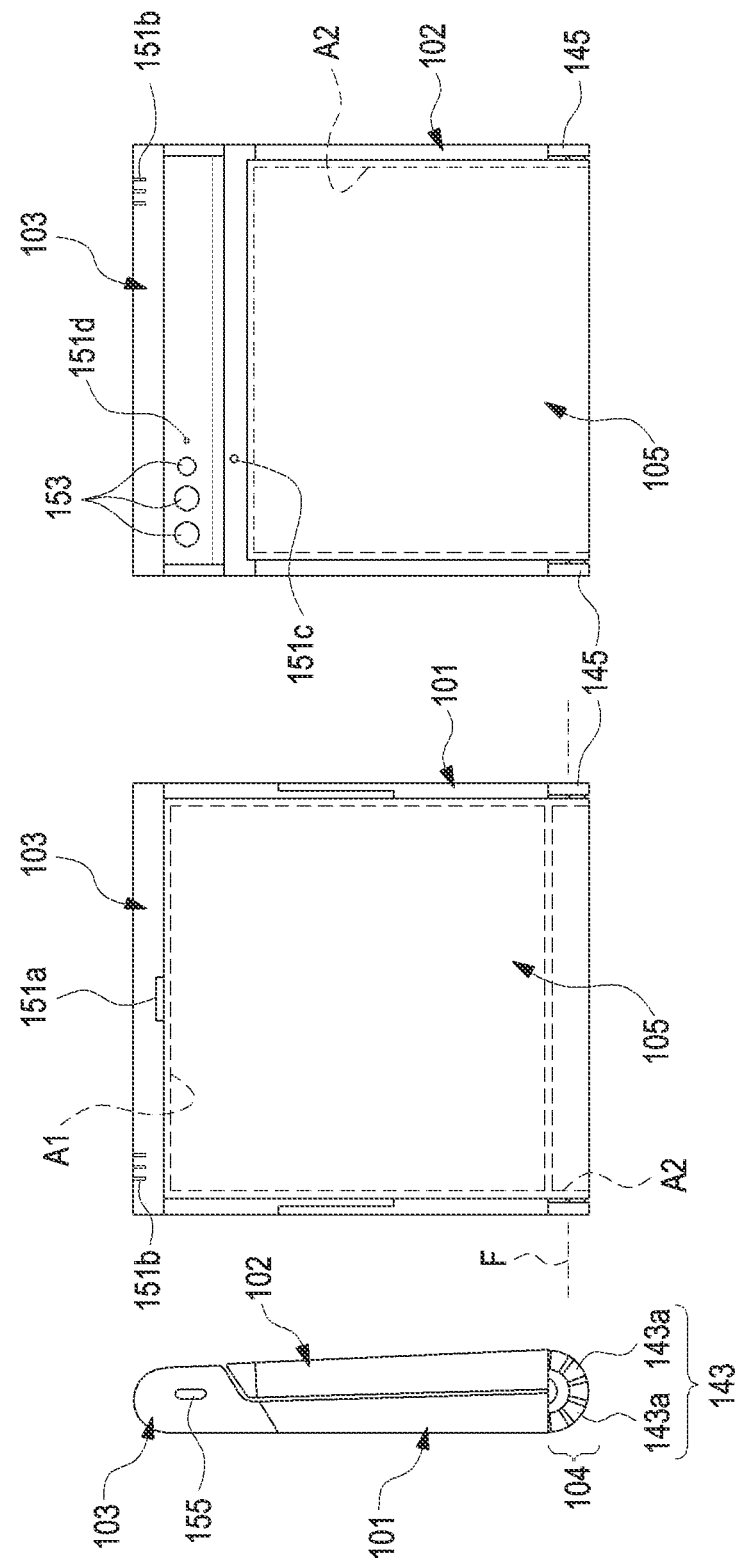
FIG. 1 is a view illustrating a folded position of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., internal memory 2436 or external memory 2438) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

In the following detailed description, "+X/−X direction", "+Y/−Y direction" or "+Z/−Z direction" may be mentioned, and it should be noted that the Cartesian coordinate system as described below is described based on the width direction X, the length direction Y, or the thickness direction Z of the housings 101, 102, and 103 in FIG. 3. For example, various changes may be made to the above definitions according to embodiments or when another structure of the electronic device 100 is set as the reference. Further, in the following detailed description, 'front surface' or 'rear surface' may be mentioned for the electronic device 100 or the housings 101, 102, and 103 and, regardless of the relative positions (e.g., unfolded position or folded position) of the housings 101, 102, and 103, the surface where the foldable display 105 of FIGS. 1 to 3 is disposed may be defined as the front surface of the electronic device 100 (or housings 101, 102, and 103), and the surface opposite to the surface where the foldable display 105 is disposed may be defined as the rear surface of the electronic device 100 (or housings 101, 102, and 103).

FIG. 1 is a view illustrating a folded position of an electronic device 100 with the flexible display 105 exposed, according to an embodiment of the disclosure. FIG. 2 is a view illustrating an unfolded position of an electronic device 100 with a flexible display exposed according to an embodiment of the disclosure.

Figure 2:
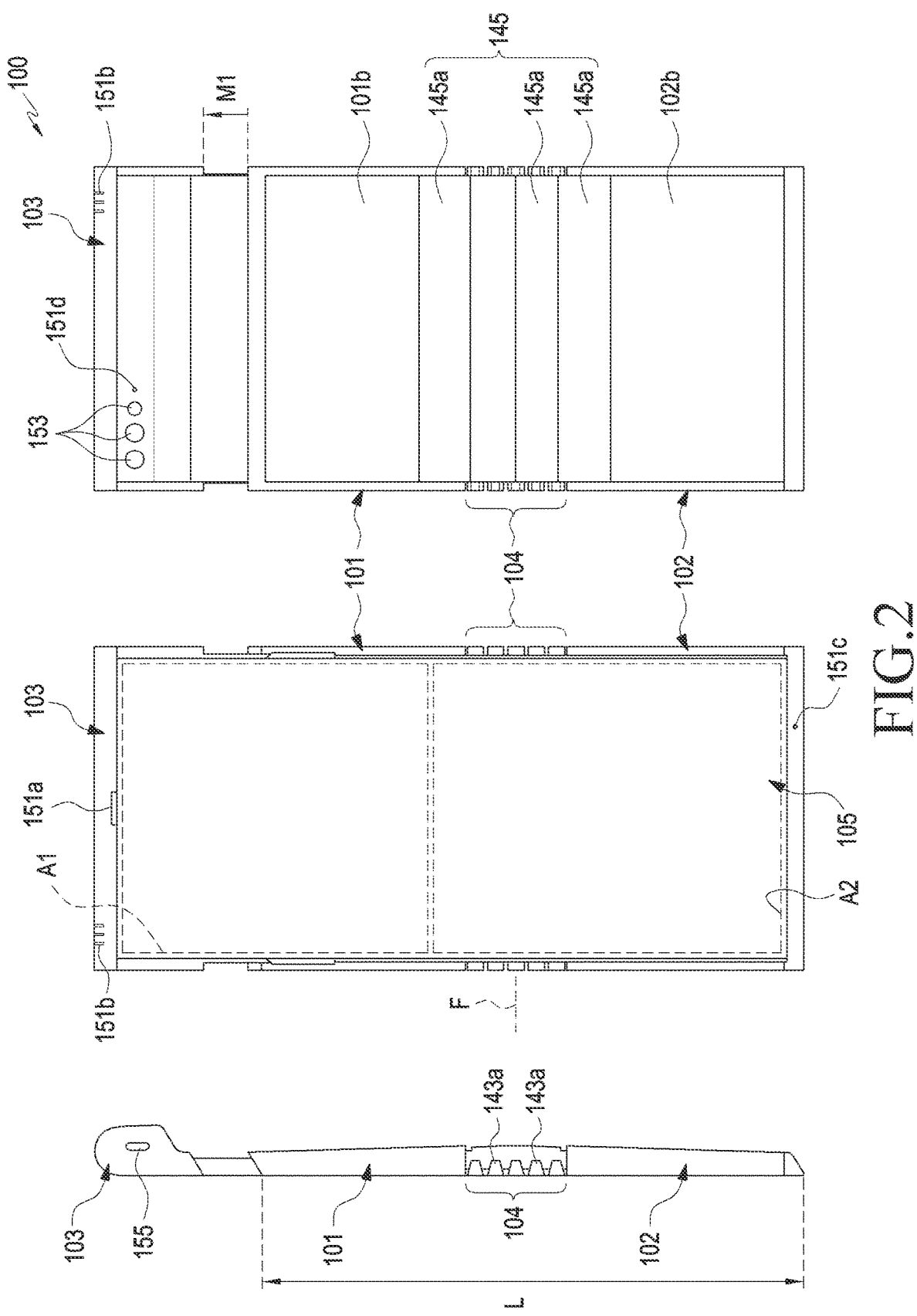
FIG. 2 is a view illustrating an unfolded position of an electronic device with a flexible display exposed according to an embodiment of the disclosure.
Figure 3:
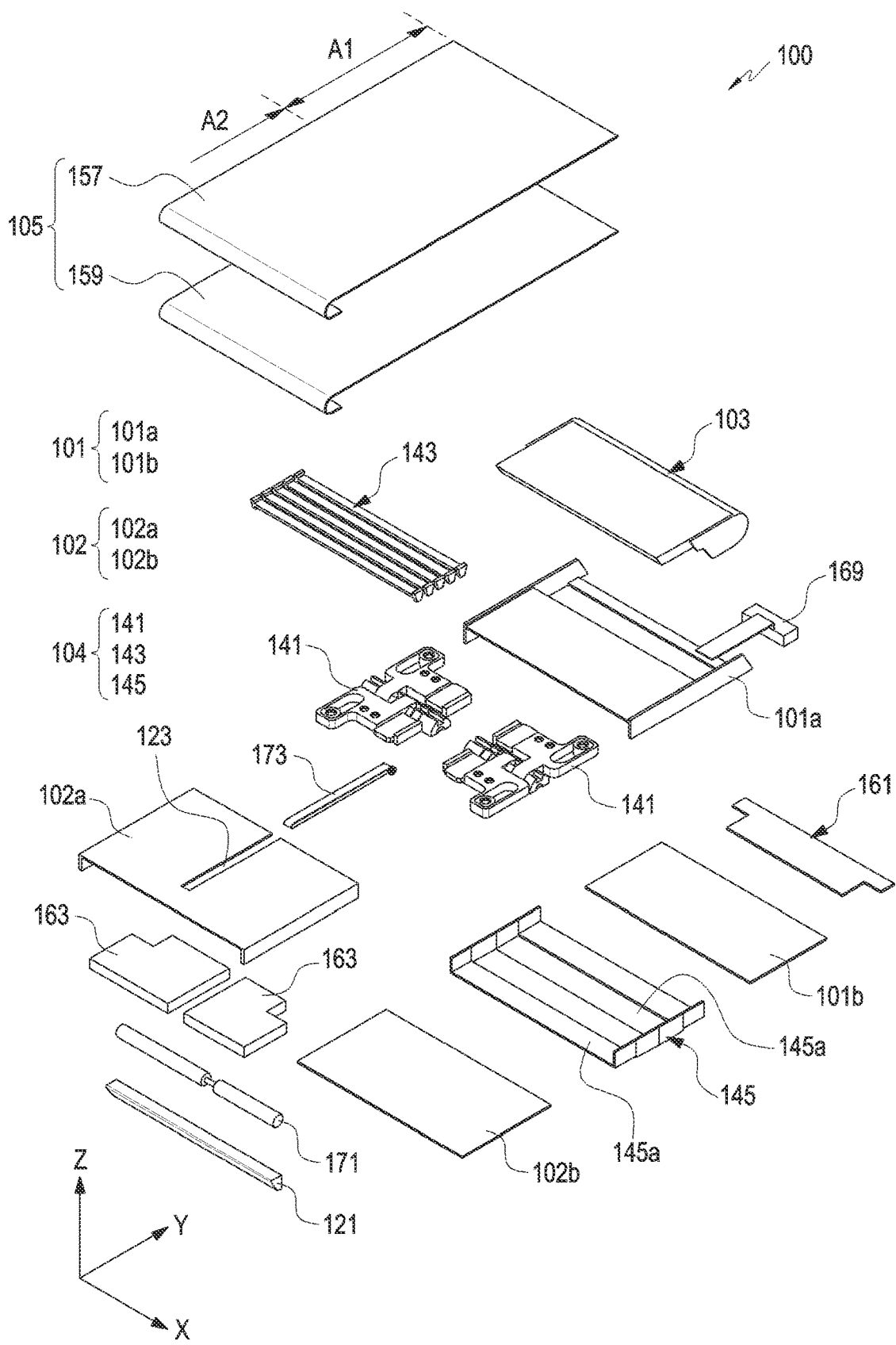
FIG. 3 is an exploded perspective view illustrating an electronic device according to an embodiment of the disclosure.

Referring to FIGS. 1 and 2, an electronic device 100 may include a first housing 101 and a second housing 102 rotatably coupled to each other, a third housing 103 (e.g., a sliding housing) slidably coupled to the first housing 101, and/or a flexible display 105. In an embodiment of the disclosure, the flexible display 105 may include a first area A1 disposed on the third housing 103 and a second area A2 extending from the first area A1. The second area A2 may be disposed through the first housing 101 to the second housing 102. In another embodiment of the disclosure, as the third housing 103 slides, the second area A2 may slide on the first housing 101 and/or the second housing 102. A portion of the second area A2 may be selectively received in the second housing 102. According to an embodiment of the disclosure, the first area A1 may be interpreted as including an area disposed on the third housing 103 and an area sliding on the first housing 101. For example, the first area A1 illustrated in FIG. 1 may be partially disposed on the third housing 103, and the remaining portion of the first area A1 may slide on the first housing 101. As such, it should be noted that the division of the flexible display 105 into the 'first area A1' and the 'second area A2' is for the sake of brevity of description, and various embodiments of the disclosure are not limited thereto. For example, in some embodiments of the disclosure, an area (e.g., the attachment area AA of FIG. 13 or 15) disposed on the third housing 103, of the flexible display, may be defined as the 'first area A1', and the remaining area may be defined as the 'second area A2'.

According to various embodiments of the disclosure, the first housing 101 and/or the second housing 102 may receive at least a portion of the flexible display 105 on the front surface thereof and may include a rear plate(s) 101b or 102b disposed on the rear surface. In the space between the flexible display 105 and the rear plates 101b and 102b (e.g., inside the first housing 101 and/or the second housing 102), a plurality of electrical components may be included, such as a circuit board (e.g., the printed circuit board 161 of FIG. 3), various sensor modules (e.g., the optical module 169 of FIG. 3), a battery (e.g., the battery 163 of FIG. 3), an audio input/output module, a camera module, a haptic module, an antenna, and/or a connecting terminal.

According to various embodiments of the disclosure, the first housing 101 and the second housing 102 may be coupled to each other to be rotatable between a first position (e.g., the state illustrated in FIG. 1) in which they are disposed to face each other and a second position (e.g., the state illustrated in FIG. 2) in which they are unfolded at a designated angle (e.g., 180) from the first position. Here, the 'first position' may be defined as a position in which the first housing 101 and the second housing 102 are folded to face each other regardless of whether the third housing 103 is moved. For example, as compared with FIG. 2, FIG. 1 illustrates an example of a state before the third housing 103 moves in an M1 direction. However, the 'first position' is not limited to the position of the third housing 103 illustrated in FIG. 1. Although the third housing 103 is moved in the M1 direction as illustrated in FIG. 2, if the first housing 101 and the second housing 102 are folded to face each other, it may be defined as the 'first position'. The 'second position' may be defined as a position in which the second housing 102 is rotated to be unfolded parallel to one side of the first housing 101 (under the first housing in FIG. 2) regardless of whether the third housing 103 is moved. For example, as compared with FIG. 1, FIG. 2 illustrates an example of a state in which the third housing 103 is moved in the M1 direction. However, the 'second position' is not limited to the position of the third housing 103 illustrated in FIG. 2. Even before the third housing 103 moves in the M1 direction, if the first housing 101 and the second housing 102 are aligned side by side, the state may be defined as the 'second position'.

According to various embodiments of the disclosure, the electronic device 100 may further include a hinge structure 104 disposed between the first housing 101 and the second housing 102. The hinge structure 104 may be disposed or coupled to one edge of the first housing 101 and may couple the second housing 102 to one edge of the first housing 101. In some embodiments of the disclosure, the hinge structure 104 may provide at least one folding axis F. The first housing 101 and/or the second housing 102 may rotate about the folding axis F between the first position and the second position. According to an embodiment of the disclosure, the first housing 101 and/or the second housing 102 may be disposed in an inclined state with respect to each other in an intermediate position between the first position and the second position. In the intermediate position, the angle between the first housing 101 and/or the second housing 102 may be appropriately selected by the user. In the illustrated embodiment of the disclosure, a configuration provided with one folding axis F is exemplified. However, various embodiments of the disclosure are not limited thereto. According to an embodiment of the disclosure, a folding axis of the first housing 101 and a folding axis of the second housing 102 may be disposed in parallel to each other, spaced apart at a designated interval (e.g., disposed at the second points P2-1 and P2-2 of FIG. 11).

According to various embodiments of the disclosure, the third housing 103 may be coupled to the other side of the first housing 101 and may slide along the length direction on the first housing 101 while being guided by the first housing 101. For example, FIG. 1 illustrates an example in which the third housing 103 is partially received or hidden by the first housing 101, and FIG. 2 illustrates an example in which the third housing 103 slides in the length direction, e.g., the M1 direction so that the hidden portion in FIG. 1 is exposed to the external space. In one embodiment of the disclosure, as the rotating operation of the second housing 102 and the sliding operation of the third housing 103 are independent of each other, the electronic device 100 may be deformed in various shapes. For example, in the state illustrated in FIG. 1, the third housing 103 may slide in the length direction, and/or the second housing 102 may be rotated relative to the first housing 101 to the second position while the third housing 103 remains stationary. In another embodiment of the disclosure, in the state illustrated in FIG. 2, the third housing 103 may slide in a direction opposite to the M1 direction and/or the second housing 102 may be rotated relative to the first housing 101 to the first position while the third housing 103 remains stationary. In the following detailed description, when the third housing 103 moves in the M1 direction may be referred to as a 'slide out operation', and when the third housing 103 moves in the direction opposite to the M1 direction may be referred to as a 'slide in operation'.

According to various embodiments of the disclosure, a portion of the first area A1 may be substantially attached to at least a portion of the third housing 103. Another portion of the first area A1 and the second area A2 may be disposed to be slidable on the first housing 101 and/or the second housing 102. According to an embodiment of the disclosure, the second area A2 may be disposed to at least partially face away from the first area A1 in the first position of FIG. 1 and may be disposed substantially parallel to one side of the first area A1 in the second position of FIG. 2. In another embodiment of the disclosure, the flexible display 105 may be attached to any one of the housings (e.g., the first housing 101 or the second housing 102) that rotate with respect to each other and may be disposed to be slidable on the sliding housing (e.g., the third housing 103). This is described in more detail in connection with FIGS. 19 to 23. According to an embodiment of the disclosure, in a state in which the third housing 103 is substantially received in the first housing 101 (e.g., the state illustrated in FIG. 1), a portion of the flexible display 105 (e.g., the second area A2) may be received in the second housing 102. In some embodiments of the disclosure, in a state in which the third housing 103 is moved in the M1 direction (e.g., the state illustrated in FIG. 2), the flexible display 105 (e.g., the second area A2) may be substantially exposed to the outside of the second housing 102.

According to various embodiments of the disclosure, the hinge structure 104 may include a hinge module 141 (see FIG. 3), a multi-bar assembly 143, and/or a hinge cover 145. Although the illustrated embodiment exemplifies a configuration in which the multi-bar assembly 143 is visually exposed to the outside of the electronic device 100, the multi-bar assembly 143 may be substantially hidden by the hinge cover 145. The hinge module 141 may be disposed between the first housing 101 and the second housing 102 to rotatably couple the first housing 101 and the second housing 102 and substantially provide a folding axis F. In one embodiment of the disclosure, the multi-bar assembly 143 may include a plurality of rods or bars 143a disposed substantially parallel to the folding axis F, connecting one surface of the first housing 101 and one surface of the second housing 102. For example, the multi-bar assembly 143 may be disposed between the hinge module 141 and the flexible display 105 (e.g., a portion of the second area A2). The hinge cover 145 may be disposed to face the multi-bar assembly 143 with the hinge module 141 interposed therebetween. For example, the hinge cover 145 may connect the other surface of the first housing 101 and the other surface of the second housing 102. In some embodiments of the disclosure, the hinged cover 145 may be substantially hidden by the first housing 101 and the second housing 102 in the first position and, in the second position, may be exposed from the rear surface of the electronic device 100.

According to various embodiments of the disclosure, the bars 143a of the multi-bar assembly 143 may extend in a direction parallel to the folding axis F and be arranged in a direction crossing the folding axis F and each bar 143a may be rotated with respect to another bar 143a. For example, the multi-bar assembly 143 may have a multi joint hinge structure (articulated hinge structure). The multi-bar assembly 143 may be deformed into various shapes, e.g., a flat shape and a curved shape. In one embodiment of the disclosure, the multi-bar assembly 143 may support a portion of the flexible display 105 (e.g., the second area A2) while forming a shape having a designated radius of curvature in the first position and, in the second position, be disposed to substantially form a plane with one surface of the first housing 101 and/or one surface of the second housing 102 to support a portion of the second area A2. In one embodiment of the disclosure, when the flexible display 105 is deformed into a shape having an excessively small radius of curvature, the light emitting layer or various signal lines may be damaged. The multi-bar assembly 143 may prevent the flexible display 105 from being damaged by maintaining a designated radius of curvature when the flexible display 105 is deformed.

According to various embodiments of the disclosure, the hinge cover 145 may include a plurality of cover plates 145a. The cover plates 145a may be arranged substantially parallel to the folding axis F and may be arranged along the length direction of the electronic device 100 (e.g., the M1 direction or the Y-axis direction of FIG. 3). According to an embodiment of the disclosure, in the first position, the cover plates 145a may be disposed so that each cover plate 145a substantially overlap an adjacent cover plate 145a and, in the second position, each cover plate 145a may be disposed to partially overlap an adjacent cover plate 145a. For example, an area in which the cover plates 145a are disposed may be larger in the second position than in the first position. In some embodiments of the disclosure, the cover plate 145a and/or the hinge cover 145 is configured to substantially conceal the hinge module 141 between the housings 101 and 102 (e.g., the back plates 101b and 102b). In another embodiment of the disclosure, the hinge cover 145 may include one cover plate formed of an elastic material and may be contracted in the first position and extended in the second position.

According to various embodiments of the disclosure, even when the second housing 102 is rotated between the first position and the second position, the length L (e.g., the length measured in parallel to the M1 direction in FIG. 2) from the front surface of the first housing 101 through the multi-bar assembly 143 to the front surface of the second housing 102 may remain substantially constant. For example, even when the second housing 102 is rotated, substantially no tension may be applied to the flexible display 105 in the M1 direction or the opposite direction. According to an embodiment of the disclosure, the length from the rear surface of the first housing 101 through the hinge cover 145 to the rear surface of the second housing 102 may be smaller in the second position than in the first position. This change in length (or area) at the rear surface may be substantially permitted by deformation of the hinge cover 145.

According to various embodiments of the disclosure, to keep the length L at the front surface constant, the first housing 101 and/or the second housing 102 may be moved in the direction close to or away from the folding axis F with respect to the hinge structure 104. For example, to keep the length L constant on the surface on which the flexible display 105 is disposed in the rotating operation of the second housing 102, the area of the hinge cover 145 may be changed, or the housings 101 and 102 may be moved with respect to the hinge structure 104. In another embodiment of the disclosure, to keep maintain the length L constant on the surface on which the flexible display 105 is disposed in the rotating operation of the second housing 102, the structure in which the area of the hinge cover 145 is changed and the structure in which the housings 101 and 102 are moved with respect to the hinge structure 104 may be combined. According to another embodiment of the disclosure, to keep the length L constant on the surface on which the flexible display 105 is disposed in the rotating operation of the second housing 102, the hinge structure 104 may provide a plurality of folding axes F. The spacing between the folding axes F or the relative positions of the folding axes F with respect to the flexible display 105 may be designed to differ.

According to various embodiments of the disclosure, the housings 101 and 102 may be fixed to the hinge module 141 so as not to move with respect to the hinge structure 104. In this case, when the housings 101 and 102 move toward the second position, a portion of the flexible display 105 (e.g., the second area A2) may be gradually received into the second housing 102. In a structure in which the housings 101 and 102 do not move relative to the hinge structure 104, when the housings 101 and 102 move toward the first position, a portion of the flexible display 105 (e.g., the second area A2) may be gradually drawn out from the second housing 102 to be exposed to the outside.

According to various embodiments of the disclosure, the electronic device 100 further may include a plurality of sound holes 151a, 151b, 151c, and 151d, e.g., sound output holes 151a and 151b and sound input holes 151c and 151d. The sound output holes 151a and 151b may include, e.g., a receiver hole 151a for voice calls and an acoustic radiation hole 151b for a loudspeaker. The sound input holes 151c and 151d may include a microphone hole 151c for voice calls and/or a microphone hole 151d for recording to obtain ambient sound. In the illustrated embodiment of the disclosure, the sound holes 151a, 151b, 151c, and 151d are exemplified in a configuration in which they are formed in the third housing 103 and the second housing 102, but various embodiments of the disclosure are not limited thereto, the sound holes 151a, 151b, 151c, and 151d may be formed in various positions considering the appearance or actual use environment of the electronic device 100. At least one of the exemplified sound holes may be omitted, or sound holes not shown may be added.

According to various embodiments of the disclosure, the electronic device 100 may further include an optical hole(s) 153 formed in the rear surface (e.g., the rear surface of the third housing 103). For example, an optical module (e.g., the optical module 169 of FIG. 3) aligned with the optical hole(s) 153 may be disposed inside the third housing 103. In some embodiments of the disclosure, the optical module 169 may be disposed to face away from the first area A1. In one embodiment of the disclosure, the optical module 169 may include at least one camera, an infrared projector, an infrared receiver, a flash, a proximity sensor, and/or an illuminance sensor. For example, the electronic device 100 may be configured to detect external environment information (e.g., whether an object approaches or ambient brightness information) or capture a subject through the optical hole(s) 153. The electronic device 100 may be configured to at least partially activate the flexible display 105 based on the detected environment information and, when capturing a subject, be configured to detect a distance to the subject or provide additional illumination by an infrared projector, an infrared receiver, and/or a flash. In some embodiments of the disclosure, a sensor module (not shown), such as a camera, an iris recognition sensor, a fingerprint recognition sensor, a proximity sensor, and/or an illuminance sensor may be disposed to overlap a portion of the flexible display 105 to capture the subject or detect ambient environment information through the flexible display 105. According to another embodiment of the disclosure, the electronic device 100 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a temperature sensor, or a humidity sensor.

According to various embodiments of the disclosure, the optical module 169 may capture the subject or detect environment information in a direction opposite to the first area A1 of the flexible display 105. For example, if the first area A1 outputs a screen from the front surface of the electronic device 100, the optical module 169 may operate at the rear surface of the electronic device 100. In the first position, the optical module 169 may be disposed in parallel with one side of the second housing 102 and/or the second area A2 and may capture the subject or detect environment information in substantially the same direction as the second area A2. For example, when the user shoots herself using the optical module 169, the electronic device 100 may be configured to output a live view image using the second area A2. In another embodiment of the disclosure, when the user captures a subject using the optical module 169, the electronic device 100 may be configured to output the live view image using the first area A1 and/or the first area A1 and at least a portion of the second area A2.

According to various embodiments of the disclosure, the electronic device 100 may further include at least one connector hole 155 formed in side surface(s) thereof. In the illustrated embodiment of the disclosure, the connector hole 155 is exemplified as formed in one side surface of the third housing 103, but the electronic device 100 may further include an additional connector hole not shown. In one embodiment of the disclosure, the connector hole 155 may receive or couple a cable or connector for charging, connecting to an external electronic device, and/or connecting to an audio device. In some embodiments of the disclosure, if the electronic device 100 includes functions, such as wireless charging, Bluetooth communication, Wi-Fi direct, or IrDA, the connector hole 155 may be omitted. The electronic device 100 may connect to another electronic device, such as a personal computer or a smart phone, and/or an additional device, such as a wireless charging pad or an earphone, through a wireless scheme.

Although not shown, the electronic device 100 may include at least one key input device disposed on a side surface of the first housing 101 (the second housing 102 and/or the third housing 103). The key input device may include, e.g., a volume control key, a power key, and/or a function key for activating a camera mode or a voice assistant service. In some embodiments of the disclosure, the electronic device 100 may further include a soft key provided through the flexible display 105.

According to various embodiments of the disclosure, as illustrated in FIG. 1, in the folded state of the electronic device 100 (e.g., the first housing 101 and the second housing 102), the first area A1 and the second area A2 may be disposed to face in different directions. In the folded state, the electronic device 100 may be configured to select and activate at least one of the first area A1 and the second area A2. For example, in the folded state, the electronic device 100 may be configured to activate the first area A1 in a video or Internet mode and may be configured to activate the second area A2 in a video call or selfie taking mode. If the electronic device 100 is in the folded state and the multi-tasking mode, the first area A1 and the second area A2 may be set to be simultaneously activated to output different application screens. In another embodiment of the disclosure, as illustrated in FIG. 2, in the unfolded state of the electronic device 100, the first area A1 and the second area A2 may be disposed to face in substantially the same direction. In the unfolded state, the electronic device 100 may be configured to activate substantially all of the first area A1 and the second area A2 and be configured to output a screen using the whole or selected partial area of the flexible display 105 according to the operation mode.

According to an embodiment of the disclosure, in the unfolded position, the first housing 101 and the second housing 102 may be disposed to form a designated angle, e.g., 180 degrees, therebetween. When the electronic device 100 unfolds to the designated angle, the foldable display 105 may output a screen through substantially the entire area. In some embodiments of the disclosure, the first housing 101 and the second housing 102 may be obliquely unfolded between a position (e.g., the first position illustrated in FIG. 1) in which the first housing 101 and the second housing 102 are folded to face each other and a position at a designated angle (e.g., the second position illustrated in FIG. 2). In the obliquely unfolded position, the first area A1 and the second area A2 of the flexible display 105 may output screens in different directions. For example, when unfolded obliquely, the electronic device 100 may provide screens to two users who sit facing each other. When the screen is output in the obliquely unfolded position, the screen output from the first area A1 and the screen output from the second area A2 may be the same as or different from each other.

According to an embodiment of the disclosure, in the folded state, the flexible display 105 may be substantially visually exposed to the outside. For example, the electronic device 100 may output a screen using the first area A1 and/or the second area A2. In some embodiments of the disclosure, in the standby mode, the electronic device 100 may deactivate the screen of the flexible display 105 and activate a partial area according to a designated setting. For example, in the standby mode, the electronic device 100 may at least partially activate one of the first area A1 and the second area A2 to output daily information, such as time or weather. According to another embodiment of the disclosure, in the standby mode, the electronic device 100 may activate a portion positioned corresponding to the multi-bar assembly 143 in the second area A2 to provide information about the operation state or notification information, e.g., messages or news.

In the following description, the components easy to understand from the description of the components in the above-described embodiments are denoted with or without the same reference numerals and their detailed description may be skipped.

FIG. 3 is an exploded perspective view illustrating an electronic device 100 according to an embodiment of the disclosure.

Referring to FIG. 3, an electronic device 100 may include a first housing 101, a second housing 102 rotatably connected to the first housing 101, and a third housing 103 slidably coupled to the first housing 101 and/or a flexible display 105. A hinge structure 104 may be disposed between the first housing 101 and the second housing 102 to rotatably couple the first housing 101 and the second housing 102. The flexible display 105 may be partially attached to any one of the first housing 101, the second housing 102, and/or the third housing 103, and the remaining portion of the flexible display 105 may be disposed to slide on the housings 101, 102, and 103 or deformable into a curved shape or flat shape.

According to an embodiment of the disclosure, the first housing 101 may include a first housing member 101a and a first rear plate 101b coupled to the first housing member 101a. The second housing 102 may include a second housing member 102a and a second rear plate 102b coupled to the second housing member 102a. The first housing 101 and the second housing 102 may have substantially the same structure and may partially differ depending on the electric components disposed therein. For example, the third housing 103 may be disposed in the first housing 101 at an end or edge away from the folding axis (e.g., the folding axis F of FIG. 1 or FIG. 2) and, in the second housing 102, a structure for guiding the entry/exit of the flexible display may be disposed. Accordingly, at least portions of the ends or edges of the first housing 101 and the second housing 102 may have different shapes or structures. In some embodiments of the disclosure, either of the rear plates 101b and 102b may be provided with an optical module and/or an optical hole, not shown. The first housing 101 and the second housing 102 may partially have different shapes depending on the placement of another component, such as an optical module.

According to various embodiments of the disclosure, the first housing member 101a substantially forms the appearance of the electronic device 100 (e.g., the first housing 101) and may include a flat shape portion supporting the flexible display 105 and may form at least a portion of the side surface of the electronic device 100. The first housing member 101a may include a metal and/or a polymer. According to an embodiment of the disclosure, the first housing 101a may be electrically connected with a processor or a communication module of the electronic device 100. For example, the first housing member 101a may at least partially include a metal and/or an electrically conductive material, thereby serving as an antenna of the electronic device 100. In some embodiments of the disclosure, at least a portion of the first housing member 101a (e.g., a portion forming a side surface of the electronic device 100) may include various coating layers, thereby providing a decorative effect on the appearance of the electronic device 100 or an electrically insulating structure.

According to an embodiment of the disclosure, the first rear plate 101b may be formed by laminated or colored glass, ceramic, polymer, metal (e.g., aluminum, stainless steel (STS), or magnesium), or a combination of at least two thereof). In some embodiments of the disclosure, the first rear plate 101b may be formed substantially integrally with the first housing member 101a. According to an embodiment of the disclosure, the first rear plate 101b may at least partially include a curved area. For example, an edge portion of the first rear plate 101b adjacent to the first housing member 101a may include a portion that is bent towards the front surface (e.g., the surface where the foldable display 105 is disposed) of the electronic device 100 and seamlessly extended. In another embodiment of the disclosure, the first rear plate 101b may be disposed to be inclined with respect to the first area A1 of the flexible display 105. For example, the distance between the first area A1 of the flexible display 105 and the first rear plate 101b may gradually decrease away from the folding axis F of FIG. 2.

According to various embodiments of the disclosure, the third housing 103 may be slidably coupled to the first housing 101 and may be partially received in or exposed outside of the first housing 101 according to the sliding operation. In an embodiment of the disclosure, the electronic device 100 may further include a printed circuit board 161 on which a processor, a memory, and/or an interface are disposed. The printed circuit board 161 may be disposed inside the first housing 101 while being mounted on the third housing 103. Although not shown, in addition to the printed circuit board 161, various electrical components, such as a haptic module, camera module, sensor module(s) and/or connecting terminals, may be provided in the first housing 101 (or the second housing 102).

According to various embodiments of the disclosure, the second housing 102 may include a second housing member 102a and a second rear plate 102b. According to an embodiment of the disclosure, a slit 123 may be formed or defined in a portion of the second housing member 102a. The configuration of the slit 123 is described with reference to FIG. 18 and, since the rest of the structure of the second housing 102 may be similar to the structure of the first housing 101, no detailed description thereof will be given. In some embodiments of the disclosure, it should be noted that since different electrical components may be disposed in the first housing 101 and/or the second housing 102 as described above, the second housing 102 may partially differ in shape or structure from the first housing 101.

According to various embodiments of the disclosure, the electronic device 100 may further include at least one battery 163, a roller 171, and/or an interlocking member 173 received in the second housing 102. The battery 163 may be a device for supplying power to at least one component of the electronic device 100. The battery 189 may include, e.g., a primary cell which is not rechargeable, a secondary cell which is rechargeable, or a fuel cell. The battery 163 may be integrally (built-in) or detachably disposed inside the electronic device 100. In some embodiments of the disclosure, the electronic device 100 may include electrical wiring (e.g., the flexible printed circuit board 261 of FIG. 9) connecting the battery 163 to the printed circuit board 161. The electrical wiring may extend from the battery 163 through the hinge structure 104 to the printed circuit board 161 inside the first housing 101.

According to various embodiments of the disclosure, the hinge structure 104 may include a hinge module 141, a multi-bar assembly 143, and/or a hinge cover rotatably coupling the second housing 102 to the first housing 101. The hinge module 141 has two different parts coupled to the first housing 101 and the second housing 102 (e.g., the housing members 101a and 102a), respectively, providing at least one folding axis (e.g., the folding axis F of FIG. 1 or 2).

According to various embodiments of the disclosure, the hinge module 141 may allow the first housing 101 and the second housing 102 to interlock with each other to rotate in opposite directions thereto. For example, when the first housing 101 rotate clockwise, the hinge module 141 may be configured to rotate the second housing 102 counterclockwise. In some embodiments of the disclosure, the housings 101 and 102 may move relative to the hinge module 141 in a direction approaching the folding axis F when rotating toward the first position illustrated in FIG. 1 and move relative to the hinge module 141 in a direction away from the folding axis F when rotating toward the second position illustrated in FIG. 2. For example, as the housings 101 and 102 move with respect to the hinge module 141 according to the rotating operation, tension may be prevented from being applied to the flexible display 105, and the area or length of the rear surface (e.g., the hinge cover 145 of FIGS. 2 and/or 3) of the electronic device 100 may be contracted or extended.

According to various embodiments of the disclosure, the multi-bar assembly 143 may be disposed between the hinge module 141 and the flexible display 105 and may be configured to connect the first housing 101 and the second housing 102. For example, the multi-bar assembly 143, together with the housing members 101a and 102a, may form a surface supporting the flexible display 105. As mentioned above, a plurality of bars 143a (refer to FIG. 1 or FIG. 2) forming the multi-bar assembly 143 may be arranged along the moving direction of the third housing 103 while being positioned in parallel to the folding axis F, and the multi-bar assembly 143 may be deformed into various shapes between a flat shape and a curved shape according to the relative positions of the adjacent bars 143a.

According to various embodiments of the disclosure, the hinge cover 145 may be disposed to face the multi-bar assembly 143 with the hinge module 141 interposed therebetween. For example, the hinge cover 145 may form a portion of the rear surface of the electronic device 100 and hide or protect components disposed inside the electronic device 100 and/or the hinge module 141 and the multi-bar assembly 143 on the rear surface of the electronic device 100. According to an embodiment of the disclosure, the hinge cover 145 may be formed of a combination of a plurality of cover plates 145a (see FIG. 2) or an elastic material to be contracted or extended as the first housing 101 and/or the second housing 102 rotates.

According to various embodiments of the disclosure, the roller 171 may be disposed on one edge of the second housing 102 (e.g., an edge farther from the folding axis F of FIG. 2), guiding movement or deformation of the flexible display 105 (e.g., the second area A2). In one embodiment of the disclosure, if the folding axis (e.g., the folding axis F of FIGS. 1 and/or 2) is positioned adjacent one end of the second housing 102, the roller 171 may be rotatably positioned at the other end of the second housing 102 away from the folding axis F. In another embodiment of the disclosure, the second housing 102 may further include a guide member 121 coupled to the second housing member 102a and/or the second rear plate 102b while surrounding the roller 171. The roller 171 may be disposed inside the second housing 102, a designated gap apart from the guide member 121. The flexible display 105 may be drawn in or gradually out of the second housing 102 through the gap between the roller 171 and the guide member 121. For example, when the flexible display 105 moves, the roller 171 may guide the movement of the flexible display 105 or deformation into a curved shape. According to another embodiment of the disclosure, as the roller 171 is rotatably disposed in the second housing 102, it is possible to suppress or prevent frictional force from being generated when the flexible display 105 moves.

According to various embodiments of the disclosure, the interlocking member 173 may interlock the rotation of the roller 171 and the slide of the flexible display 105 with respect to the housings 101 and 102. The interlocking member 173 may include, e.g., a flat belt, a timing belt, and/or a timing chain, and may be formed of an elastic material. The configuration of the interlocking member 173 is described in more detail in connection with FIGS. 16 to 18.

According to various embodiments of the disclosure, the electronic device 100 may include a sensor module and/or an optical module 169 disposed in the third housing 103. The optical module 169 may include, e.g., at least one camera, an infrared projector, an infrared receiver, a flash, a proximity sensor, and/or an illuminance sensor and may be disposed corresponding to the optical hole (e.g., the optical hole 153 in FIGS. 1 and/or 2) in the third housing 103.

According to various embodiments of the disclosure, the flexible display 105 may include a display panel 157 and a display protection layer 159 joined to the display panel 157. Although not shown, the flexible display 105 may further include a window layer. Further, the window layer may be disposed on one surface (e.g., a surface facing in the +Z direction) of the display panel 157. The display panel 157 may include a light emitting layer and may include an electrical circuit, such as a touch sensor. For example, the display panel 157 may be formed of organic light emitting diodes (OLEDs) or micro LEDs to output visual information, and may detect the user's direct contact to the display panel 157 or the user's motion within a certain distance. In one embodiment of the disclosure, the display protection layer 159 prevents the display panel 157 from directly contacting or interfering with a mechanical structure (e.g., the first housing 101 and/or the second housing 102) and may be slidably coupled to the housings 101 and 102. A structure in which the display protection layer 159 is fastened to the housings 101 and 102 is described again with reference to FIGS. 7 and 8. In another embodiment of the disclosure, a portion of the display protection layer 159 may be attached to the third housing 103. For example, when the third housing 103 slides with respect to the first housing 101, the flexible display 105 may slide on the first housing 101 and/or the second housing 102 while maintaining a substantially flat shape. A portion of the flexible display 105 may be deformed into a curved shape in a position corresponding to the hinge structure 104 and/or the roller 171.

According to various embodiments of the disclosure, the flexible display 105 may include a first area A1 positioned in the first housing 101 and/or the third housing 103 and a second area A2 positioned in the second housing 102. In some embodiments of the disclosure, the second area A2 may extend from the first area A1 and be disposed on the second housing 102 through the area where the hinge structure 104 is disposed and may be at least partially received inside the second housing 102. According to an embodiment of the disclosure, the first area A1 may mean a portion that substantially maintains a flat shape, and the second area A2 may mean a portion that may be at least partially deformed into a flat shape and a curved shape. As the third housing 103 slides, a portion of the second area A2 may be selectively positioned on the first housing 101. In another embodiment of the disclosure, the first area A1 may mean a portion (e.g., the attachment area AA of FIG. 13 or 15) of the flexible display 105 attached to the third housing 103, and a portion, which is positioned on the first housing 101 while maintaining a flat shape but is not attached to the third housing 103 (e.g., the first area A1 of FIG. 13 or 15 not corresponding to the attachment area) may be included in the second area A2.

Although not shown, the electronic device 100 may further include a support plate(s) disposed inside the first housing 101 and/or the second housing 102. The support plate may be formed of, e.g., a metal or polymer material. The support plate may maintain the rigidity of the electronic device 100 and/or, when containing a metal or electrically conductive material, it may provide a ground plane or electromagnetic shielding structure. In another embodiment of the disclosure, the electronic device 100 may further include an antenna (not shown) disposed inside the first housing 101 and/or the second housing 102. The antenna may be manufactured in the form of a sheet or a flat plate and be disposed on at least one of the rear plates 101*b* and 102*b* and may be used for proximity wireless communication, wireless charging and/or magnetic secure transmission.

In some embodiments of the disclosure, a processor, memory, communication module, and/or interface in the form of electrical components, e.g., integrated circuit chips or connectors, may be disposed on the printed circuit board 161. According to an embodiment of the disclosure, various electrical components may be disposed in a space other than the printed circuit board 161 in the first housing 101 and/or the second housing 102. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 100 with an external electronic device and may include a USB connector, an SD card/multimedia card (MMC) connector, or an audio connector.

Figure 4:
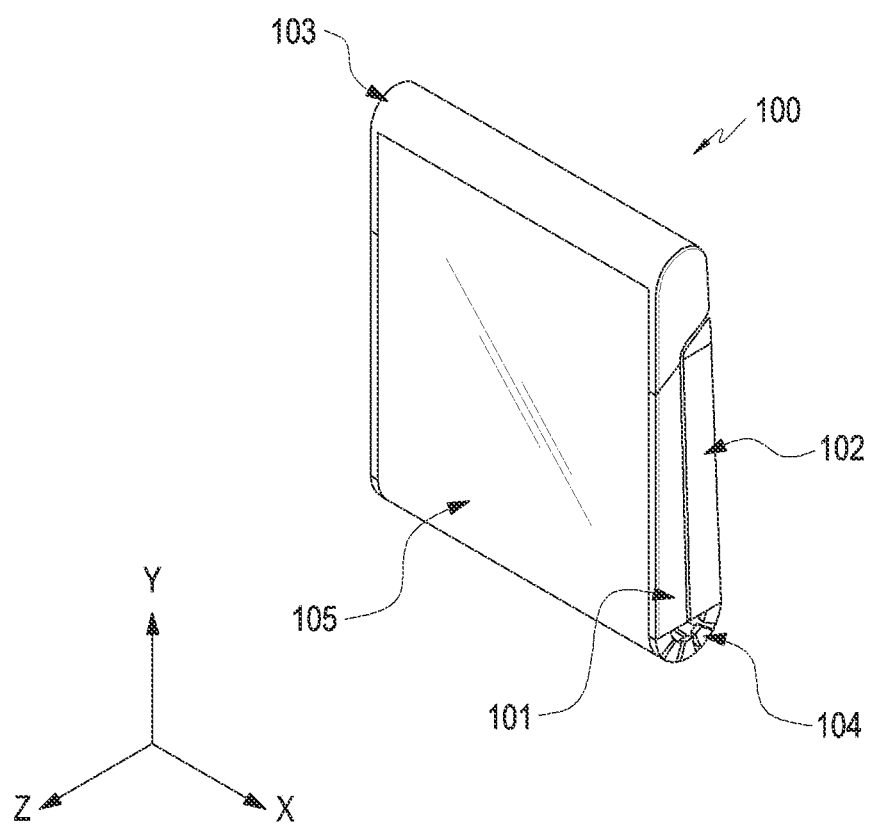
FIG. 4 is a perspective view illustrating a folded position of an electronic device according to an embodiment of the disclosure.

FIG. 4 is a perspective view illustrating a folded position of an electronic device 100 according to an embodiment of the disclosure.

Referring to FIG. 4, in the folded state (e.g., the first position illustrated in FIG. 1), the electronic device 100 may be configured to activate either the first area A1 or the second area A2. For example, while watching a video or accessing the Internet, selected one of the first area A1 and the second area A2 may be activated. In another embodiment of the disclosure, in a selfie taking mode, e.g., when the user captures herself through the optical hole 153 of FIG. 1 or the optical module 169 of FIG. 3, the electronic device 100 may be configured to activate the second area A2. In another embodiment of the disclosure, if the optical module 169 detects that an external object is positioned near the rear surface of the third housing 103 using the proximity sensor in the first position, the electronic device 100 may be configured to deactivate, at least, the second area A2 of the first area A1 and the second area A2.

According to various embodiments of the disclosure, in the slide-in state of the third housing 103, the second housing 102 (e.g., the second rear plate 102*b* of FIG. 3) may be folded to the first housing 101 to face the first housing 101 (e.g., the first rear plate 101b of FIG. 3). In the folded state and the slide-in state, a substantial portion of the second area A2 may be received in the second housing 102. Even in the folded state and the slide-in state, another portion of the second area A2 may be exposed to the external space in a direction opposite to that of the first area A1. In one embodiment of the disclosure, as the third housing 103 moves relative to the first housing 101 and slides out, a portion of the second area A2 adjacent to the first area A1 gradually moves to the front surface of the first housing 101, and the second area A2 may be gradually drawn out on the second housing 102.

Figure 5:
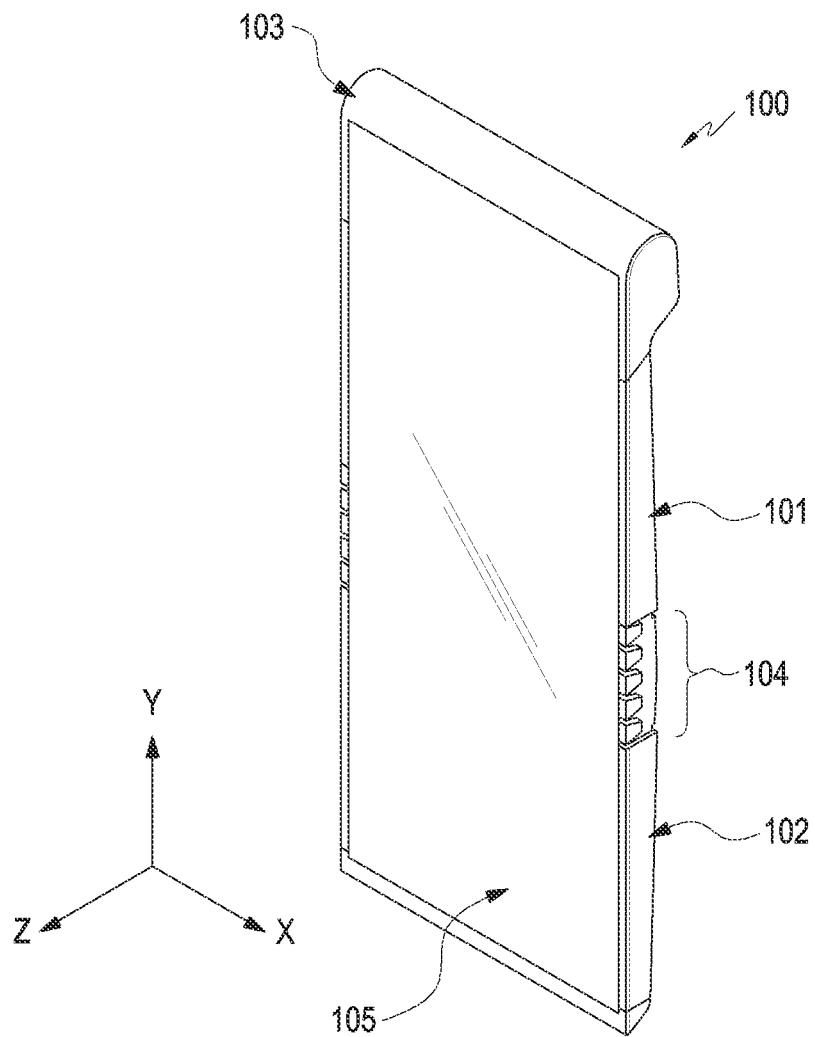
FIG. 5 is a perspective view illustrating an unfolded position of a portion of an electronic device according to an embodiment of the disclosure.
Figure 6:
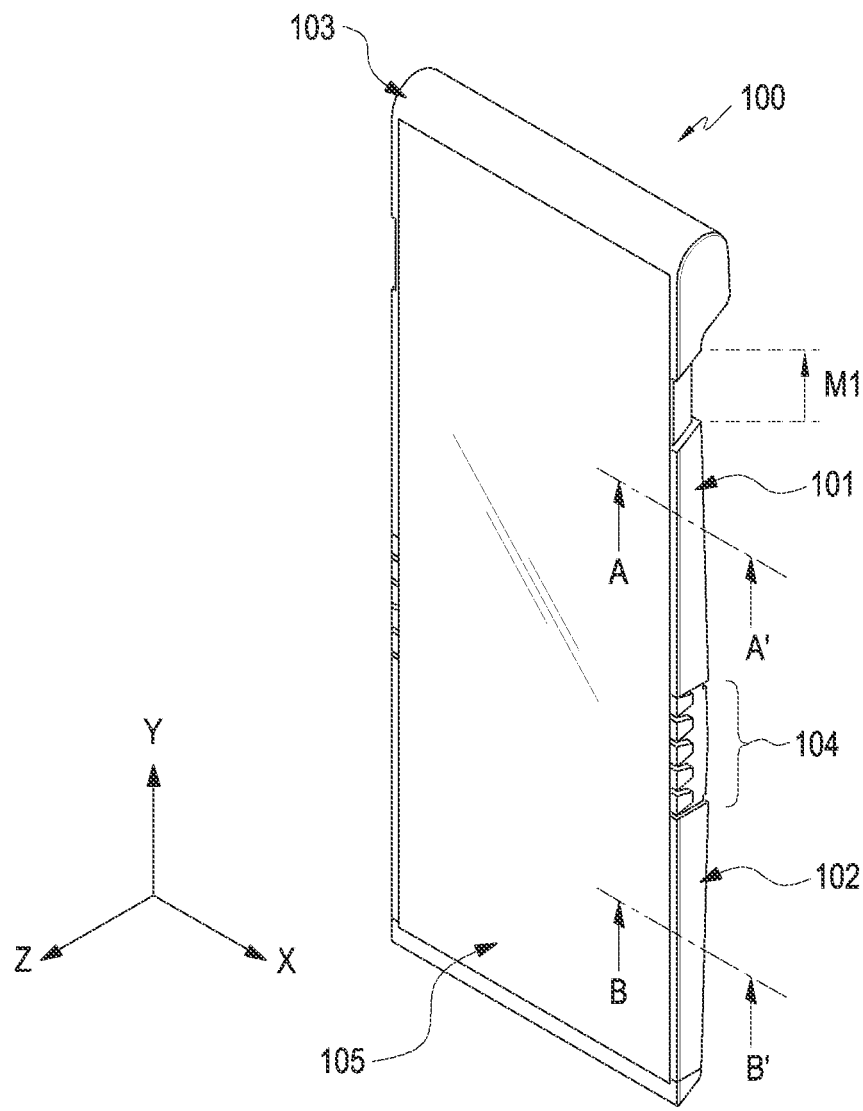
FIG. 6 is a view illustrating an unfolded position of an electronic device according to an embodiment of the disclosure.

FIG. 5 is a perspective view illustrating an unfolded position of a portion of an electronic device 100 according to an embodiment of the disclosure. FIG. 6 is a perspective view illustrating an unfolded position of an electronic device 100 according to an embodiment of the disclosure.

According to various embodiments of the disclosure, the second housing 102 may rotate with respect to the first housing 101 irrespective of the slide-in and/or slide-out state. For example, FIG. 5 illustrates a state in which the second housing 102 is rotated to the second position in the slide-in state, and FIG. 6 illustrates a state in which the second housing 102 is rotated to the second position in the slide-out state.

Referring to FIG. 5, the second area A2 is partially received inside the second housing 102, and the portion exposed to the outside may output a screen in substantially the same direction (e.g., +Z direction) as the first area A1.

Referring to FIG. 6, the second area A2 may be substantially exposed to the outside. The electronic device 100 may output a screen in the +Z direction using the entire area of the flexible display 105.

Figure 7:
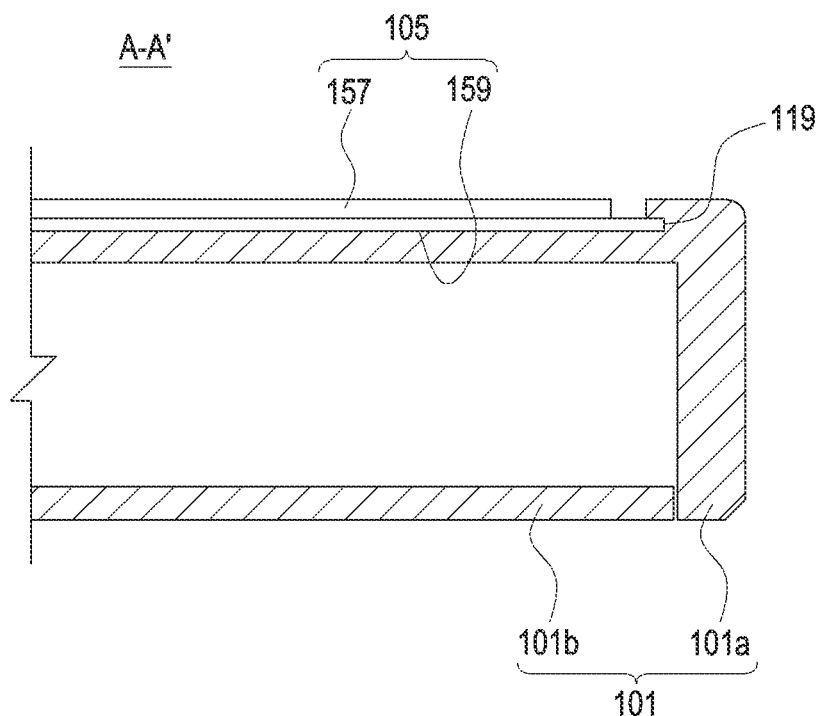
FIG. 7 is a cross-sectional view illustrating a portion of an electronic device, taken along line A-A' of FIG. 6 according to an embodiment of the disclosure.
Figure 8:
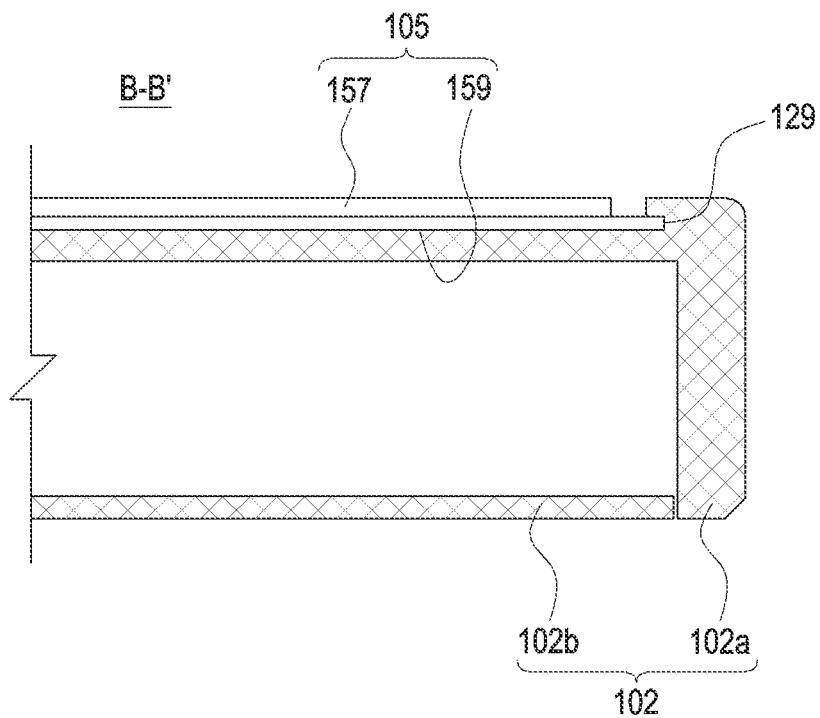
FIG. 8 is a cross-sectional view illustrating a portion of an electronic device, taken along line B-B' of FIG. 6 according to an embodiment of the disclosure.

FIG. 7 is a cross-sectional view illustrating a portion of the electronic device 100, taken along line A-A' of FIG. 6 according to an embodiment of the disclosure. FIG. 8 is a cross-sectional view illustrating a portion of the electronic device 100, taken along line B-B' of FIG. 6 according to an embodiment of the disclosure.

Referring to FIGS. 7 and 8, the first housing 101 and/or the second housing 102 may have a guide slit(s) 119 or 129 extending along the moving direction of the third housing 103 (e.g., the M1 direction of FIG. 2). The flexible display 105, e.g., the display protection layer 159, has an edge portion movably fastened to the guide slit 119 or 129 and may thus be slid on the first housing 101 and/or the second housing 102 while being guided by the guide slit 119 or 129. In one embodiment of the disclosure, the display panel 157 may be disposed a predetermined interval apart so as not to directly contact the mechanical structures of the housings 101 and 102. In another embodiment of the disclosure, as the flexible display 102 moves, the display protection layer 159 may partially rub against the housings 101 and 102. In some embodiments of the disclosure, portions of the display protection layer 159, which are in friction with the housings 101 and 102, may be coated with a material having a mechanical lubricity.

Figure 9:
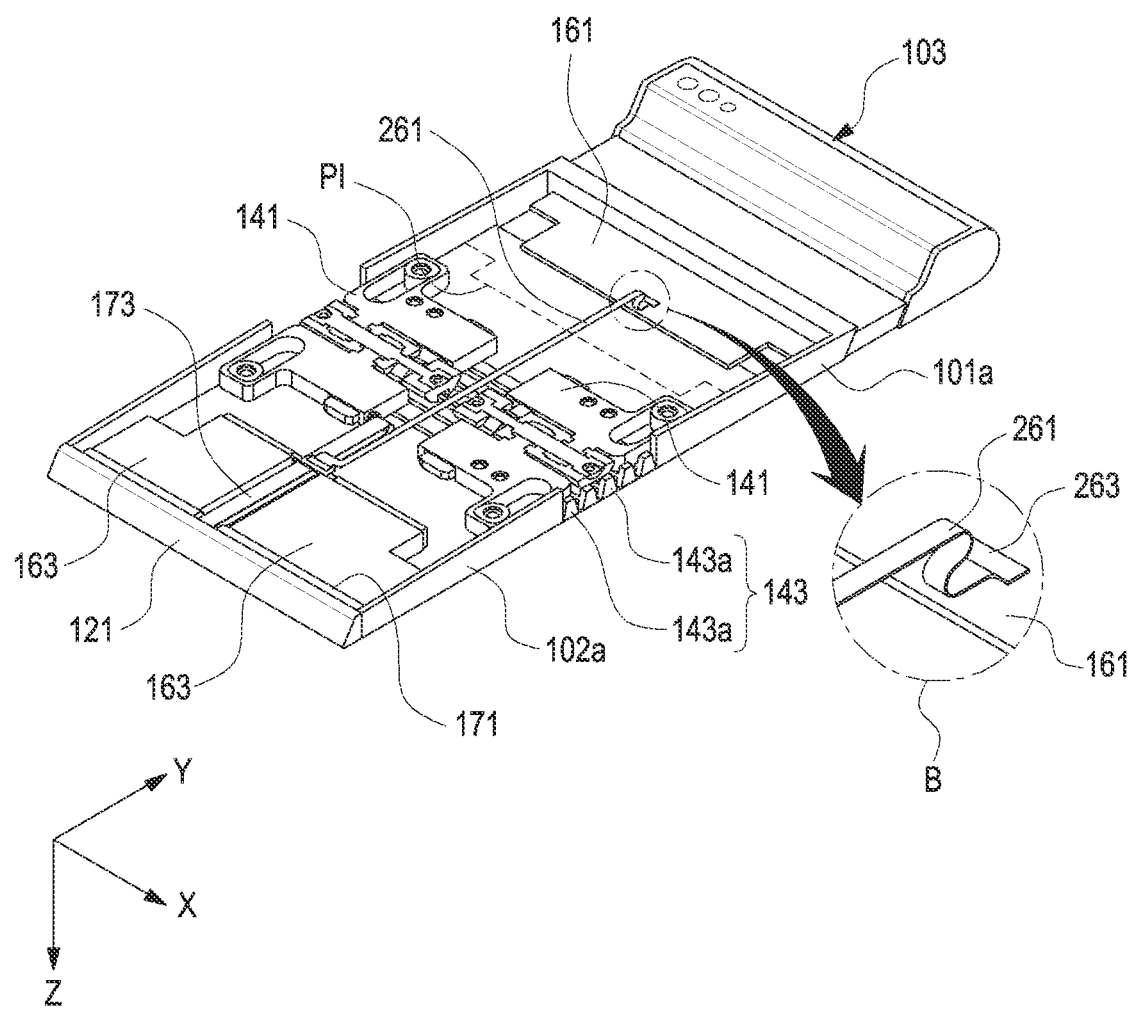
FIG. 9 is a perspective view illustrating an inside of an electronic device according to an embodiment of the disclosure.

FIG. 9 is a perspective view illustrating an inside of an electronic device according to an embodiment of the disclosure.

Referring to FIG. 9, it illustrates, e.g., a state in which the first housing 101 and the second housing 102 are in the second position and the third housing 103 is in a slide-out state. The position indicated by 'PI' denotes an edge of the printed circuit board 161 in the slide-in state. Referring to FIG. 9, the first housing 101 and the second housing 102 (e.g., the housing members 101a and 102a) may be rotatably coupled with each other through a hinge structure (e.g., the hinge structure 104 of FIG. 3), e.g., the hinge module 141, and the third housing 103 may be slidably disposed at one end of the first housing 101. The printed circuit board 161 may be mounted in the third housing 103 and, along with the third housing 103, reciprocate linearly along the length direction (e.g., Y-axis direction).

According to various embodiments of the disclosure, the multi-bar assembly 143 may be disposed between the first housing member 101a and the second housing member 102a and may include a plurality of bars 143a to, together with the first housing member 101a and/or the second housing member 102a, form a flat or curved surface supporting the flexible display 105. In some embodiments of the disclosure, the multi-bar assembly 143 may prevent the flexible display 105 from being deformed by an external force (e.g., a force according to the user's contact) in the second area A2.

According to various embodiments of the disclosure, the roller 171 may be rotatably coupled to the second housing 102 in a position adjacent to the guide member 121. At least one battery 163 may be disposed inside the second housing 102. The battery(ies) 163 may be electrically connected with the printed circuit board 161 through the flexible printed circuit board 261 disposed across the hinge structure (e.g., the multi-bar assembly 143). In one embodiment of the disclosure, the flexible printed circuit board 261 may be disposed (B) to be at least partially curved in a position adjacent to the printed circuit board 161 and, as the third housing 103 slides, the curved shape of the flexible printed circuit board 261 may be deformed.

According to various embodiments of the disclosure, the interlocking member 173 may include a flat belt, a timing belt, and/or a timing chain, and may be formed of an elastic material. In one embodiment of the disclosure, the interlocking member 173 may be disposed to surround a portion of the roller 171 and may transfer the rotational force of the roller 171 to another structure (e.g., a pulley 179 of FIG. 18) and/or rotate the roller 171 according to the movement or rotation of the other structure. In one embodiment of the disclosure, the interlocking member 173 may rotate the roller 171 when the flexible display 105 moves on the second housing 102. For example, when the flexible display 105 slides, the interlocking member 173 and the roller 171 operate, guiding the slide of the second area A2 into or out of the second housing 102.

Figure 10:
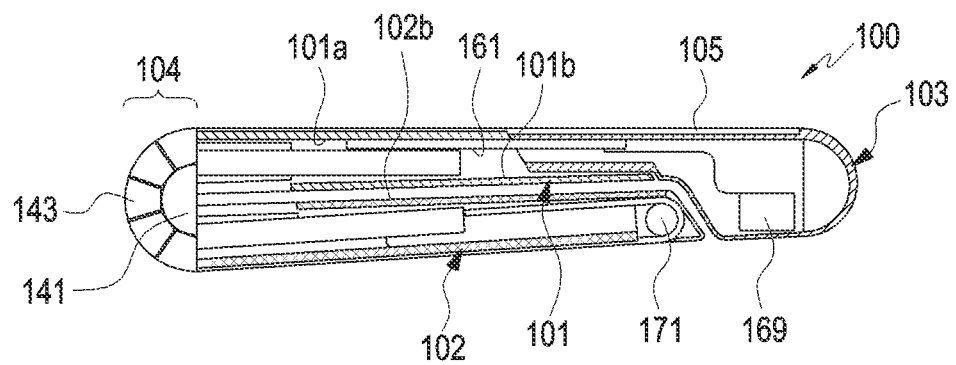
FIG. 10 is a cross-sectional view illustrating a folded position of an electronic device according to an embodiment of the disclosure.
Figure 11:
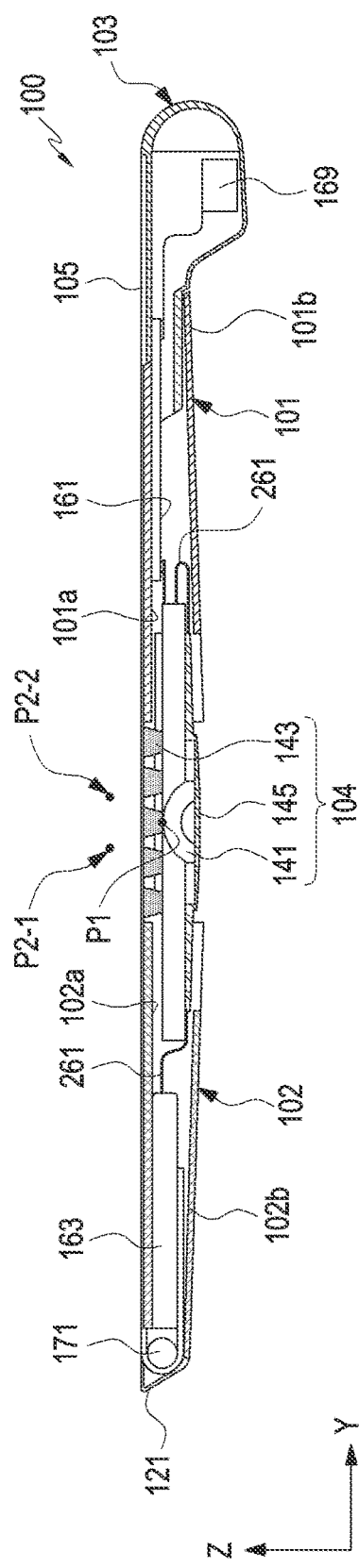
FIG. 11 is a cross-sectional view illustrating an unfolded position of a portion of an electronic device according to an embodiment of the disclosure.
Figure 12:
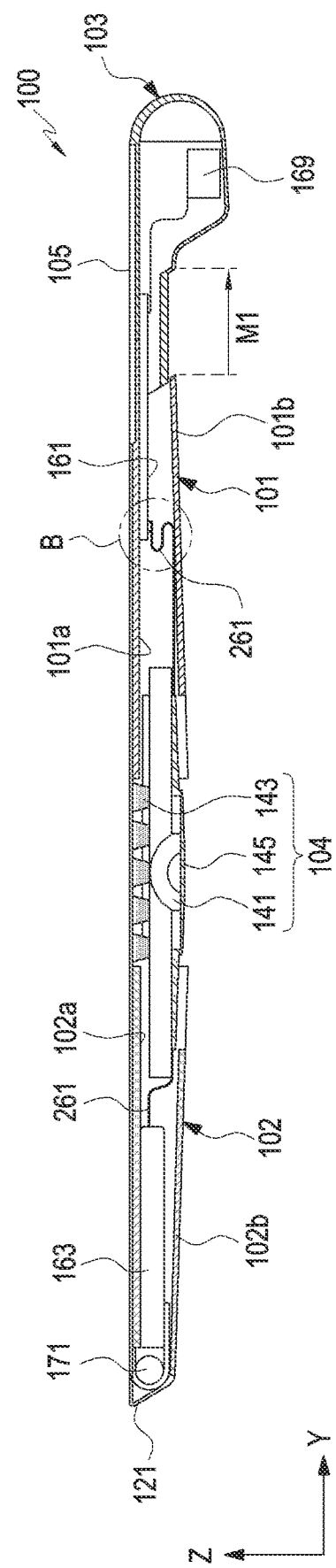
FIG. 12 is a cross-sectional view illustrating an unfolded position of an electronic device according to an embodiment of the disclosure.

FIG. 10 is a cross-sectional view illustrating a folded position of an electronic device 100 according to an embodiment of the disclosure. FIG. 11 is a cross-sectional view illustrating an unfolded position of a portion of an electronic device 100 according to an embodiment of the disclosure. FIG. 12 is a cross-sectional view illustrating an unfolded position of an electronic device 100 according to an embodiment of the disclosure.

Referring to FIG. 10, according to various embodiments of the disclosure, the flexible display 105 may provide a 4:3 ratio screen in the +Z direction. In the state illustrated in FIG. 11, the flexible display 105 may provide a 16:9 ratio screen in the +Z direction and a 21:9 ratio screen in the state illustrated in FIG. 12.

Referring to FIGS. 10 and 11, as rotating about the folding axis F, the first housing 101 and/or the second housing 102 may be moved with respect to the hinge structure 104 and may thus getting closer to or farther from the folding axis F. The movement of the housings 101 and 102 with respect to the hinge structure 104 may maintain the same length (e.g., the length L of FIG. 2) or area in which the flexible display 105 is exposed to the outside in, e.g., the folded state of FIG. 10 or the unfolded state of FIG. 11. This has been described above in connection with the configuration in which no tension is applied to the flexible display 105.

According to various embodiments of the disclosure, when the folding axis F is formed at the first point P1 of FIG. 11 (e.g., inside the electronic device 100), the housings 101 and 102 may be moved closer to or farther away from the folding axis F while rotating about the folding axis F. In another embodiment of the disclosure, when at least one folding axis F is formed at a second point P2-1 or P2-2 of FIG. 11 (e.g., outside the electronic device 100), the length (e.g., the length L of FIG. 2) or area in which the flexible display 105 is exposed to the outside may remain the same although the housings 101 and 102 are not moved with respect to the hinge structure 104 while rotating about the folding axis F. The configuration in which the first housing 101 and the second housing 102 rotate about different folding axes has been described above. As such, depending on the number or positions P1, P2-1, and P2-2 of the folding axes F, various modifications may be made to the configuration in which the housings 101 and 102 move closer to or away from the folding axes F. The configuration of moving closer or away from the folding axis F may be more clearly identified by comparing the position of the battery 163 or the position of the printed circuit board 161 in FIGS. 10 and 11.

According to various embodiments of the disclosure, since the flexible display 105 is substantially slidably disposed with respect to the first housing 101 and/or the second housing 102, the flexible display 105 may be freed from the load (e.g., tension) according to the rotation of the housings 101 and 102. For example, when the housings 101 and 102 are rotated, a portion of the flexible display 105 (e.g., the second area A2 of FIG. 2) may enter the second housing 102, and even when the length L illustrated in FIG. 2 is different from the first position illustrated in FIG. 1, no load (e.g., tension) may be applied to the flexible display 105. For example, in the electronic device 100 according to various embodiments of the disclosure, the positions and number of folding axes F and whether the housings 101 and 102 are moved with respect to the hinge structure 104 may not be limited to the above-described embodiments.

Referring to FIG. 12, from comparison between FIGS. 11 and 12, if the third housing 103 slides out in the M1 direction and/or the +Y direction in the unfolded state, the printed circuit board 161 may also move in the M1 direction and/or +Y direction inside the first housing 101. As the third housing 103 gradually moves in the M1 direction, the second area A2 may be drawn out from the second housing 102 so that the exposed area of the flexible display 105 may gradually increase in the +Z direction. According to an embodiment of the disclosure, in the flexible printed circuit board 261, the length in the Y-axis direction of the curved portion B may be smaller in the slide-out state than in the slide-in state. As the shape or size of the curved portion B is changed in a deforming operation of the electronic device 100, such as a slide of the third housing 103, a load (e.g., tension) may be prevented from being applied to the printed circuit board 261 although the distance between the battery 163 and the printed circuit board 161 is varied.

Figure 13:
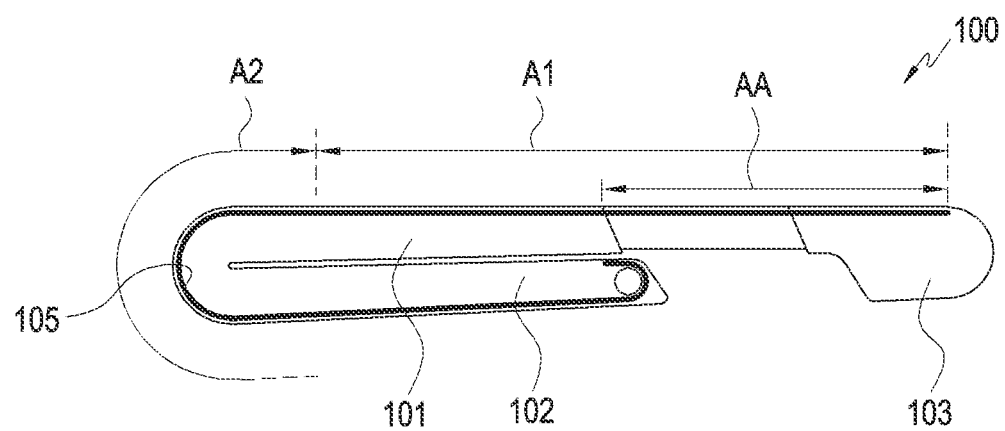
FIG. 13 is a cross-sectional view illustrating one of use states of an electronic device according to an embodiment of the disclosure.
Figure 14:
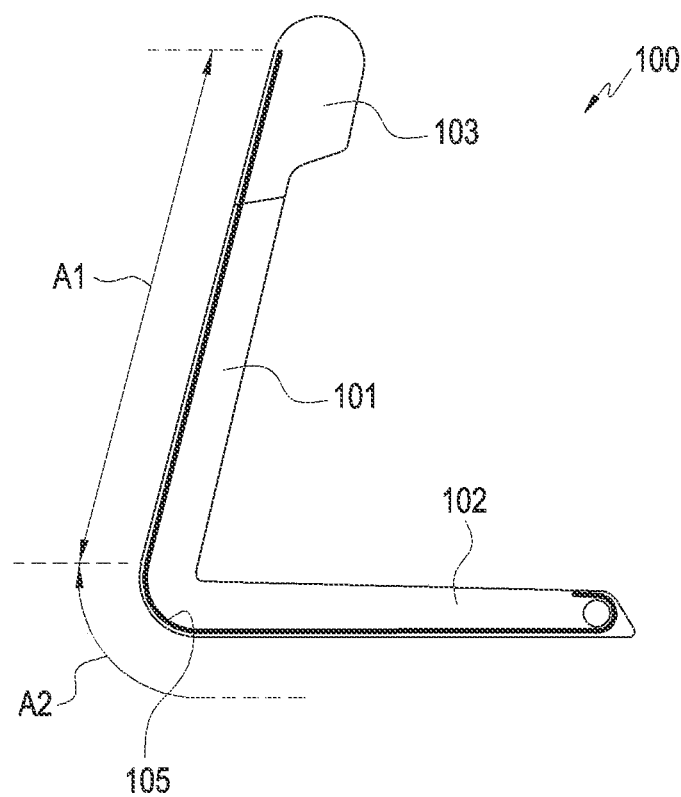
FIG. 14 is a cross-sectional view illustrating a use state of use states of an electronic device according to an embodiment of the disclosure.
Figure 15:
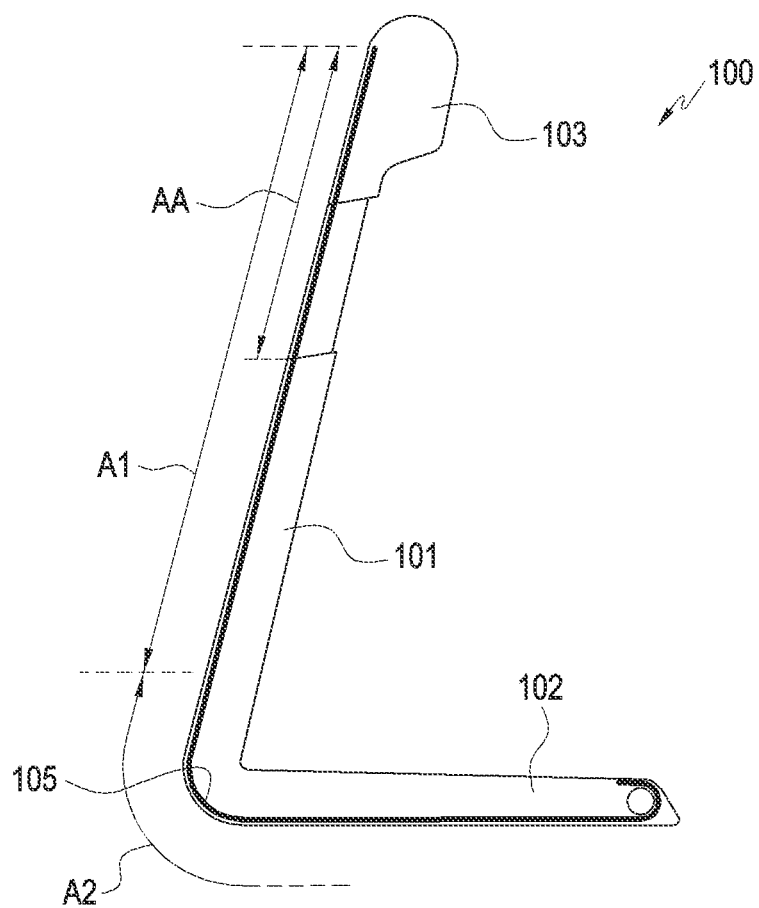
FIG. 15 is a cross-sectional view illustrating still a use state of use states of an electronic device according to an embodiment of the disclosure.

FIG. 13 is a cross-sectional view illustrating one of use states of an electronic device 100 according to an embodiment of the disclosure. FIG. 14 is a cross-sectional view illustrating a use state of use states of an electronic device 100 according to an embodiment of the disclosure. FIG. 15 is a cross-sectional view illustrating a use state of use states of an electronic device 100 according to an embodiment of the disclosure.

Referring to FIG. 13, the attachment area AA may mean an area, disposed on the third housing 103, of the flexible display 105 and may be a portion of the first area A1. In one embodiment of the disclosure, in the folded state of the first housing 101 and the second housing 102, the third housing 103 may slide out. In this state, a portion of the second area A2, along with at least a portion of the first area A1, may be positioned on the front surface of the first housing 101.

Referring to FIGS. 14 and 15, the first housing 101 and the second housing 102 may be stopped in an inclined state with respect to each other, and one of the first housing 101 and the second housing 102 may be mounted on a plane. For example, as illustrated in FIGS. 14 and 15, if the second housing 102 is mounted on a plane, the first housing 101 may be positioned in an inclined state with respect to the plane. Referring to FIG. 14, if the first housing 101 is mounted on a plane and is in the slide-in state, the electronic device 100 may be configured to output a screen using the first area A1 of the flexible display 105. Referring to FIG. 15, if the first housing 101 is mounted on a plane and is in the slide-out state, the electronic device 100 may be configured to output a screen using a portion of the first area A1 and the second area A2.

Figure 16:
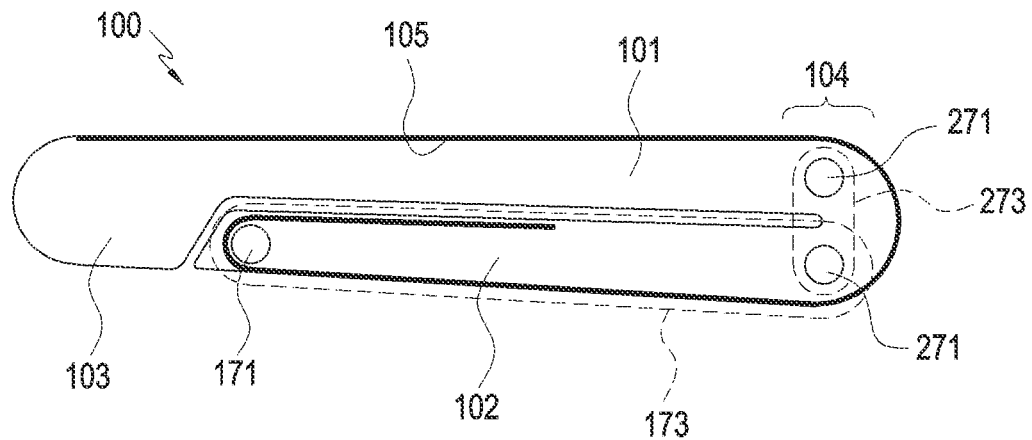
FIG. 16 is a cross-sectional view illustrating a guide structure of a flexible display in an electronic device according to an embodiment of the disclosure.

FIG. 16 is a cross-sectional view illustrating a guide structure of a flexible display in an electronic device according to an embodiment of the disclosure.

Referring to FIG. 16, the electronic device 100 may further include at least one second roller 271 disposed on and/or adjacent to the hinge structure 104. The second roller(s) 271, along with, e.g., the roller 171, may guide movement or deformation of the flexible display 105. According to an embodiment of the disclosure, in the folded state, the flexible display 105 may be deformed into a curved shape at two places. For example, in the folded state, the flexible display 105 may have curved shapes at a portion adjacent to the roller 171 and a portion adjacent to the hinge structure 104. In another embodiment of the disclosure, when the third housing 103 slides while maintaining the folded state, the rollers 171 and 271 may guide deformation or movement of at least the curved portion of the flexible display 105.

According to various embodiments of the disclosure, when the second roller 271 is included, the second roller 271, along with the roller 171, may be disposed in the second housing 102 and adjacent to the hinge structure 104. In one embodiment of the disclosure, the interlocking member 173 may be disposed to interlock the roller 171 and the second roller 271. When the plurality of second rollers 271 are included, the electronic device 100 may further include a second interlocking member 273. One of the second rollers 271 may be disposed on the second housing 102 and interlocked with the roller 171 by an interlocking member 173, and the other one of the second rollers 271 may be disposed on the first housing 101 and interlocked with the second roller 271 of the second housing 102 by the second interlocking member 273. The second interlocking member 273 may include, e.g., a flat belt, a timing belt, and/or a timing chain. In one embodiment of the disclosure, the interlocking member 173 and/or the second interlocking member 273 may interlock the roller 171 and the second roller(s) 271 to rotate in the same direction. In another embodiment of the disclosure, the electronic device 100 may further include a driving motor (not shown) for rotating at least one of the rollers 171 and 271. For example, to guide the movement or deformation of the flexible display 105 when the third housing 103 and/or the flexible display 105 slides, the electronic device 100 may rotate the rollers 171 and 271 using the driving motor.

Figure 17:
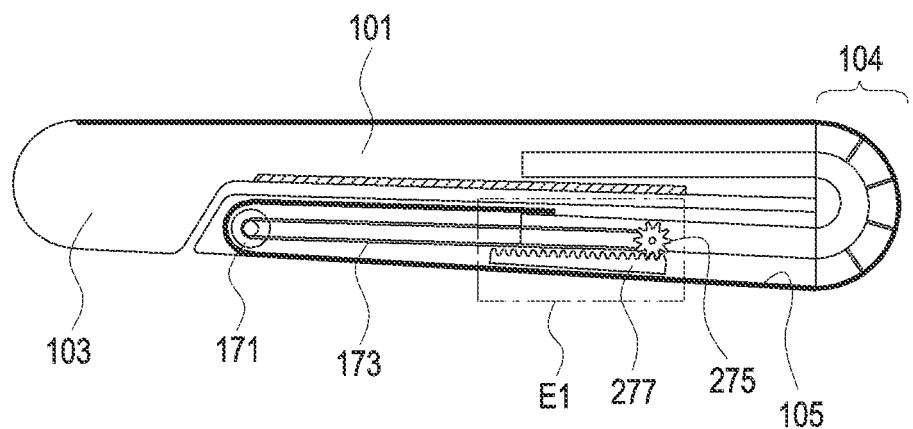
FIG. 17 is a cross-sectional view illustrating a guide structure of a flexible display in an electronic device according to an embodiment of the disclosure.
Figure 18:
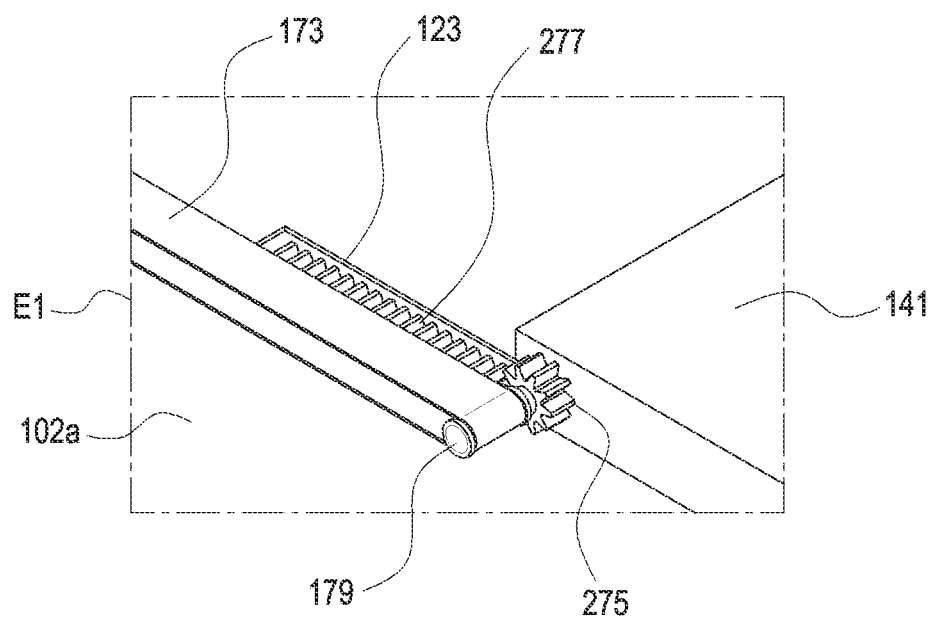
FIG. 18 is an enlarged, perspective view illustrating portion 'E1' of FIG. 17 according to an embodiment of the disclosure.

FIG. 17 is a cross-sectional view illustrating a guide structure of a flexible display 105 in an electronic device 100 according to an embodiment of the disclosure. FIG. 18 is an enlarged, perspective view illustrating portion 'E1' of FIG. 17 according to an embodiment of the disclosure.

Referring to FIGS. 17 and 18, the electronic device 100 may further include a guide structure or an interlocking structure for interlocking the slide of the flexible display 105 and the rotation of the roller 171. The interlocking structure may include rack-and-pinion gears 277 and 275 for converting rotation into linear motion and/or linear motion into rotation and/or an interlocking member (e.g., the interlocking member 173 of FIG. 3) for interlocking rotation of the pinion gear 275 and the roller 171. For example, the interlocking structure may interlock the slide of the flexible display 105 and the rotation of the roller 171.

According to various embodiments of the disclosure, the pinion gear 275 may be rotatably disposed within the second housing 102 and may include a pulley 179 provided on one side thereof. Referring to FIG. 18, the pinion gear 275 is rotatably coupled to the hinge module 141, but various embodiments of the disclosure are not limited thereto. According to an embodiment of the disclosure, the pinion gear 275 may be rotatably coupled to another structure formed in the second housing member 102a. In one embodiment of the disclosure, the rack gear 277 may be disposed on the flexible display 105 and may be engaged with the pinion gear 275 through the slit 123 (e.g., the slit 123 of FIG. 3). In another embodiment of the disclosure, the rack gear 275 may be disposed on the inner surface of the flexible display 105 in an area, maintaining a flat shape, of the flexible display 105 (e.g., the second area A2). For example, when the third housing 103 and/or the flexible display 105 slides, the rack gear 277 may linearly reciprocate on the front surface of the second housing 102.

According to various embodiments of the disclosure, the pinion gear 275 may be engaged with the rack gear 277 outside of the second housing member 102a while being disposed inside the second housing member 102a. For example, the pinion gear 275 may be positioned at a substantially fixed point with respect to the slit 123, and the rack gear 277 may be moved with respect to the slit 123 or the pinion gear 275 according to the sliding operation of the flexible display 105 or the rotation of the pinion gear 275. In the illustrated embodiment of the disclosure, the slit 123 extends in one direction as does the rack gear 277, but it should be noted that various embodiments of the disclosure are not limited thereto. For example, the slit 123 may be sized so that the pinion gear 275 may partially protrude outside the second housing member 102a (e.g., an area or space in which the rack gear 277 is disposed) and, when viewed from inside of the second housing member 102a, the rack gear 277 may be substantially invisible.

According to various embodiments of the disclosure, as the interlocking member 173 is disposed to surround a portion of the roller 171 and the pulley 179, the roller 171 and the pulley 179 may rotate in substantially the same direction. For example, if the roller 171 rotates, the pinion gear 275 rotates to slide the rack gear 277 and/or the flexible display 105 on the second housing 102. When the rack gear 277 and/or the flexible display 105 slide on the second housing 102, the pinion gear 275 may be rotated, rotating the roller 171. As such, the interlocking structure may slide the flexible display 105 with respect to the second housing 102 in at least a section between the roller 171 and the point where the rack gear 277 is disposed. In some embodiments of the disclosure, the ratio of the rotation angle of the roller 171 to the moving distance of the rack gear 277 may be set so that no load is applied to the flexible display 105 in the section between the roller 171 and the point where the rack gear 277 is disposed. For example, the speed at which the flexible display 105 enters the second housing 102 or is drawn out of the second housing 102 may be substantially the same as the speed at which the rack gear 277 moves.

Figure 19:
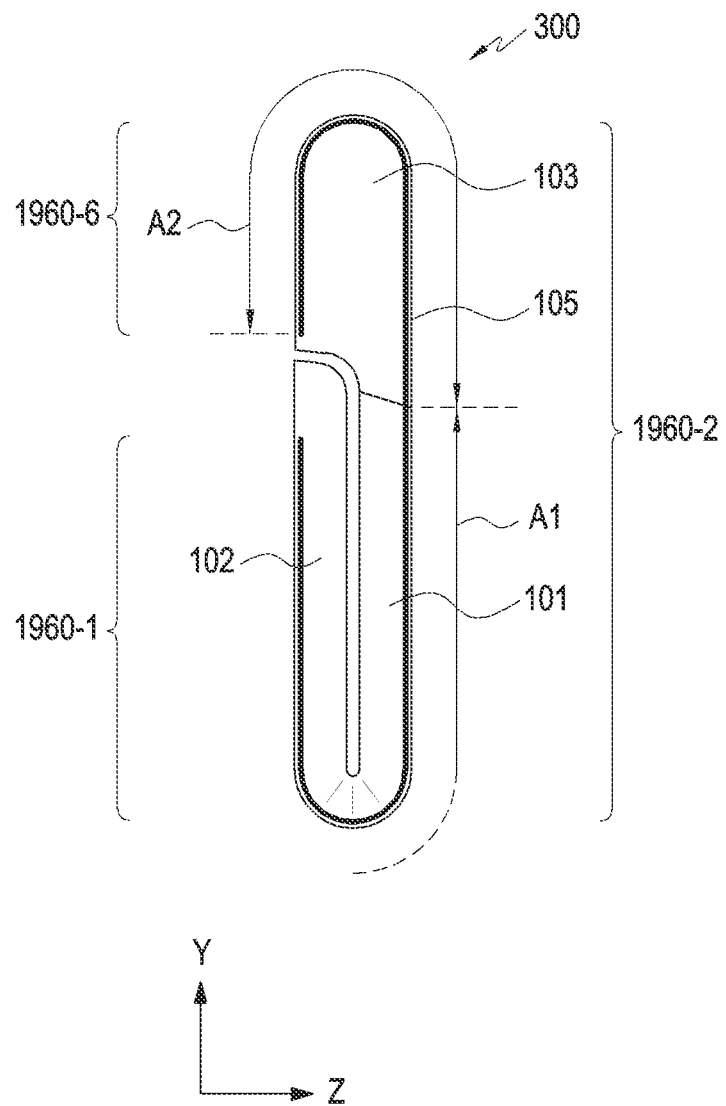
FIG. 19 is a cross-sectional view illustrating an electronic device according to an embodiment of the disclosure.
Figure 20:
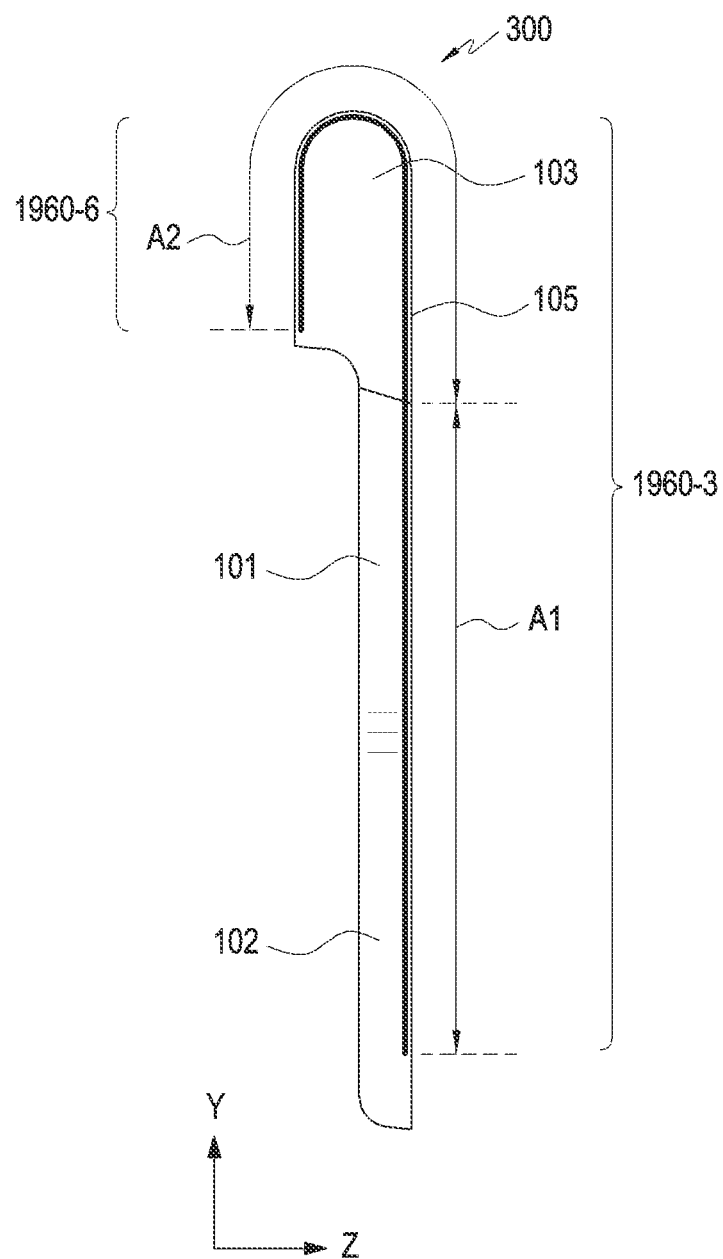
FIG. 20 is a cross-sectional view illustrating one of use states of the electronic device of FIG. 19 according to an embodiment of the disclosure.
Figure 21:
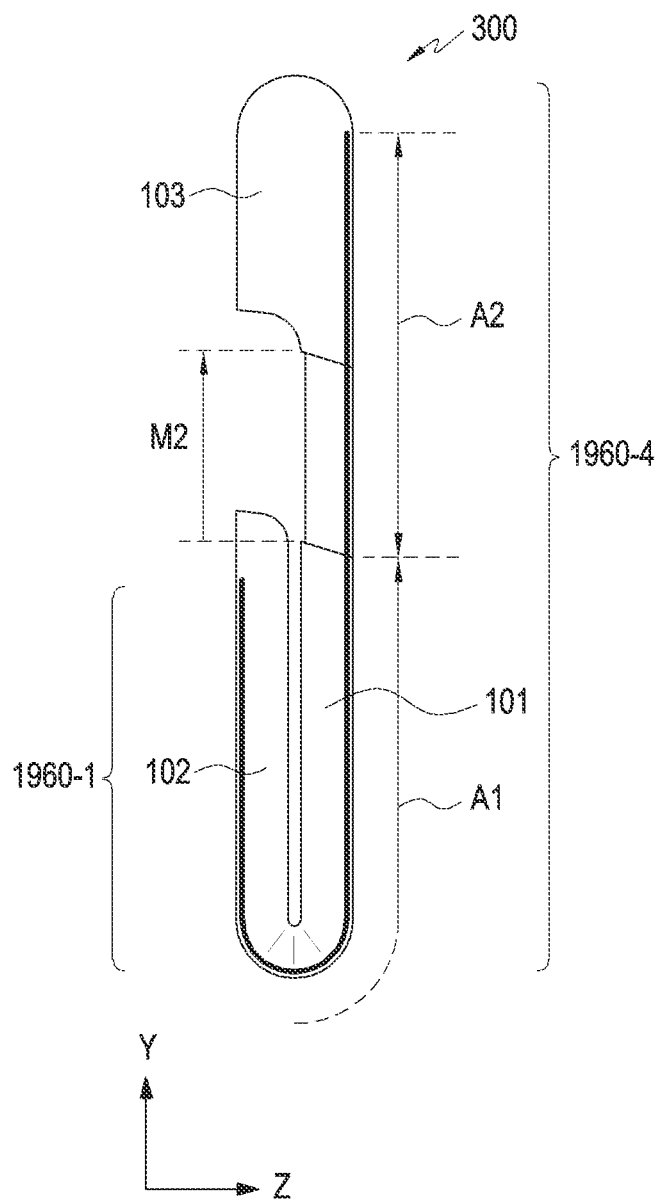
FIG. 21 is a cross-sectional view illustrating a use state of use states of an electronic device of FIG. 19 according to an embodiment of the disclosure.
Figure 22:
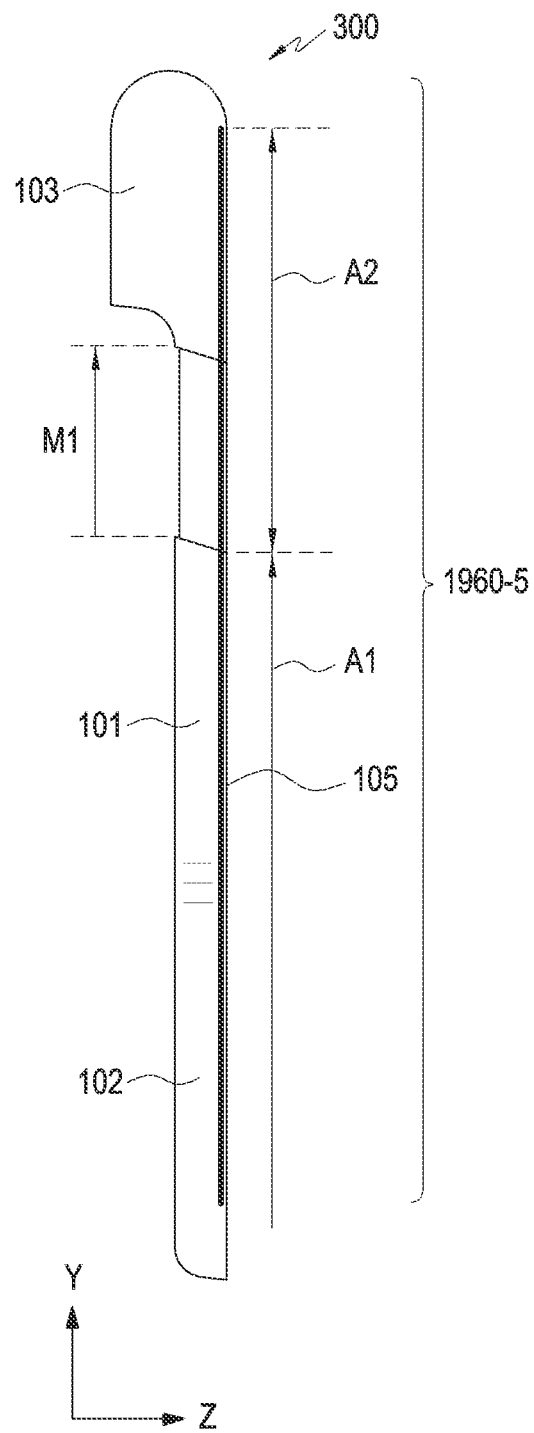
FIG. 22 is a cross-sectional view illustrating a use state of use states of the electronic device of FIG. 19 according to an embodiment of the disclosure.
Figure 23:
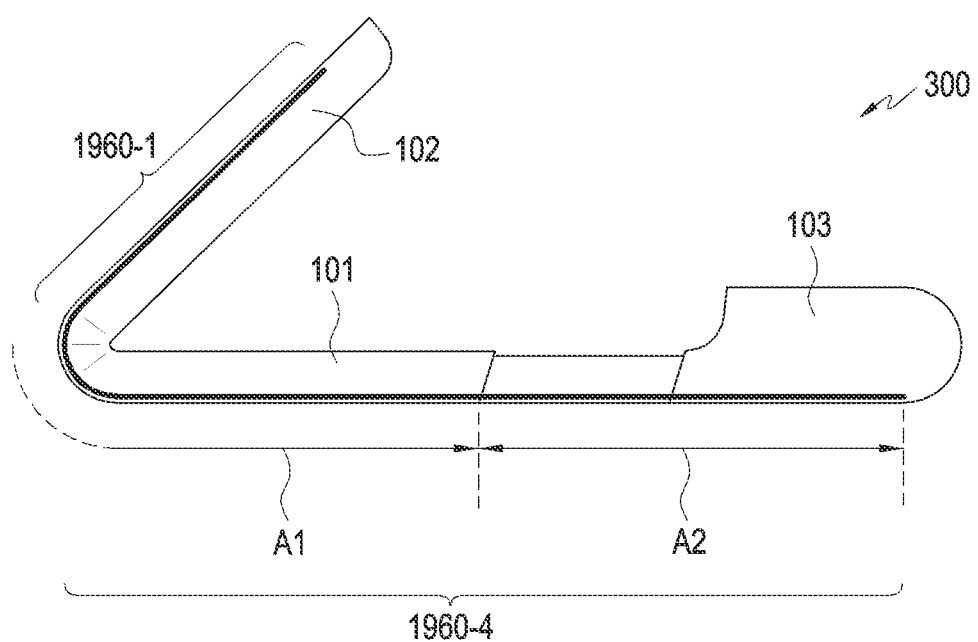
FIG. 23 is a cross-sectional view illustrating a use state of use states of the electronic device of FIG. 19 according to an embodiment of the disclosure.

FIG. 19 is a cross-sectional view illustrating an electronic device (e.g., the electronic device 100 of FIGS. 1 to 6) according to an embodiment of the disclosure. FIG. 20 is a cross-sectional view illustrating one of use states of an electronic device of FIG. 19 according to an embodiment of the disclosure. FIG. 21 is a cross-sectional view illustrating a use state of use states of an electronic device of FIG. 19 according to an embodiment of the disclosure. FIG. 22 is a cross-sectional view illustrating a use state of use states of an electronic device of FIG. 19 according to an embodiment of the disclosure. FIG. 23 is a cross-sectional view illustrating a use state of use states of an electronic device of FIG. 19 according to an embodiment of the disclosure.

Referring to FIGS. 19 to 23, an electronic device 300 may include a first housing 101, a second housing 102, a third housing 103, and/or a flexible display 105. The illustrated electronic device 300 may be different from the electronic device 100 of FIGS. 1 to 6 in the placement or operation of the flexible display 105. The structure or arrangement of the first housing 101, the second housing 102, and/or the third housing 103 may be similar to the above-described embodiment. Therefore, in the instant embodiment of the disclosure, no detailed description is given of the configuration of the housings 101, 102, and 103, and placement of the flexible display 105 or deformation of the flexible display 105 according to the deformation of the electronic device 300 (e.g., a folded/unfolded state and/or a slide-in/out state) is described below.

According to various embodiments of the disclosure, the flexible display 105 may include a first area A1 disposed on the first housing 101 and/or the second housing 102 and a second area A1 disposed on the third housing 103. As exemplified in FIGS. 19 and 21, in the folded state, a portion of the first area A1 may be disposed to face in the −Z direction and another portion thereof may be disposed to face in the +Z direction. In the folded state, still another portion of the first area A1 may have a curved shape between the portion facing in the −Z direction and the portion facing in the +Z direction. As illustrated in FIGS. 20 and 22, when the first housing 101 and/or the second housing 102 are rotated to be in an unfolded state, the first area A1 may be disposed to face substantially in the +Z direction.

According to various embodiments of the disclosure, as illustrated in FIGS. 19 and 20, in the slide-in state, the second area A2 may be disposed to substantially surround the third housing 103 so that a portion of the second area A2 may be disposed to face in the −Z direction, and the remaining portion of the second area A2 may be disposed to face in the +Z direction. As illustrated in FIGS. 21 and 22, in the slide-out state, the second area A2 may be disposed to substantially face in the +Z direction. For example, as the third housing 103 slides with respect to the first housing 101, the second area A2 may slide with respect to the third housing 103. In some embodiments of the disclosure, in the slide-in state, at least a portion of the second area A2 may be received inside the third housing 103.

According to various embodiments of the disclosure, the first housing 101 and the second housing 102 may remain stationary in an inclined state with respect to each other. For example, when one of the housings is mounted on a plane in a state in which the first housing 101 and the second housing 102 are inclined, a portion (e.g., a portion of the first area A1 of FIG. 23) of the flexible display 105 positioned in the other housing may be activated. In FIG. 23, a configuration in which the first housing 101 and/or the third housing 103 are mounted on a plane is exemplified, but it will be easily appreciated by one of ordinary skill in the art that as in FIG. 14 or 15, in the electronic device 300 of FIG. 23, the second housing 102 may be mounted on a plane.

Although not shown, the electronic device 100 may further include a sensor (e.g., the optical hole 153 or optical module 169 of FIGS. 1 to 3) disposed adjacent to the flexible display 105 on the surface where the flexible display 105 is disposed. For example, a sensor (not shown) may be disposed in the second housing 102 to face in the same direction as the flexible display 105. In another embodiment of the disclosure, the flexible display 105 may be disposed on an entire surface of the second housing 102. The sensor may face in the −Z direction while being disposed in the third housing 103. In this case, the area or size of the portion of the second area A2 facing in the −Z direction on the third housing 103 may be smaller than that illustrated in the drawings.

According to various embodiments of the disclosure, according to deformed states (e.g., a folded/unfolded state and/or a slide-in/out state), the electronic device 300 may provide various operation modes. For example, in the state illustrated in FIG. 19 (e.g., a folded/slide-in state), the electronic device 300 may activate the areas of the flexible display 105 facing in the −Z direction. In this state, the electronic device 300 may be configured to output a first application screen in the first area A1 facing in the −Z direction of FIG. 19 and a second application screen in the second area A2 facing in the −Z direction. In some embodiments of the disclosure, if a sensor (e.g., a camera) is disposed in the second housing 102, in a video call, the first area A1 in the −Z direction of FIG. 19 may be configured to output the user's face, and the second area A2 in the −Z direction may be configured to output the counterpart's face.

According to various embodiments of the disclosure, in the state illustrated in FIGS. 19 to 21, the area of the flexible display 105 facing in the +Z direction may be configured to output an application screen (e.g., a video, image, document and/or file list), and the area of the flexible display facing in the −Z direction may be configured to provide a user interface, such as a slider (e.g., a slide bar and button), volume control, screen zoom in/out, and/or scroll functions. According to another embodiment of the disclosure, in the state illustrated in FIG. 21, the flexible display 105 may provide a 4:3 ratio screen in the +Z direction. In the state illustrated in FIG. 20, the flexible display 105 may provide a 16:9 ratio screen in the +Z direction and a 21:9 ratio screen in the state illustrated in FIG. 22.

According to various embodiments of the disclosure, the electronic device 300 may be configured to differently use a whole display area or a portion of the whole display area including the first area A1 and the second area A2 for each use state based on deformation of the electronic device 300.

For example, in the state illustrated in FIG. 19 (e.g., the folded/slide-in state), the electronic device 300 may identify a first display area 1960-1, a second display area 1960-2, and a sixth display area 1960-6 and may display a screen on at least a portion of the first display area 1960-1, the second display area 1960-2, and the sixth display area 1960-6.

For example, in the state illustrated in FIG. 20 (e.g., the unfolded/slide-in state), the electronic device 300 may identify the third display area 1960-3 and the sixth display area 1960-6 and may output a screen on at least a portion of the third display area 1960-3 and the sixth display area 1960-6.

For example, in the state illustrated in FIG. 21 (e.g., the folded/slide-out state), the electronic device 300 may identify the first display area 1960-1 and the fourth display area 1960-4 and may output a screen on at least a portion of the first display area 1960-1 and the fourth display area 1960-4.

For example, in the state illustrated in FIG. 22 (e.g., the unfolded/slide-out state), the electronic device 300 may identify the fifth display area 1960-5 and may output a screen on at least a portion of the fifth display area 1950-5.

For example, in the state illustrated in FIG. 23 (e.g., in a state in which one of the housings is mounted on a plane while the first housing 101 and the second housing 102 are inclined), the electronic device 300 may identify the first display area 1960-1 and may output a screen on at least a portion of the first display area 1960-1.

Figure 24:
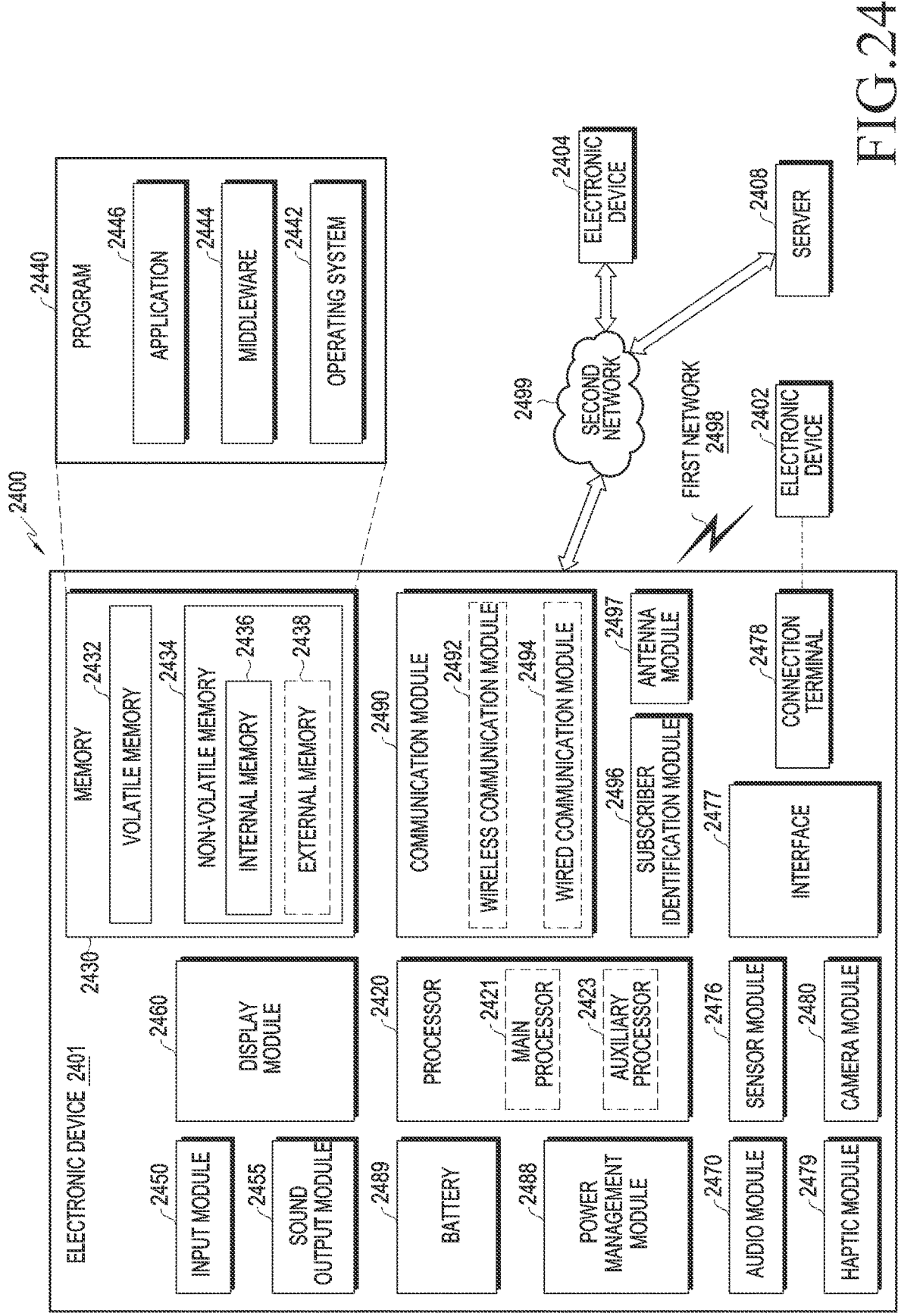
FIG. 24 is a block diagram illustrating an electronic device in a network environment according to an embodiment of the disclosure.

FIG. 24 is a block diagram illustrating an electronic device in a network environment according to an embodiment of the disclosure.

Referring to FIG. 24, an electronic device 2401 (e.g., the electronic device 100 of FIGS. 1 to 6) in the network environment 2400 may communicate with an electronic device 2402 via a first network 2498 (e.g., a short-range wireless communication network), or an electronic device 2404 or a server 2408 via a second network 2499 (e.g., a long-range wireless communication network). According to an embodiment of the disclosure, the electronic device 2401 may communicate with the electronic device 2404 via the server 2408. According to an embodiment of the disclosure, the electronic device 2401 may include a processor 2420, memory 2430, an input module 2450, a sound output module 2455, a display module 2460, an audio module 2470, a sensor module 2476, an interface 2477, a connecting terminal 2478, a haptic module 2479, a camera module 2480, a power management module 2488, a battery 2489, a communication module 2490, a subscriber identification module (SIM) 2496, or an antenna module 2497. In some embodiments of the disclosure, at least one (e.g., the connecting terminal 2478) of the components may be omitted from the electronic device 2401, or one or more other components may be added in the electronic device 101. According to an embodiment of the disclosure, some (e.g., the sensor module 2476, the camera module 2480, or the antenna module 2497) of the components may be integrated into a single component (e.g., the display module 2460).

The processor 2420 may execute, for example, software (e.g., a program 2440) to control at least one other component (e.g., a hardware or software component) of the electronic device 2401 coupled with the processor 2420, and may perform various data processing or computation. According to one embodiment of the disclosure, as at least part of the data processing or computation, the processor 2420 may store a command or data received from another component (e.g., the sensor module 2476 or the communication module 2490) in volatile memory 2432, process the command or the data stored in the volatile memory 2432, and store resulting data in non-volatile memory 2434. According to an embodiment of the disclosure, the processor 2420 may include a main processor 2421 (e.g., a central processing unit (CPU) or an application processor (AP)), or an auxiliary processor 2423 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 2401 includes the main processor 2421 and the auxiliary processor 2423, the auxiliary processor 2423 may be configured to use lower power than the main processor 2421 or to be specified for a designated function. The auxiliary processor 2423 may be implemented as separate from, or as part of the main processor 2421.

The auxiliary processor 2423 may control at least some of functions or states related to at least one component (e.g., the display module 2460, the sensor module 2476, or the communication module 2490) among the components of the electronic device 2401, instead of the main processor 2421 while the main processor 2421 is in an inactive (e.g., sleep) state, or together with the main processor 2421 while the main processor 2421 is in an active state (e.g., executing an application). According to an embodiment of the disclosure, the auxiliary processor 2423 (e.g., an image signal processor or a communication processor) may be implemented as part of another component (e.g., the camera module 2480 or the communication module 2490) functionally related to the auxiliary processor 123. According to an embodiment of the disclosure, the auxiliary processor 2423 (e.g., the neural processing unit) may include a hardware structure specified for artificial intelligence model processing. The artificial intelligence model may be generated via machine learning. Such learning may be performed, e.g., by the electronic device 2401 where the artificial intelligence is performed or via a separate server (e.g., the server 2408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2430 may store various data used by at least one component (e.g., the processor 2420 or the sensor module 2476) of the electronic device 2401. The various data may include, for example, software (e.g., the program 2440) and input data or output data for a command related thereto. The memory 2430 may include the volatile memory 2432 or the non-volatile memory 2434.

The program 2440 may be stored in the memory 2430 as software, and may include, for example, an operating system (OS) 2442, middleware 2444, or an application 2446.

The input module 2450 may receive a command or data to be used by other component (e.g., the processor 2420) of the electronic device 2401, from the outside (e.g., a user) of the electronic device 2401. The input module 2450 may include, for example, a microphone, a mouse, a keyboard, keys (e.g., buttons), or a digital pen (e.g., a stylus pen).

The sound output module 2455 may output sound signals to the outside of the electronic device 2401. The sound output module 2455 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 2460 may visually provide information to the outside (e.g., a user) of the electronic device 2401. The display module 2460 may include, for example, a display, a hologram device, or a projector and control circuitry to control a corresponding one of the display, hologram device, and projector. According to an embodiment of the disclosure, the display module 2460 may include a touch sensor configured to detect a touch, or a pressure sensor configured to measure the intensity of a force generated by the touch.

The audio module 2470 may convert a sound into an electrical signal and vice versa. According to an embodiment of the disclosure, the audio module 2470 may obtain the sound via the input module 2450, or output the sound via the sound output module 2455 or a headphone of an external electronic device (e.g., an electronic device 2402) directly (e.g., wiredly) or wirelessly coupled with the electronic device 2401.

The sensor module 2476 may detect an operational state (e.g., power or temperature) of the electronic device 2401 or an environmental state (e.g., a state of a user) external to the electronic device 101, and then generate an electrical signal or data value corresponding to the detected state. According to an embodiment of the disclosure, the sensor module 2476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2477 may support one or more specified protocols to be used for the electronic device 2401 to be coupled with the external electronic device (e.g., the electronic device 2402) directly (e.g., wiredly) or wirelessly. According to an embodiment of the disclosure, the interface 2477 may include, for example, a high definition multimedia interface (HDMI), a universal serial bus (USB) interface, a secure digital (SD) card interface, or an audio interface.

A connecting terminal 2478 may include a connector via which the electronic device 2401 may be physically connected with the external electronic device (e.g., the electronic device 2402). According to an embodiment of the disclosure, the connecting terminal 2478 may include, for example, a HDMI connector, a USB connector, a SD card connector, or an audio connector (e.g., a headphone connector).

The haptic module 2479 may convert an electrical signal into a mechanical stimulus (e.g., a vibration or motion) or electrical stimulus which may be recognized by a user via his tactile sensation or kinesthetic sensation. According to an embodiment of the disclosure, the haptic module 2479 may include, for example, a motor, a piezoelectric element, or an electric stimulator.

The camera module 2480 may capture a still image or moving images. According to an embodiment of the disclosure, the camera module 2480 may include one or more lenses, image sensors, image signal processors, or flashes.

The power management module 2488 may manage power supplied to the electronic device 2401. According to one embodiment of the disclosure, the power management module 2488 may be implemented as at least part of, for example, a power management integrated circuit (PMIC).

The battery 2489 may supply power to at least one component of the electronic device 2401. According to an embodiment of the disclosure, the battery 2489 may include, for example, a primary cell which is not rechargeable, a secondary cell which is rechargeable, or a fuel cell.

The communication module 2490 may support establishing a direct (e.g., wired) communication channel or a wireless communication channel between the electronic device 2401 and the external electronic device (e.g., the electronic device 2402, the electronic device 2404, or the server 2408) and performing communication via the established communication channel. The communication module 2490 may include one or more communication processors that are operable independently from the processor 2420 (e.g., the application processor (AP)) and supports a direct (e.g., wired) communication or a wireless communication. According to an embodiment of the disclosure, the communication module 2490 may include a wireless communication module 2492 (e.g., a cellular communication module, a short-range wireless communication module, or a global navigation satellite system (GNSS) communication module) or a wired communication module 2494 (e.g., a local area network (LAN) communication module or a power line communication (PLC) module). A corresponding one of these communication modules may communicate with the external electronic device 2404 via a first network 2498 (e.g., a short-range communication network, such as Bluetooth™, wireless-fidelity (Wi-Fi) direct, or infrared data association (IrDA)) or a second network 2499 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 2492 may identify or authenticate the electronic device 2401 in a communication network, such as the first network 2498 or the second network 2499, using subscriber information (e.g., international mobile subscriber identity (IMSI)) stored in the subscriber identification module 2496.

The wireless communication module 2492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2492 may support a high-frequency band (e.g., the mmWave band) to achieve, e.g., a high data transmission rate. The wireless communication module 2492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2492 may support various requirements specified in the electronic device 2401, an external electronic device (e.g., the electronic device 2404), or a network system (e.g., the second network 2499). According to an embodiment of the disclosure, the wireless communication module 2492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2497 may transmit or receive a signal or power to or from the outside (e.g., the external electronic device). According to an embodiment of the disclosure, the antenna module 2497 may include one antenna including a radiator formed of a conductor or conductive pattern formed on a substrate (e.g., a printed circuit board (PCB)). According to an embodiment of the disclosure, the antenna module 2497 may include a plurality of antennas (e.g., an antenna array). In this case, at least one antenna appropriate for a communication scheme used in a communication network, such as the first network 2498 or the second network 2499, may be selected from the plurality of antennas by, e.g., the communication module 2490. The signal or the power may then be transmitted or received between the communication module 2490 and the external electronic device via the selected at least one antenna. According to an embodiment of the disclosure, other parts (e.g., radio frequency integrated circuit (RFIC)) than the radiator may be further formed as part of the antenna module 2497.

According to various embodiments of the disclosure, the antenna module 2497 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 2401 and the external electronic device 2404 via the server 2408 coupled with the second network 2499. The external electronic devices 2402 or 2404 each may be a device of the same or a different type from the electronic device 2401. According to an embodiment of the disclosure, all or some of operations to be executed at the electronic device 2401 may be executed at one or more of the external electronic devices 2402, 2404, or 2408. For example, if the electronic device 2401 should perform a function or a service automatically, or in response to a request from a user or another device, the electronic device 2401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2401. The electronic device 2401 may provide the outcome, with or without further processing of the outcome, as at least part of a reply to the request. To that end, a cloud computing, distributed computing, mobile edge computing (MEC), or client-server computing technology may be used, for example. The electronic device 2401 may provide ultra low-latency services using, e.g., distributed computing or mobile edge computing. In another embodiment of the disclosure, the external electronic device 2404 may include an internet-of-things (IoT) device. The server 2408 may be an intelligent server using machine learning and/or a neural network. According to an embodiment of the disclosure, the external electronic device 2404 or the server 2408 may be included in the second network 2499. The electronic device 2401 may be applied to intelligent services (e.g., smart home, smart city, smart car, or health-care) based on 5G communication technology or IoT-related technology.

As described above, according to various embodiments of the disclosure, an electronic device (e.g., the electronic device 101 of FIGS. 1 to 6 or the electronic device 2401 of FIG. 24) may comprise a first housing (e.g., the first housing 101 of FIGS. 1 to 6), a second housing (e.g., the second housing 102 of FIGS. 1 to 6) coupled to an edge of the first housing and configured to rotate about a folding axis (e.g., the folding axis F of FIGS. 1 and/or 2) extending in a first direction (e.g., the X-axis direction of FIG. 3), a third housing (e.g., the third housing 103 of FIGS. 1 to 6) coupled to the first housing and disposed to be slidable toward or away from the folding axis, and a flexible display (e.g., the flexible display 105 of FIGS. 1 to 6) including a first area (e.g., the first area A1 of FIGS. 1 to 3) disposed on the third housing and a second area (e.g., the second area A2 of FIGS. 1 to 3) extending from the first area and disposed through the first housing to the second housing. As the third housing slides, the second area may slide on the first housing or the second housing, and a portion of the second area may be selectively received in the second housing.

According to various embodiments of the disclosure, the second housing may be configured to be pivotable between a first position (e.g., the position of FIGS. 1 and/or 4) where the second housing is disposed to face the first housing and a second position (e.g., the position of FIGS. 2, 5, and/or 6) in which the second housing is unfolded at a designated angle from the first position.

According to various embodiments of the disclosure, the second area may be disposed (e.g., refer to FIG. 13) to at least partially face away from the first area in the first position and is disposed (e.g., refer to FIGS. 2, 5, and/or 6) at least partially in parallel to a side of the first area in the second position.

According to various embodiments of the disclosure, as the second housing pivots to the second position, a portion of the second area may be gradually received in the second housing.

According to various embodiments of the disclosure, the electronic device may further comprise a sensor module (e.g., the optical module 169 of FIG. 3) disposed in the third housing and disposed to face away from the first area.

According to various embodiments of the disclosure, in the first position, at least a portion of the second area may be disposed adjacent to the sensor module.

According to various embodiments of the disclosure, in the first position, as the third housing slides, the second area may be configured to gradually expand or contract at a side of the first area.

According to various embodiments of the disclosure, the electronic device may further comprise a hinge structure (e.g., the hinge structure 104 of FIGS. 1 to 6) providing the folding axis and pivotably coupling the first housing and the second housing. The second area may be disposed to partially cross the hinge structure between the first housing and the second housing.

According to various embodiments of the disclosure, the hinge structure may include at least one hinge module (e.g., the hinge module 141 of FIG. 3), a multi-bar assembly (e.g., the multi-bar structure 143 of FIGS. 1 to 3) disposed between the hinge module and the flexible display and configured to support a portion of the second area between the first housing and the second housing, and a hinge cover (e.g., the hinge cover 145 of FIGS. 2 and/or 3) disposed to face the multi-bar assembly with the hinge module disposed therebetween.

According to various embodiments of the disclosure, the electronic device may further comprise a roller (e.g., the roller 171 of FIG. 3) rotatably mounted to an edge of the second structure. The second area may be configured to be gradually received in or exposed to an outside of the second housing while being guided by the roller.

According to various embodiments of the disclosure, the electronic device may further comprise a rack gear (e.g., the rack gear 277 of FIGS. 17 and/or 18) disposed in the second area, a pinion gear (e.g., the pinion gear 275 of FIGS. 17 and/or 18) rotatably disposed in the second housing and engaged with the rack gear, and an interlocking member (e.g., the interlocking member 173 of FIGS. 3, 17, and/or 18) interlocking rotation of the roller and the pinion gear. The pinion gear may be configured to be rotated in conjunction with the roller by the interlocking member to move the rack gear or the second area relative to the second housing.

According to various embodiments of the disclosure, the electronic device may further comprise a printed circuit board (e.g., the printed circuit board 161 of FIGS. 3 and/or 9 to 12) coupled to the third housing and disposed in the first housing, at least one battery (e.g., the battery 163 of FIGS. 3 and/or 9 to 12) disposed in the second housing, and a flexible printed circuit board (e.g., the flexible printed circuit board 261 of FIGS. 9 to 12) extending from the battery and connected to the printed circuit board.

According to various embodiments of the disclosure, the flexible printed circuit board may be disposed to be partially curved (e.g., the curved portion B of FIG. 9 or 12) and may be configured so that the curved shape of the flexible printed circuit board is deformed as the third housing slides.

According to various embodiments of the disclosure, the electronic device may further comprise at least one processor (e.g., the processor 2420 of FIG. 24) operatively connected with the flexible display. The at least one processor may be configured to identify one of a plurality of use states of the electronic device based on a deformation of the electronic device based on pivoting of the second housing and a slide of the third housing and activate at least a partial area among a plurality of display areas of the flexible display based on the use state.

According to various embodiments of the disclosure, the at least one processor may be configured to identify a running application and activate at least one display area corresponding to the identified use state and the identified application among the plurality of display areas.

According to various embodiments of the disclosure, the electronic device may further comprise a camera module (e.g., the camera module 2480 of FIG. 24). The at least one processor may be configured to recognize a user's face using the camera module and activate at least one display area corresponding to a direction in which the face is recognized and the identified use state among the plurality of display areas based on the identified use state and a result of recognition of the user's face.

According to various embodiments of the disclosure, the plurality of use states of the electronic device may include at least one of a first use state in which the third housing is slid in away from the folding axis in a folded state of the second housing with respect to the first housing, a second use state in which the third housing is slid in away from the folding axis in an unfolded state of the second housing with respect to the first housing, a third use state in which the third housing is slid out toward the folding axis in the folded state of the second housing with respect to the first housing, a fourth use state in which the third housing is slid out toward the folding axis in an unfolded state of the third housing with respect to the first housing, or a fifth use state in which the third housing is mounted on a plane in a state in which the third housing is partially unfolded to be inclined with respect to the first housing.

According to various embodiments of the disclosure, the plurality of display areas may include at least two areas among a first display area (e.g., 1960-1 of FIG. 19), a second display area (e.g., 1960-2 of FIG. 19), a third display area (e.g., 1960-3 of FIG. 19), a fourth display area (e.g., 1960-4 of FIG. 19), a fifth display area (e.g., 1960-5 of FIG. 19), or a sixth display area (e.g., 1960-6 of FIG. 19). The at least one processor may be configured to activate at least one display area among the first display area, the second display area, the third display area, the fourth display area, the fifth display area, and the sixth display area based on the use state identified among the first use state, the second use state, the third use state, the fourth use state, or the fifth use state.

According to various embodiments of the disclosure, the at least one processor may be configured to display a first video call screen on the first display area during a video call in the first use state, display a second video call screen on the third display area based on identification of a switch from the first state to the second use state, and display a third video call screen on the fifth display area based on identification of a switch from the second state to the third use state. The third video call screen may include an execution image of an application executed on the electronic device.

According to various embodiments of the disclosure, the at least one processor may be configured to display call reception notification information in the second display area when a call is received in the first use state, connect the call based on identification of a switch from the first state to the second use state, and display a call connection screen in the third display area.

Figure 25:
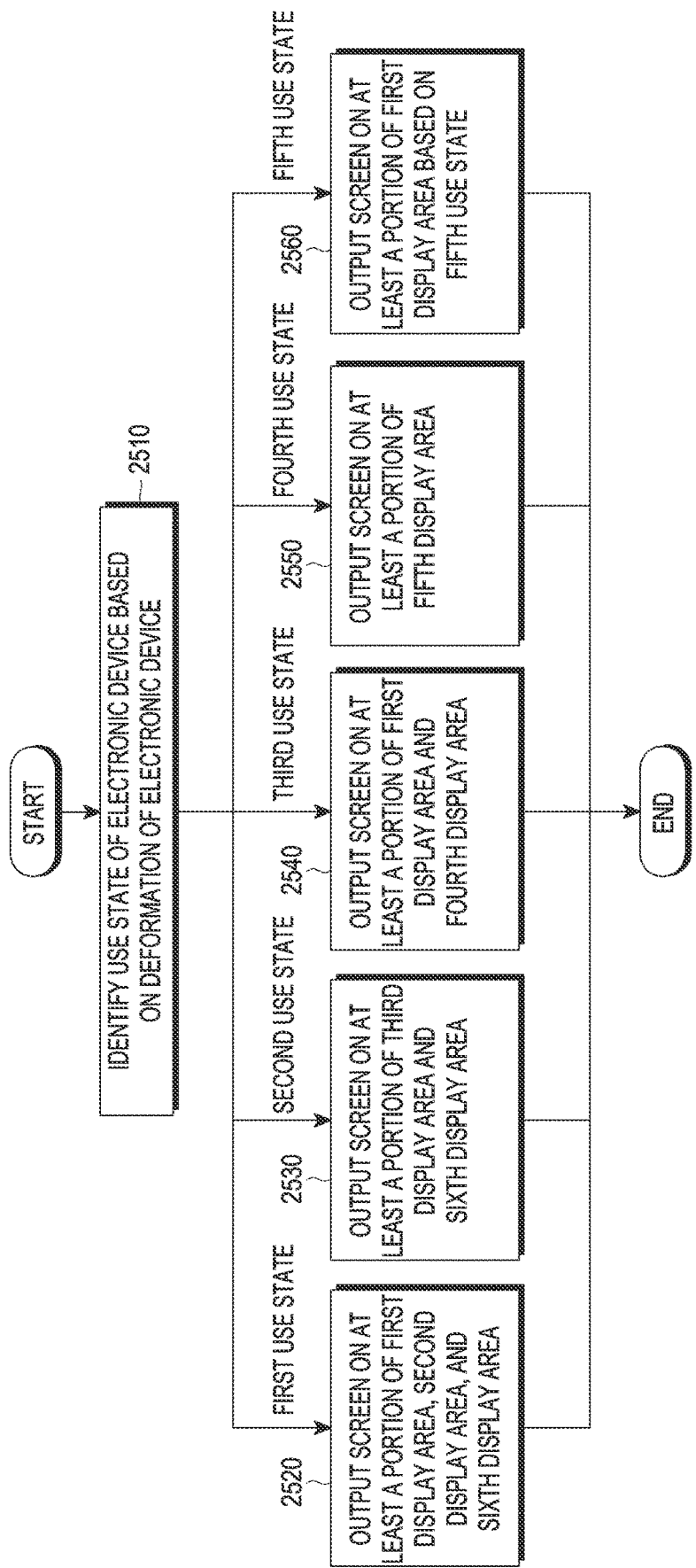
FIG. 25 is a flowchart illustrating a display control operation according to a use state of an electronic device based on deformation of an electronic device according to an embodiment of the disclosure.

FIG. 25 is a flowchart illustrating a display control operation according to a use state of an electronic device based on deformation of an electronic device according to an embodiment of the disclosure.

Referring to FIG. 25, according to an embodiment of the disclosure, a processor (e.g., the processor 2420 of FIG. 24) of an electronic device (e.g., the electronic device 100 of FIGS. 1 to 6) may perform all or some of operations 2510 to 2550.

In operation 2510, the processor 2420 according to an embodiment may identify the use state of the electronic device based on the deformation of the electronic device 2401. For example, the processor 2420 may identify the use state of the electronic device 2401 according to the deformation (e.g., a folded/unfolded state and/or a slide-in/out state) of the electronic device 2401. For example, the processor 2420 may identify whether the electronic device 2401 is in a first use state (e.g., FIG. 19) in which the electronic device 2401 is folded and slid in, a second use state (e.g., FIG. 20) in which the electronic device 2401 is unfolded and slid in, a third user state (e.g., FIG. 21) in which the electronic device 2401 is folded and slid out, a fourth use state (e.g., FIG. 22) in which the electronic device 2401 is unfolded and slid out, and a fifth use state (e.g., FIG. 23) in which the first housing 101 and the second housing 102 of the electronic device 2401 are inclined while one of the housings is mounted on a plane.

In operation 2520, the processor 2420 according to an embodiment may identify a first display area (e.g., 1960-1 in FIG. 19), a second display area (e.g., 1960-2 in FIG. 19), and a sixth display area (e.g., 1960-6 in FIG. 19) of the display module 2460 (e.g., the flexible display 105 of FIGS. 1 to 6, hereinafter, flexible display) based on the first use state (e.g., FIG. 19) and may output a screen on at least a portion of the first display area 1960-1, the second display area 1960-2, and the sixth display area 1960-6. According to an embodiment of the disclosure, the processor 2420 may output a screen on at least a portion of the first display area 1960-1, the second display area 1960-2, and the sixth display area 1960-6 based on the first use state and at least one of the running application, whether the user's face is recognized using the camera module 2480, and/or a result of illuminance sensing using the sensor module 2476. For example, the processor 2420 may select a display area based on the size of the screen to be displayed in the running application and activate (or turn on) the selected display area or output a screen on the selected display area. For example, the processor 2420 may recognize the face using the camera module 2480 and activate (or turn on) the display area corresponding to the direction of the recognized face or output a screen on the display area corresponding to the direction of the recognized face. For example, the processor 2420 may output a screen on the display area corresponding to the direction in which the user is highly likely to view (or the illuminance sensing value is high) based on the result of sensing (result of illuminance sensing) using the sensor module 2476.

In operation 2530, according to an embodiment of the disclosure, the processor 2420 may identify the third display area 1960-3 and the sixth display area 1960-6 of the display module 2460 based on the second use state (e.g., FIG. 20) and may output a screen on at least a portion of the third display area 1960-3 and the sixth display area 1960-6. According to an embodiment of the disclosure, the processor 2420 may output a screen on at least a portion of the third display area 1960-3 and the sixth display area 1960-6 based on the first use state and at least one of the running application, whether the user's face is recognized using the camera module 2480, and/or a result of illuminance sensing using the sensor module 176.

In operation 2540, the processor 2420 according to an embodiment may identify the first display area 1960-1 and the fourth display area 1960-4 of the display module 2460 based on the third use state (e.g., FIG. 21) and may output a screen on at least a portion of the first display area 1960-1 and the fourth display area 1960-4. According to an embodiment of the disclosure, the processor 2420 may output a screen on at least a portion of the first display area 1960-1 and the fourth display area 1960-4 based on the first use state and at least one of the running application, whether the user's face is recognized using the camera module 2480, and/or a result of illuminance sensing using the sensor module 2476.

In operation 2550, the processor 2420 according to an embodiment may identify the fifth display area 1560-5 of the display module 2460 based on the fourth use state (e.g., FIG. 22) and may output a screen on at least a portion of the fifth display area 1560-5. According to an embodiment of the disclosure, the processor 2420 may output a screen on at least a portion of the fifth display area 1960-5 based on the fourth use state and at least one of the running application, whether the user's face is recognized using the camera module 2480, and/or a result of illuminance sensing using the sensor module 2476.

In operation 2560, the processor 2420 according to an embodiment may identify the first display area 1960-1 of the display module 2460 based on the fifth use state (e.g., FIG. 23) and may output a screen on at least a portion of the first display area 1960-1. According to an embodiment of the disclosure, the processor 2420 may output a screen on at least a portion of the first display area 1960-1 based on the fifth use state and at least one of the running application, whether the user's face is recognized using the camera module 2480, and/or a result of illuminance sensing using the sensor module 2476.

Figure 26:
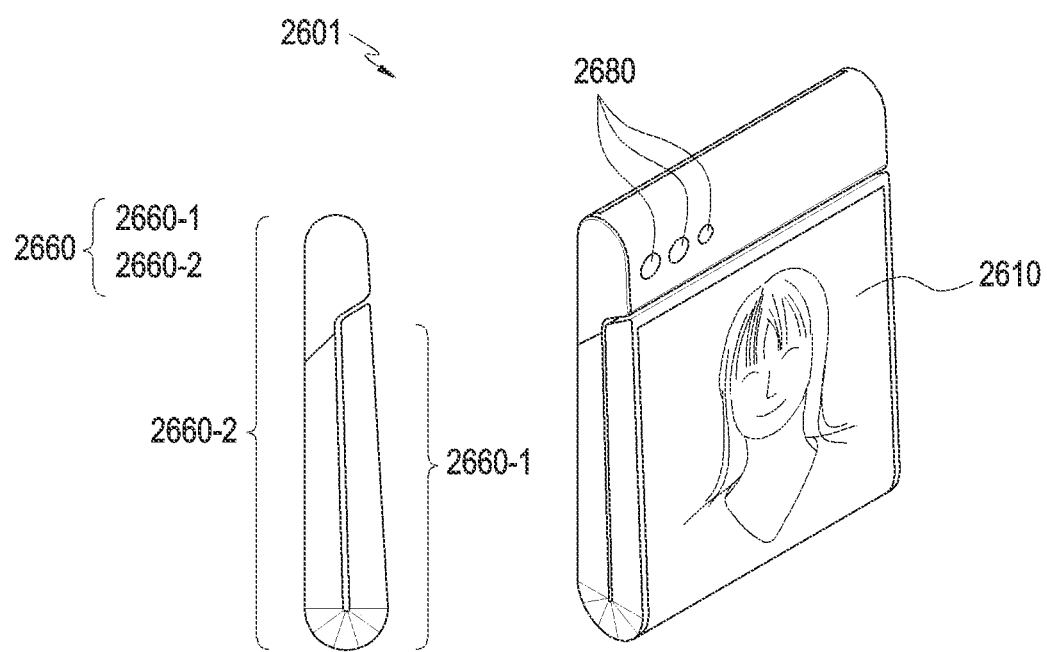
FIG. 26 is a view illustrating a screen being displayed in a first use state of an electronic device according to an embodiment of the disclosure.

FIG. 26 is a view illustrating a screen being displayed in a first use state of an electronic device according to an embodiment of the disclosure.

Referring to FIG. 26, a processor (e.g., the processor 2420 of FIG. 24) of an electronic device 2601 (e.g., the electronic device 100 of FIGS. 1 to 6 or the electronic device 2401 of FIG. 24) according to an embodiment may identify a first display area 2660-1 (e.g., 1960-1 in FIG. 19) and a second display area 2660-2 (e.g., 1960-2 in FIG. 19) of the display 2660 in the first use state. The processor 2620 of the electronic device 2601 according to an embodiment may display a captured image (e.g., a selfie image) in the first display area 2660-1 corresponding to the first surface of the first and second display areas 2660-1 and 2660-2 in a selfie taking mode using the camera module 2680 disposed on the first surface (e.g., the rear surface or the surface in the −Z direction) in the first use state. In the first use state, the processor 2420 of the electronic device 2601 according to an embodiment may display a screen of a designated application (or a screen of an application selected by the user) (e.g., a photo application, an SNS application, a scheduler application, a memo application, or other applications executable on the electronic device 2601) in the first display area 2660-1 corresponding to the first surface in the standby mode (e.g., the standby state, idle state, or power saving mode).

Figure 27A:
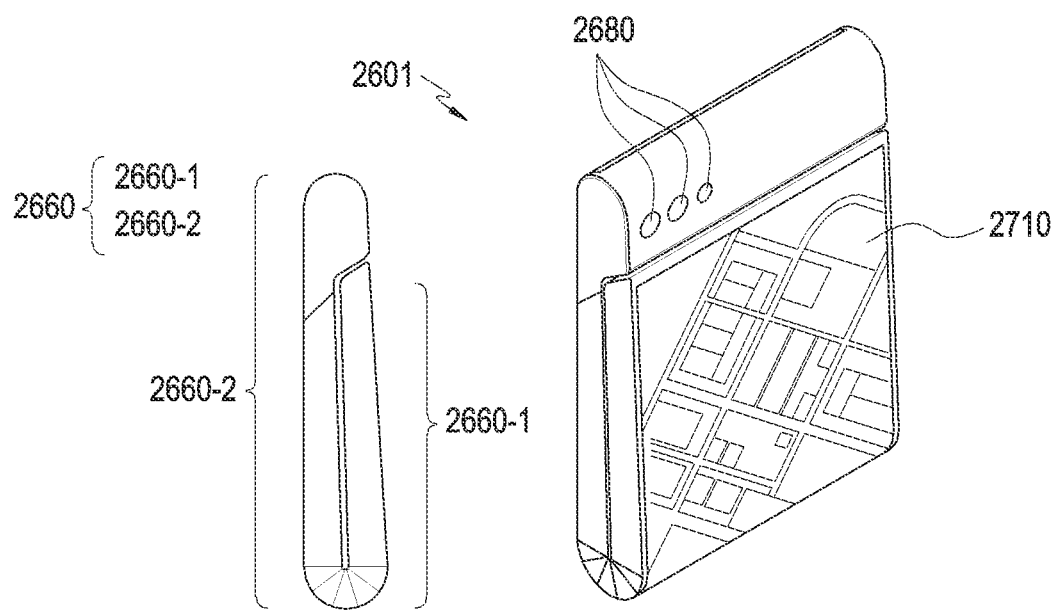
FIG. 27A is a view illustrating a first application screen being displayed on a first surface in a first use state of an electronic device according to an embodiment of the disclosure.
Figure 27B:
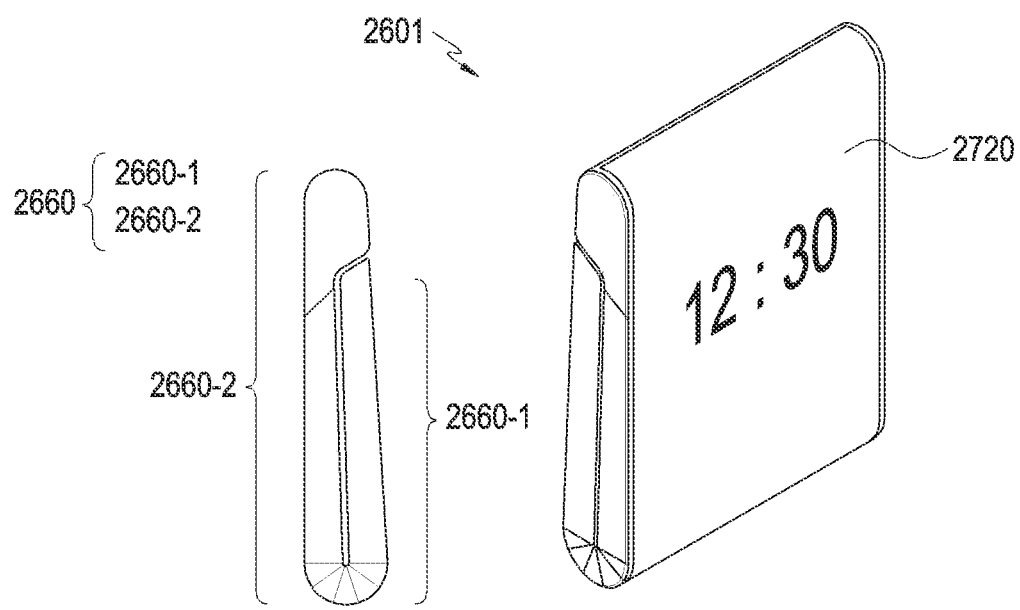
FIG. 27B is a view illustrating a second application screen being displayed on a second surface in a first use state of an electronic device according to an embodiment of the disclosure.

FIG. 27A is a view illustrating a first application screen being displayed on a first surface in a first use state of an electronic device according to an embodiment of the disclosure. FIG. 27B is a view illustrating a second application screen being displayed on a second surface in a first use state of an electronic device according to an embodiment of the disclosure.

Referring to FIG. 27A, the processor 2420 of the electronic device 2601 according to an embodiment may display a screen 2710 of a first application (e.g., a map application) on a first display area 2660-1 corresponding to a first surface (e.g., the rear surface or the surface in the −Z direction) in the first use state.

Referring to FIG. 27B, the processor 2420 of the electronic device 2601 according to an embodiment may display a screen 2720 of a second application (e.g., a clock application), different from the first application, on a second display area 2660-2 corresponding to a second surface (e.g., the front surface or the surface in the +Z direction) in the first use state.

Figure 28A:
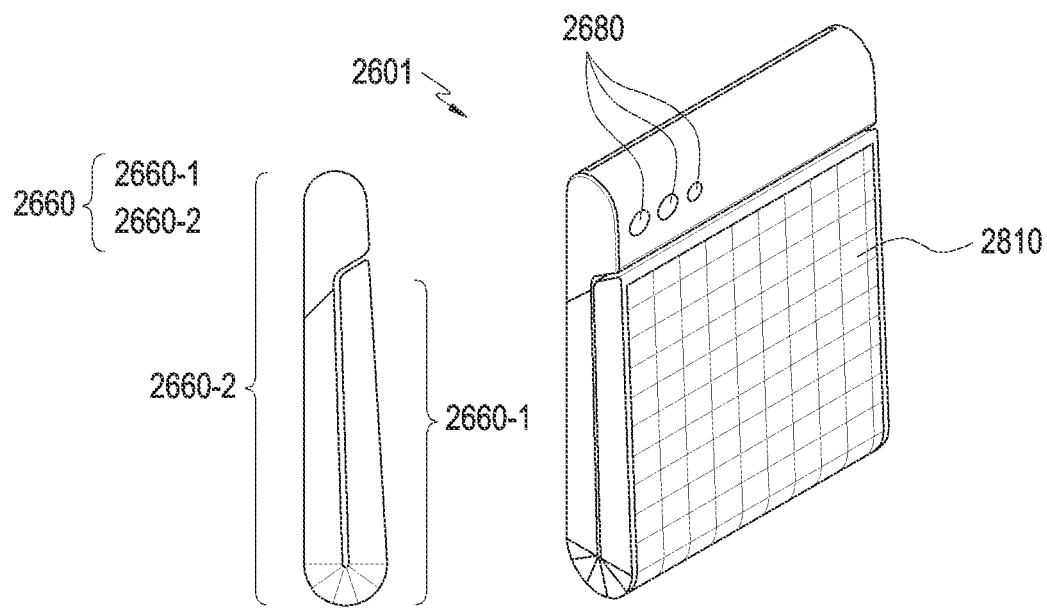
FIG. 28A is a view illustrating a first application screen being displayed on a first surface in a first use state of an electronic device according to an embodiment of the disclosure.
Figure 28B:
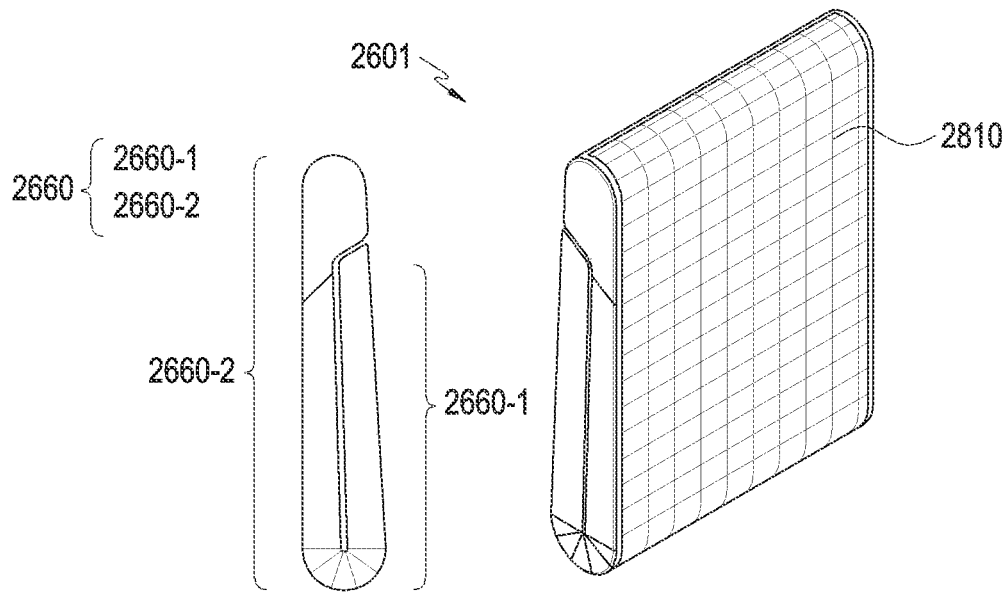
FIG. 28B is a view illustrating a same first application screen as that displayed on a first surface being displayed on a second surface in a first use state of an electronic device according to an embodiment of the disclosure.

FIG. 28A is a view illustrating a first application screen being displayed on a first surface in a first use state of an electronic device according to an embodiment of the disclosure. FIG. 28B is a view illustrating a same first application screen as that displayed on a first surface being displayed on a second surface in a first use state of an electronic device according to an embodiment of the disclosure.

Referring to FIGS. 28A and 28B, the processor 2420 of the electronic device 2601 according to an embodiment may control to display one application screen 2810 on the display area 2660 including the first display area 2660-1 corresponding to the first surface (e.g., the rear surface or the surface in the −Z direction) and the second display area 2660-2 corresponding to the second surface (e.g., the front surface or the surface in the +Z direction) in the first use state. For example, in the first use state, the processor 2420 of the electronic device 2601 according to an embodiment may display the application screen 2810 to allow the display area 2660 including the first display area 2660-1 and the second display area 2660-2 to represent an exterior design (e.g., color-material-finish (CMF)) as an exterior surface surrounding the electronic device 2601.

Figure 29A:
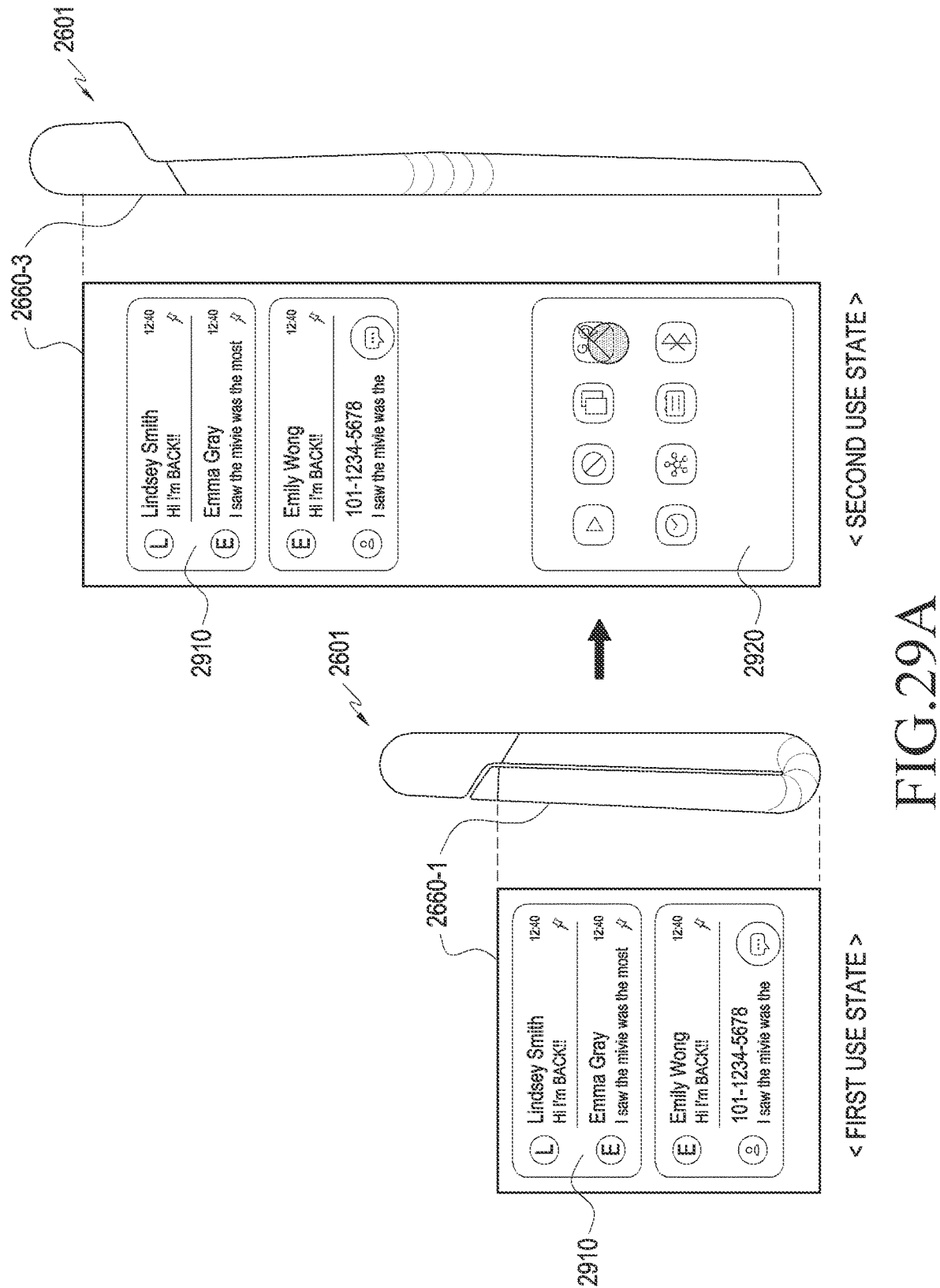
FIG. 29A is a view illustrating an electronic device switching from a first use state to a second use state according to an embodiment of the disclosure.

FIG. 29A is a view illustrating an electronic device switching from a first use state to a second use state according to an embodiment of the disclosure.

Referring to FIG. 29A, the processor (e.g., the processor 2420 of FIG. 24) of the electronic device 2601 according to an embodiment may display a screen 2910 of a first application (e.g., a contacts application) on a first display area 2660-1 corresponding to a first surface (e.g., the rear surface or the surface in the −Z direction) in the first use state (e.g., the folded/slide-in state). The processor 2420 of the electronic device 2601 according to an embodiment may identify a switch (or change) to the second use state (e.g., the unfolded/slide-in state) based on a deformation of the electronic device 2601 while displaying the screen 2910 of the first application in the first display area 2660-1 in the first use state. Based on the switch from the first use state to the second use state according to an embodiment of the disclosure, the processor 2420 of the electronic device 2601 may identify the third display area 2660-3 of the second surface (e.g., the front surface or the surface in the +Z direction) and display the screen 2910 of the first application and an application selection panel 2920 on the third display area 2660-3. For example, an icon of at least one application different from the first application may be displayed at the bottom of the screen 2910 of the first application on the application selection panel 2920.

Figure 29B:
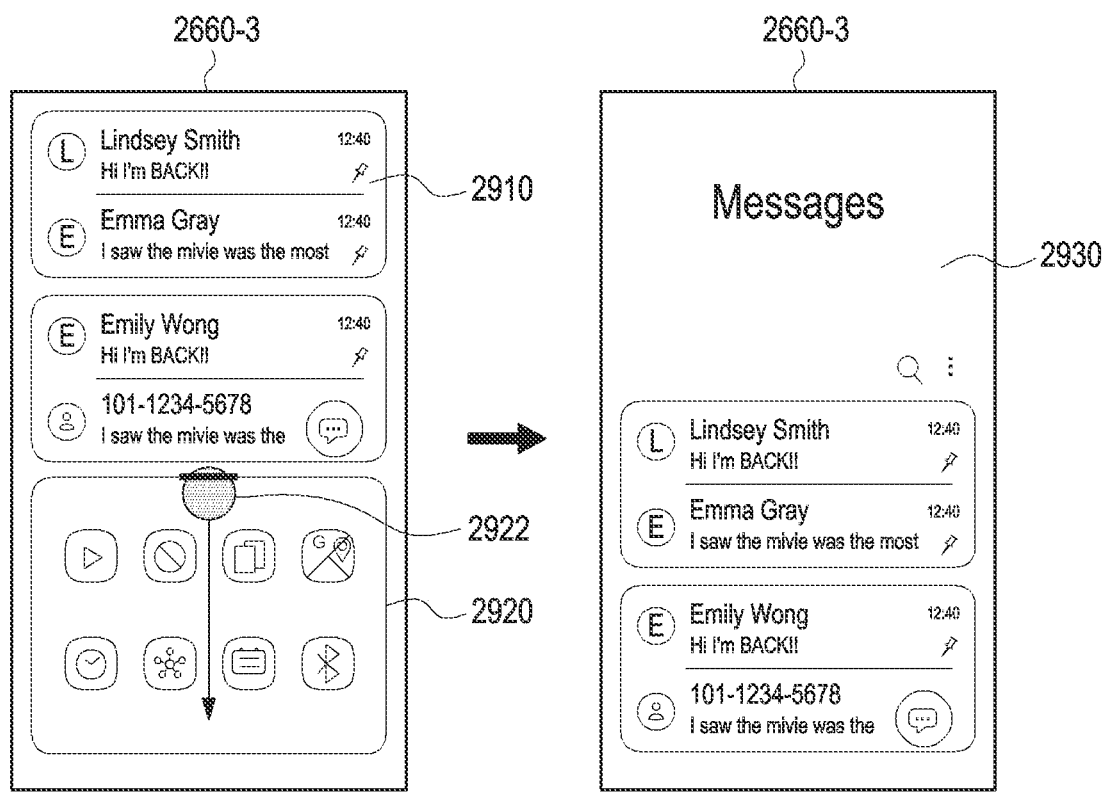
FIG. 29B is a view illustrating a screen display upon a first user input to an application selection panel according to an embodiment of the disclosure.

FIG. 29B is a view illustrating a screen display upon a first user input to an application selection panel according to an embodiment of the disclosure.

Referring to FIG. 29B, the processor 2420 of the electronic device 2601 according to an embodiment may identify whether a first user input (e.g., a flick down) is input to at least a portion (e.g., a handler) 2922 of the application selection panel 2920 while displaying the application selection panel 2920 and the first application screen 2910. According to an embodiment of the disclosure, based on reception of the first user input to at least a portion (e.g., 2922) of the screen 2910 of the first application, the processor 2420 of the electronic device 2601 may display, in the third display area 2660-3 (in a full-view manner) 2930, the screen 2910 of the first application without the application selection panel 2920 (or with the application selection panel 2920 disappearing) in screen 2930.

Figure 29C:
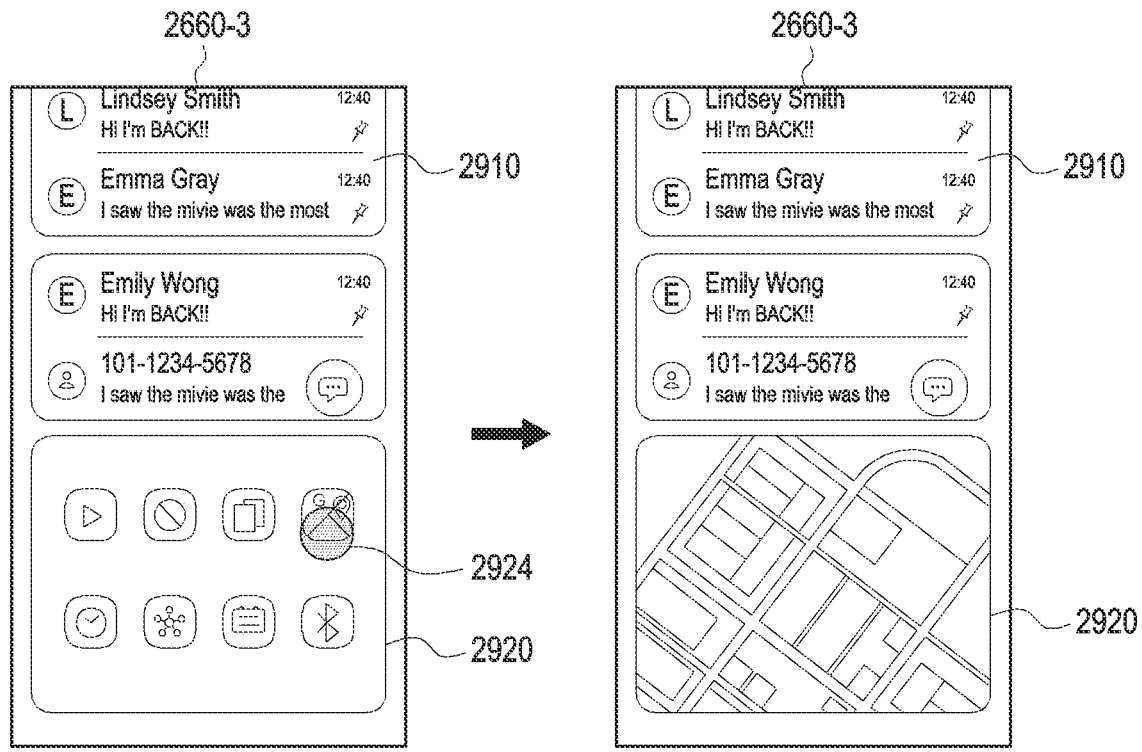
FIG. 29C is a view illustrating a screen display upon a second user input to an application selection panel according to an embodiment of the disclosure.

FIG. 29C is a view illustrating a screen display upon a second user input to an application selection panel according to an embodiment of the disclosure.

Referring to FIG. 29C, the processor 2420 of the electronic device 2601 according to an embodiment may identify whether a second user input (e.g., a touch or long-touch) is input to one icon 2924 among at least one application icon included in the application selection panel 2920 while displaying the application selection panel 2920 and the first application screen 2910 in the third display area 2660-3. Based on the reception of the second user input to one icon (e.g., the first icon) 2924 among at least one application icon included in the application selection panel 2920 according to an embodiment of the disclosure, the processor 2420 of the electronic device 2601 may execute a second application corresponding to the first icon 2924 and display the screen 2910 of the first application and the screen 2920 of the second application in the third display area 2660-3 (in a multiple window manner).

Figure 30A:
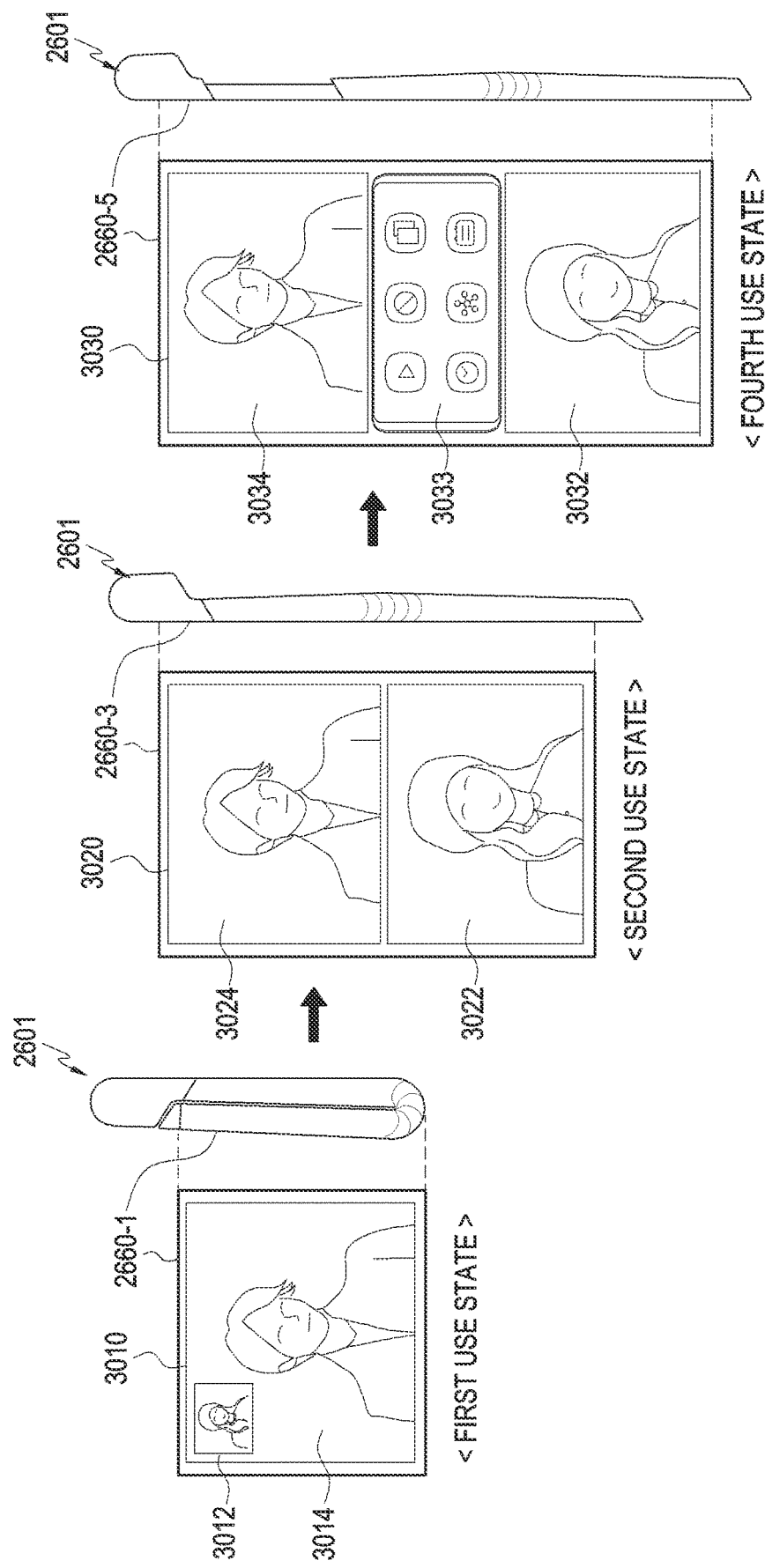
FIG. 30A is a view illustrating a screen display for each use state of an electronic device during a video call in a first use state of the electronic device according to an embodiment of the disclosure.

FIG. 30A is a view illustrating a screen display for each use state of an electronic device during a video call in a first use state of the electronic device according to an embodiment of the disclosure.

Referring to FIG. 30A, the processor (e.g., the processor 2420 of FIG. 24) of the electronic device 2601 (e.g., the electronic device 100 of FIGS. 1 to 6 or the electronic device 2401 of FIG. 24) according to an embodiment may display a first video call screen 3010 in the first display area 2660-1 of the first surface (e.g., the rear surface or the surface in the −Z direction) in the first use state (e.g., the folded/slide-in state) during the video call. For example, the first video call screen 3010 may include a first image area 3012 that displays an image of the user of the electronic device 2601 and a second image area 3014 that displays an image of the counterpart conducting the video call with the user of the electronic device 2601. For example, the processor 2420 of the electronic device 2601 may display the first video call screen 3010, which includes the first image area 3012 and the second image area 3014 in a picture-in-picture manner, due to the limited size of the first display area 2660-1.

The processor 2420 of the electronic device 2601 according to an embodiment may identify a switch (or change) to the second use state (e.g., the unfolded/slide-in state) based on a deformation of the electronic device 2601 while displaying the first video call screen 3010 in the first display area 2660-1 in the first use state. Based on the switch from the first use state to the second use state according to an embodiment of the disclosure, the processor 2420 of the electronic device 2601 may identify the third display area 2660-3 of the second surface (e.g., the front surface or the surface in the +Z direction) and display the second video call screen 3020 on the third display area 2660-3. For example, the second video call screen 3020 may include a first image area 3022 that displays an image of the user of the electronic device 2601 and a second image area 3024 that displays an image of the counterpart conducting the video call with the user of the electronic device 2601. For example, the processor 2420 of the electronic device 2601 may display the second video call screen 3020, which includes the first image area 3022 and the second image area 3024 in a multi-window manner, based on the third display area 2660-3 which has a larger size than the first display area 2660-1.

The processor 2420 of the electronic device 2601 according to an embodiment may identify a switch (or change) to the fourth use state (e.g., the unfolded/slide-out state) based on a deformation of the electronic device 2601 while displaying the second video call screen 3020 in the third display area 2660-3 in the second use state. Based on the switch from the second use state to the fourth use state according to an embodiment of the disclosure, the processor 2420 of the electronic device 2601 may identify the fifth display area 2660-5 of the second surface (e.g., the front surface or the surface in the +Z direction) and display the third video call screen 3030 on the fifth display area 2660-5. For example, the third video call screen 3030 may further include a third image area 3033 other than the first image area 3032 that displays an image of the user of the electronic device 2601 and the second image area 3034 that displays an image of the counterpart conducting the video call with the user of the electronic device 2601.

According to an embodiment of the disclosure, the third image area 3033 may be an area that displays a third image corresponding to content included in the electronic device 2601. According to an embodiment of the disclosure, the third image, along with the first image of the user conducting the video call, may be transmitted to the counterpart's electronic device (not shown). The user's image (e.g., the first image), the counterpart's image (e.g., the second image), and the third image may be displayed on the counterpart's electronic device. For example, the third image may include an icon of at least one application executable on the electronic device 2601. For example, the at least one application may include a music application, a camera application, a search application, and/or other applications executable on the electronic device. The processor 2420 of the electronic device 2601 according to an embodiment may execute a first application selected based on selection of one (e.g., an icon of the first application) of at least one application icon of the third image area 3033 during the video call and display the execution image of the first application in the third image area 3033.

Figure 30B:
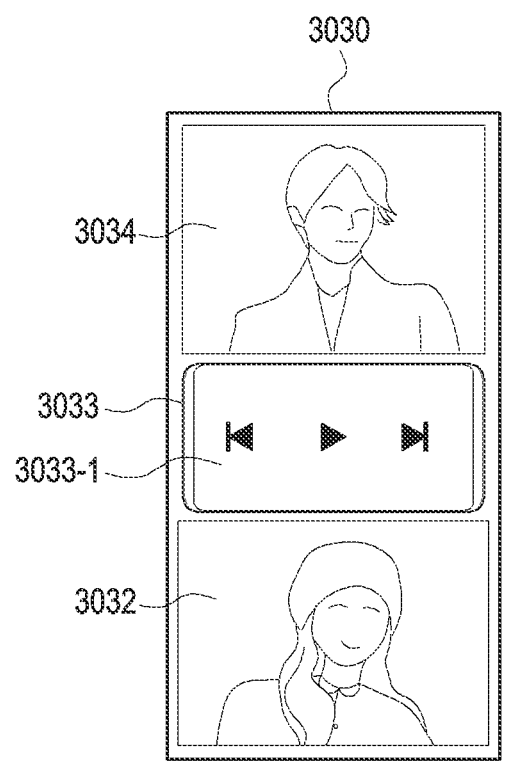
FIG. 30B is a view illustrating an electronic device displaying a music application execution image in a third image area during a video call according to an embodiment of the disclosure.

FIG. 30B is a view illustrating an electronic device displaying a music application execution image in a third image area during a video call according to an embodiment of the disclosure.

Referring to FIG. 30B, the processor 2420 of the electronic device 2601 may display a third video call screen 3030 on the fifth display area 2660-5 in the fourth use state during the video call and may display the user's image in the first image area 3032 of the third video call screen 3030, the counterpart's image in the second image area 3034, and the execution image 3033-1 of the music application executed on the electronic device 2601 in the third image area 3033. According to an embodiment of the disclosure, the processor 2420 of the electronic device 2601 may transmit the user's image and the music application execution image 3033-1 to the counterpart's electronic device (not shown) through a communication module (e.g., the communication module 2490 of FIG. 24), allowing the counterpart's electronic device to display the user's image, counterpart's image, and music application execution image 3033-1 together. In other words, the processor 2420 of the electronic device 2601 may allow the content of the electronic device 2601 (e.g., the music application execution image or the image played as the music application runs) to be shared with the counterpart through the third image area 3033 during the video call between the user and the counterpart.

Figure 30C:
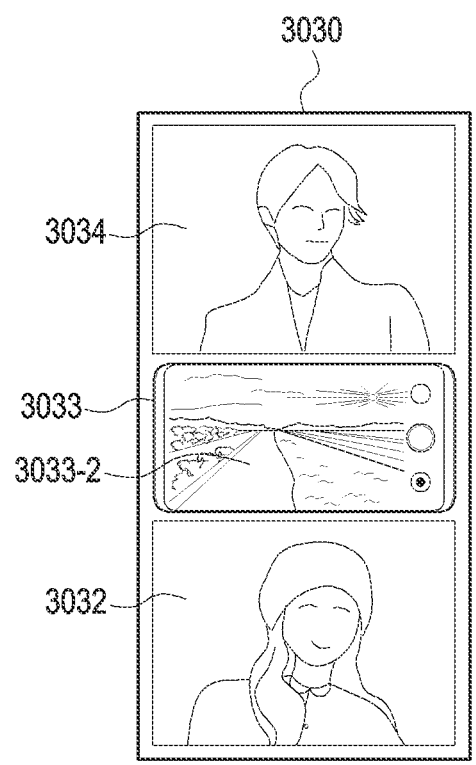
FIG. 30C is a view illustrating an electronic device displaying a camera application execution image in a third image area during a video call according to an embodiment of the disclosure.

FIG. 30C is a view illustrating an electronic device displaying a camera application execution image in a third image area during a video call according to an embodiment of the disclosure.

Referring to FIG. 30C, the processor 2420 of the electronic device 2601 may display a third video call screen 3030 on the fifth display area 2660-5 in the fourth use state during the video call and may display the user's image in the first image area 3032 of the third video call screen 3030, the counterpart's image in the second image area 3034, and the execution image 3033-2 of the camera application executed on the electronic device 2601 in the third area 3033. According to an embodiment of the disclosure, the processor 2420 of the electronic device 2601 may transmit the user's image and the camera application execution image 3033-2 to the counterpart's electronic device (not shown) through a communication module (e.g., the communication module 2490 of FIG. 24), allowing the counterpart's electronic device to display the user's image, counterpart's image, and camera application execution image 3033-2 together. In other words, the processor 2420 of the electronic device 2601 may allow the content of the electronic device 2601 (e.g., the camera application execution image or the image captured by the camera) to be shared with the counterpart through the third image area 3033 during the video call between the user and the counterpart.

Figure 31:
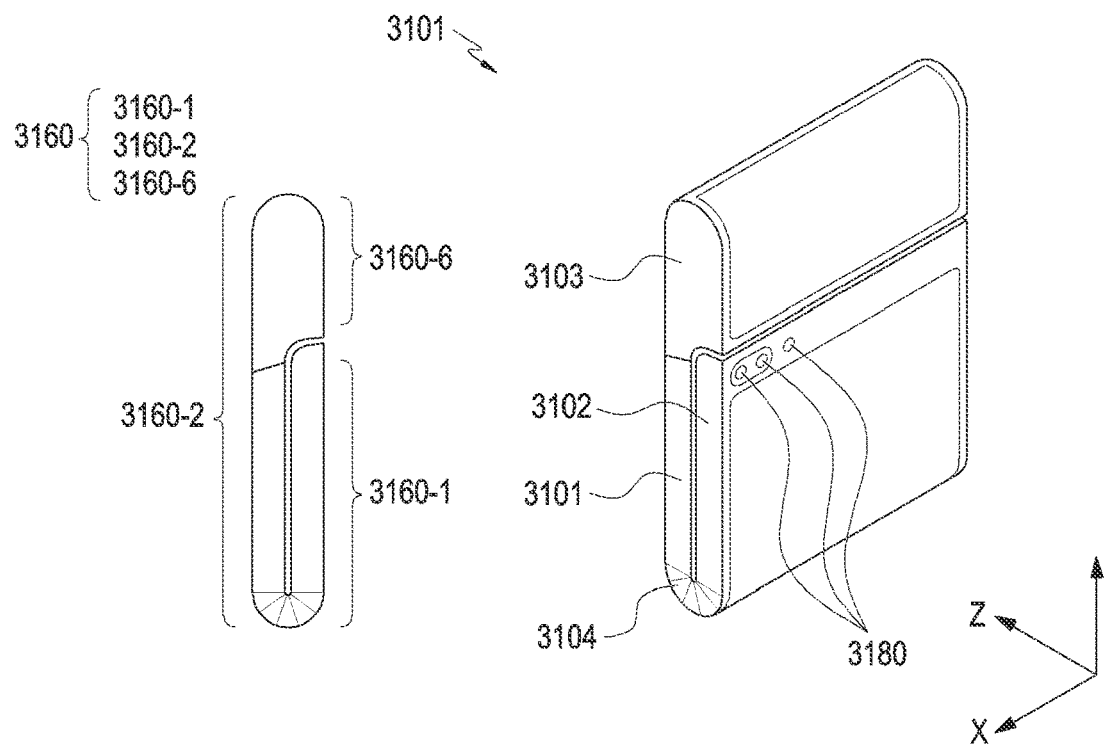
FIG. 31 is a perspective view illustrating an electronic device in which a sensor module and/or an optical module being disposed in a second housing according to an embodiment of the disclosure.

FIG. 31 is a perspective view illustrating an electronic device in which a sensor module and/or an optical module being disposed in a second housing according to an embodiment of the disclosure.

Referring to FIG. 31, an electronic device 3101 (e.g., the electronic device 2401 of FIG. 24) according to an embodiment may include, in a second housing 3102 rather than the third housing 3103, a sensor module and/or optical module (e.g., the sensor module and/or optical module 169 of FIG. 3 or the camera module 2480 of FIG. 24).

The processor (e.g., the processor 2420 of FIG. 24) of the electronic device 3101 according to an embodiment may identify a first use state (e.g., the folded/slide-in state). The first use state may be a state in which the second housing 3102 (e.g., the second housing 102 of FIG. 3) is folded on the first housing 3101 to face the first housing 3101 (e.g., the first housing 101 of FIG. 3) through the hinge structure 3104 (e.g., the hinge structure 104 of FIG. 3) in the slide-in state of the third housing 3103 (e.g., the third housing 103 of FIG. 3).

In the first use state, the processor 2420 of the electronic device 3101 according to an embodiment may identify the first display area 3160-1, the second display area 3160-2, and the sixth display area 3160-6 of the display area 3160 and may output a screen on at least a portion of the first display area 3160-1, the second display area 3160-2, and the sixth display area 3160-6.

Figure 32A:
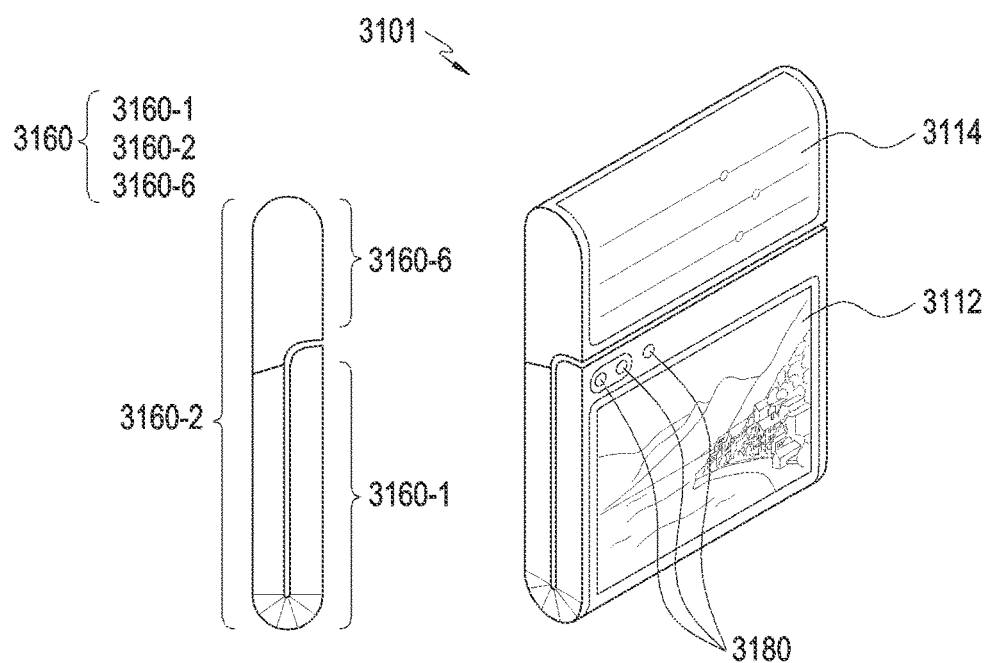
FIG. 32A is a view illustrating a camera preview screen being displayed in a first display area, and a camera effect setting screen is displayed in a sixth display area, in a first use state of an electronic device according to an embodiment of the disclosure.

FIG. 32A is a view illustrating a camera preview screen being displayed in a first display area, and a camera effect setting screen being displayed in a sixth display area, in a first use state of an electronic device according to an embodiment of the disclosure.

Referring to FIG. 32A, in the first use state, a processor (e.g., the processor 2420 of FIG. 24) of the electronic device 3101 according to an embodiment may display a preview screen 3112 captured by the camera module 3180 in the first display area 3160-1 and display a camera effect setting screen 3114 for setting the camera effects of the preview screen in the sixth display area 3160-6. The processor 2420 of the electronic device 3101 according to an embodiment may apply a camera effect set through the camera effect setting screen 3114 of the sixth display area 3160-6 and display a camera effect-applied preview screen 3112 in the first display area 3160-1.

Figure 32B:
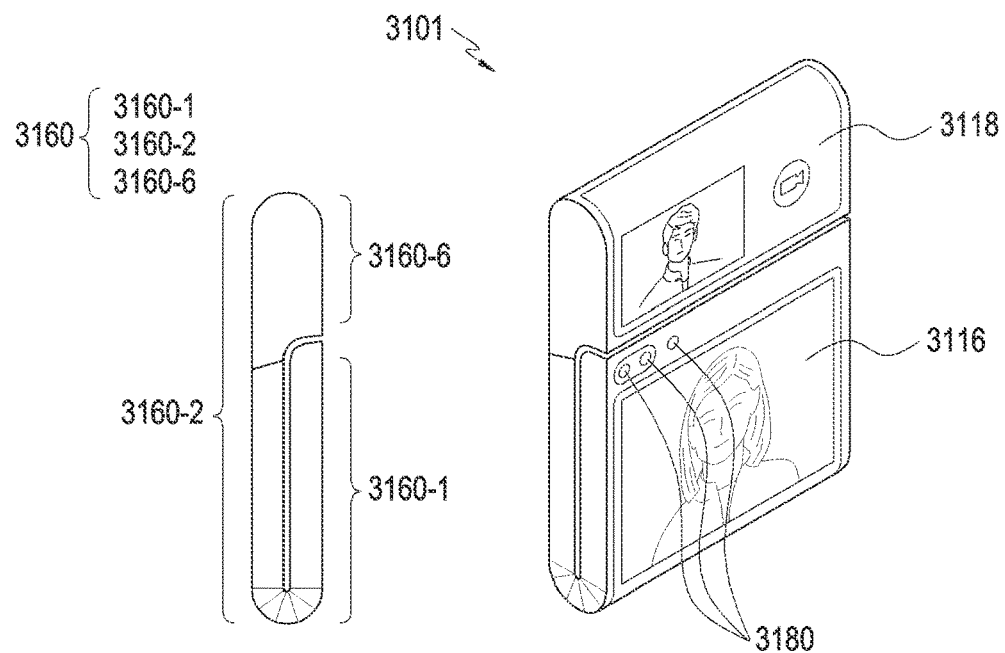
FIG. 32B is a view illustrating a user image screen being displayed in a first display area, and a counterpart image screen being displayed in a sixth display area, in a first use state of an electronic device according to an embodiment of the disclosure.

FIG. 32B is a view illustrating a user image screen being displayed in a first display area, and a counterpart image screen being displayed in a sixth display area, in a first use state of an electronic device according to an embodiment of the disclosure.

Referring to FIG. 32B, in the first use state, the processor 2420 of the electronic device 3101 according to an embodiment may display a user image screen 3116, captured by the camera module 3180, in the first display area 3160-1 and the counterpart's image screen 3118 in the sixth display area 3160-6 during the video call. Conversely, in the first use state, the processor 2420 of the electronic device 3101 according to an embodiment may display the counterpart's image screen 3118 in the first display area 3160-1 and the user image screen 3116, captured by the camera module 3180, in the sixth display area 3160-6 during the video call.

Figure 32C:
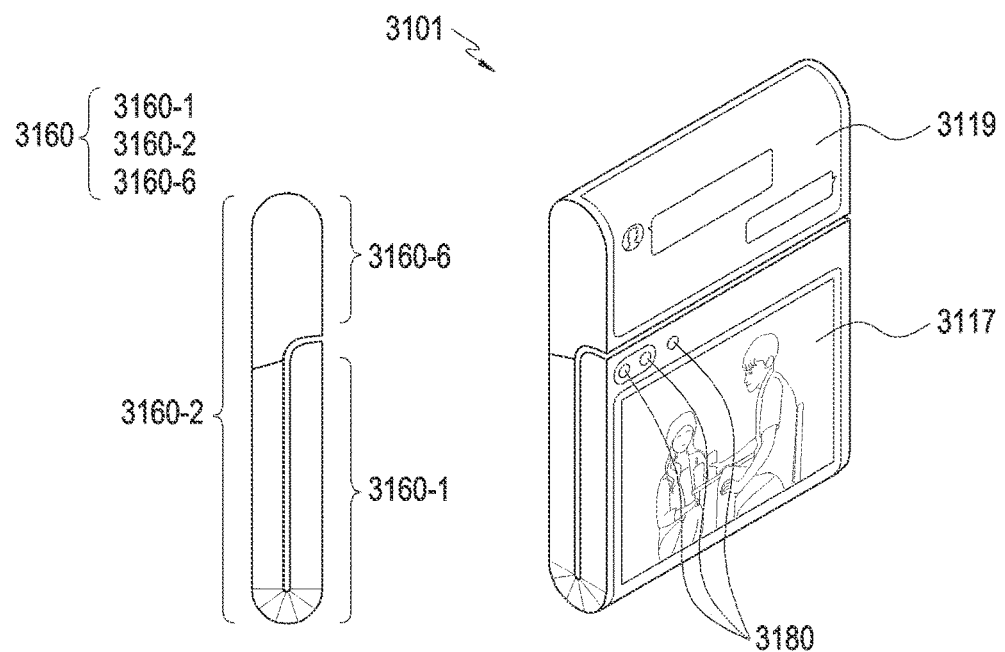
FIG. 32C is a view illustrating a first application screen being displayed in a first display area, and a second application screen being displayed in a sixth display area, in a first use state of an electronic device according to an embodiment of the disclosure.

FIG. 32C is a view illustrating a first application screen being displayed in a first display area, and a second application screen being displayed in a sixth display area, in a first use state of an electronic device according to an embodiment of the disclosure.

Referring to FIG. 32C, in the first use state, the processor 2420 of the electronic device 3101 according to an embodiment may display a first application screen 3117 in the first display area 3160-1 and a second application screen 3119 in the sixth display area 3160-6. The first application and the second application may be different applications. For example, the first application may be a video playback application, and the second application may be a message (alarm or notification) application. According to various embodiments of the disclosure, the first application and/or the second application may be any application that may be executed on the electronic device 3031.

FIG. 33 is a view illustrating using a use state upon receiving a call on an electronic device according to an embodiment of the disclosure.

Referring to FIG. 33, the processor (e.g., the processor 2420 of FIG. 24) of the electronic device 3101 according to an embodiment may identify the use state when receiving a call and, if the use state is the first use state, display information 3310 for indicating reception of a call in the second display area 3160-2.

The processor 2420 of the electronic device 3101 according to an embodiment may identify a switch (or change) to the second use state (e.g., the unfolded/slide-in state) based on a deformation of the electronic device 3101 while displaying the information for indicating the call reception in the second display area 3160-2. The processor 2420 of the device 3101 according to an embodiment may start phone talk based on the switch to the second use state while displaying the information 3310 for indicating call reception in the second display area 3160-2 and identify the third display area 3160-3 corresponding to the second use state. The processor 2420 of the device 3101 according to an embodiment may display the call screen 3320 in the third display area 3160-3.

The processor 2420 of the device 3101 according to an embodiment may identify a switch (or change) from the second use state to the first use state while displaying the call screen 3320 in the third display area 3160-3. The processor 2420 of the device 3101 according to an embodiment may terminate the phone call based on the identification of the second use state while displaying the call screen 3320 in the third display area 3160-3 and end the call screen 3320 and turn off the entire display area 3160.

Figure 34:
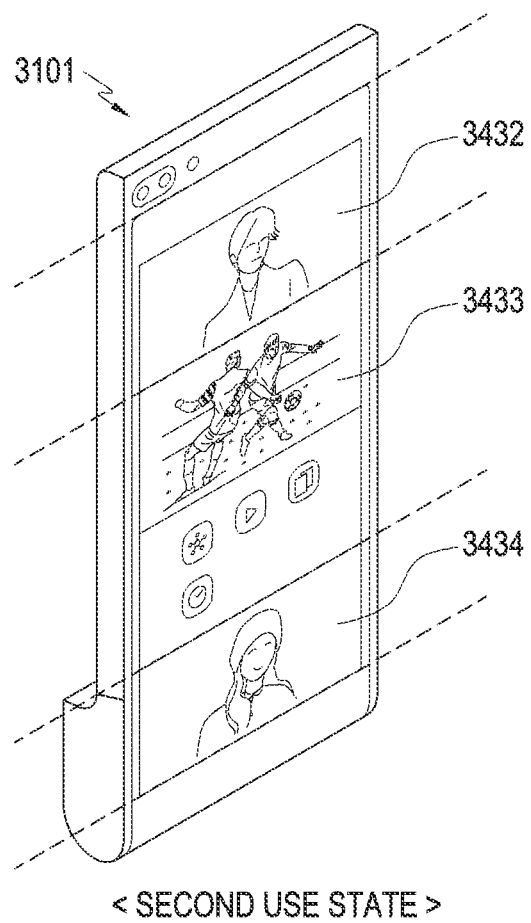
FIG. 34 is a view illustrating using a second use state upon a video call on an electronic device according to an embodiment of the disclosure.

FIG. 34 is a view illustrating using a second use state upon a video call on an electronic device according to an embodiment of the disclosure.

Referring to FIG. 34, the processor 2420 of the electronic device 3101 according to an embodiment may display screens associated with a video call in the third display area 3160-3 in the second use state during the video call. For example, the screens associated with the video call may further include a first image area 3432 displaying the image of the user of the electronic device 3101, a second image area 3434 displaying the image of the counterpart conducting the video call with the user of the electronic device 3101, and a third image area 3433. According to an embodiment of the disclosure, the third image area 3433 may be an area that displays a third image corresponding to content included in the electronic device 3101. According to an embodiment of the disclosure, the third image, along with the first image of the user conducting the video call, may be transmitted to the counterpart's electronic device (not shown). The user's image (e.g., the first image), the counterpart's image (e.g., the second image), and the third image may be displayed on the counterpart's electronic device. For example, the third image may include an icon of at least one application executable on the electronic device 3101. For example, the at least one application may include a music application, a camera application, a search application, and/or other applications executable on the electronic device. The processor 2420 of the electronic device 3101 according to an embodiment may execute a first application selected based on selection of one (e.g., an icon of the first application) of at least one application icon of the third image area 3433 during the video call and display the execution image of the first application in the third image area 3433.

Figure 35:
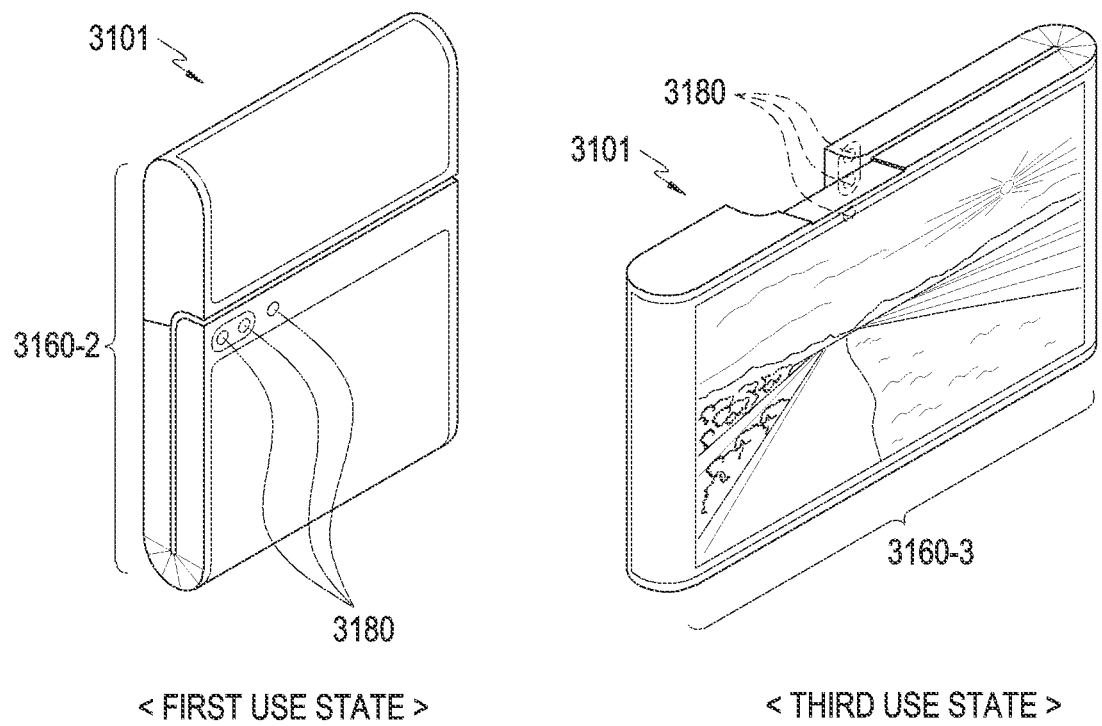
FIG. 35 is a view illustrating using a use state upon camera capturing on an electronic device according to an embodiment of the disclosure.

FIG. 35 is a view illustrating using a use state upon camera capturing on an electronic device according to an embodiment of the disclosure.

Referring to FIG. 35, the processor 2420 of the electronic device 3101 according to an embodiment may display a captured image in the second display area 3160-2 during capturing using the camera module 3180 (e.g., 2480 of FIG. 24) in the first use state. The processor 2420 of the electronic device 3101 according to an embodiment may identify a switch (or change) of the use state of the electronic device 3101 from the first use state to the third use state (e.g., the third use state (folded/slide-out state) of FIG. 21) while displaying the captured image in the second display area 3160-2. The processor 2420 of the electronic device 3101 according to an embodiment may display the captured image in the third display area 3160-3 based on the identification of the switch from the first use state to the third use state. As the first state is switched to the third use state, the camera module 3180 (or the lens of the camera module 3180) may be placed to the center with respect to the Y-axis direction of the electronic device 3101. The captured image may be displayed in the third display area 3160-3, which is expanded as compared with the second display area 3160-2, allowing the user to more stably take a photo.

While the disclosure has been shown and described with reference to various embodiments thereof, it will be understood by those skilled in the art that various changes in form and details may be made therein without departing from the spirit and scope of the disclosure as defined by the appended claims and their equivalents. For example, additional embodiments may be implemented by selectively combining configurations of different embodiments among the various embodiments described above. For example, the embodiment of FIG. 16 or FIG. 17 may be combined with any other embodiment to implement a new embodiment. Additional embodiments may be implemented by combining the embodiments of FIGS. 16 and 17. In another embodiment of the disclosure, the interlocking member of FIG. 3 or the interlocking structure of FIGS. 16 and 17 may be omitted and, in this case, the plurality of batteries illustrated in FIG. 9 may be formed as a single battery.

The invention claimed is:

1. An electronic device comprising:
a first housing;
a second housing coupled to an edge of the first housing and configured to rotate about a folding axis extending in a first direction;
a third housing coupled to the first housing and disposed to be slidable toward or away from the folding axis;
a first roller rotatably mounted to an edge of the second housing,
at least one second roller disposed on or adjacent to a hinge structure; and
a flexible display including a first area disposed on the third housing and a second area extending from the first area and disposed through the first housing to the second housing,
wherein as the third housing slides, the second area slides on the first housing or the second housing, and a portion of the second area is selectively received in the second housings,
wherein the first roller and the at least one second roller are configured to slidably extend or withdraw the third housing while in a folded state.

2. The electronic device of claim 1, wherein the second housing is configured to be pivotable between a first position where the second housing is disposed to face the first housing and a second position in which the second housing is unfolded at a designated angle from the first position.

3. The electronic device of claim 2,
wherein the second area is disposed to at least partially face away from the first area in the first position, and
wherein the second area is disposed at least partially in parallel to a side of the first area in the second position.

4. The electronic device of claim 2, wherein, as the second housing pivots to the second position, a portion of the second area is gradually received in the second housing.

5. The electronic device of claim 2, further comprising a sensor module disposed in the third housing and disposed to face away from the first area.

6. The electronic device of claim 5, wherein in the first position, at least a portion of the second area is disposed adjacent to the sensor module.

7. The electronic device of claim 2, wherein in the first position, as the third housing slides, the second area is configured to gradually expand or contract at a side of the first area.

8. The electronic device of claim 1,
wherein the hinge structure provides the folding axis and pivotably coupling the first housing and the second housing,
wherein the second area is disposed to partially cross the hinge structure between the first housing and the second housing.

9. The electronic device of claim 8, wherein the hinge structure includes:
at least one hinge module;
a multi-bar assembly disposed between the hinge module and the flexible display and configured to support a portion of the second area between the first housing and the second housing; and
a hinge cover disposed to face the multi-bar assembly with the hinge module disposed therebetween.

10. The electronic device of claim 1,
wherein the second area is configured to be gradually received in or exposed to an outside of the second housing while being guided by the first roller.

11. The electronic device of claim 10, further comprising:
a rack gear disposed in the second area;
a pinion gear rotatably disposed in the second housing and engaged with the rack gear; and
an interlocking member interlocking rotation of the first roller and the pinion gear,
wherein the pinion gear is configured to be rotated in conjunction with the first roller by the interlocking member to move the rack gear or the second area relative to the second housing.

12. The electronic device of claim 1, further comprising:
a printed circuit board coupled to the third housing and disposed in the first housing;
at least one battery disposed in the second housing; and
a flexible printed circuit board extending from the battery and connected to the printed circuit board.

13. The electronic device of claim 12, wherein the flexible printed circuit board is disposed to be partially curved and is configured so that the curved shape of the flexible printed circuit board is deformed as the third housing slides.

14. The electronic device of claim 1, further comprising:
at least one processor operatively connected with the flexible display,
wherein the at least one processor is configured to:
identify one of a plurality of use states of the electronic device based on a deformation of the electronic device based on pivoting of the second housing and a slide of the third housing, and
activate at least a partial area among a plurality of display areas of the flexible display based on the use state.

15. The electronic device of claim 14, wherein the plurality of use states of the electronic device includes at least one of:
a first use state in which the third housing is slid in away from the folding axis in a folded state of the second housing with respect to the first housing;
a second use state in which the third housing is slid in away from the folding axis in an unfolded state of the second housing with respect to the first housing;
a third use state in which the third housing is slid out toward the folding axis in the folded state of the second housing with respect to the first housing;
a fourth use state in which the third housing is slid out toward the folding axis in an unfolded state of the third housing with respect to the first housing; or
a fifth use state in which the third housing is mounted on a plane in a state in which the third housing is partially unfolded to be inclined with respect to the first housing.

16. The electronic device of claim 14, wherein the deformation includes at least one of a folded/unfolded state or a slide-in/out state of the electronic device.

17. The electronic device of claim 14, wherein the at least one processor is further configured to differently use a whole display area or a portion of the whole display area including the first area and the second area for each use state based on the deformation of the electronic device.

* * * * *